US008606695B1

(12) United States Patent
Arora et al.

(10) Patent No.: US 8,606,695 B1
(45) Date of Patent: Dec. 10, 2013

(54) DECISION MAKING ENGINE AND BUSINESS ANALYSIS TOOLS FOR SMALL BUSINESS CREDIT PRODUCT OFFERINGS

(75) Inventors: Rohit Arora, New York, NY (US); Ramit Arora, New York, NY (US); Ravi Chamria, New Dehli (IN)

(73) Assignee: Biz2credit Inc., New York, NY (US)

( * ) Notice: Subject to any disclaimer, the term of this patent is extended or adjusted under 35 U.S.C. 154(b) by 0 days.

(21) Appl. No.: 13/538,267

(22) Filed: Jun. 29, 2012

Related U.S. Application Data

(60) Provisional application No. 61/503,782, filed on Jul. 1, 2011.

(51) Int. Cl.
*G06Q 40/00* (2012.01)
(52) U.S. Cl.
USPC .............................................. 705/38; 705/35
(58) Field of Classification Search
USPC .............................................. 705/35, 38, 39
See application file for complete search history.

(56) References Cited

U.S. PATENT DOCUMENTS

| 2008/0097897 A1* | 4/2008 | Sadowski et al. ................ 705/38 |
| 2008/0249925 A1* | 10/2008 | Nazari et al. ..................... 705/38 |
| 2009/0299911 A1* | 12/2009 | Abrahams et al. ........... 705/36 R |
| 2012/0233010 A1* | 9/2012 | Frohwein et al. ............. 705/26.3 |

* cited by examiner

*Primary Examiner* — Lalita M Hamilton
(74) *Attorney, Agent, or Firm* — K&L Gates LLP

(57) ABSTRACT

Tools, strategies, and techniques are disclosed for matching the needs of small business owners with credit products offered by lenders such as banking institutions, alternative lenders, and private money lenders. Processes are provided for matching the funding requirements of small business owners with credit products offered by multiple banks and facilitating an intelligent comparison of the multiple credit options. In addition, tools are disclosed for analyzing risk factors and other information associated with business borrowers.

20 Claims, 79 Drawing Sheets

FIG. 5

| Sections and Fields | Type of Field | Raw/Derived |
|---|---|---|
| Business Information PAGE 1: | | |
| Relation to Borrower | User Input | |
| Application Title | User Input | |
| Legal Business Name | Prefilled from QB | Raw |
| Industry | Prefilled from QB | Derived |
| Sub Industry | Not Available in QuickBooks | |
| Physical Business Address1 | Prefilled from QB | Raw |
| Address2 | Prefilled from QB | Raw |
| Country | Prefilled from QB | Raw |
| State | Prefilled from QB | Raw |
| City | Prefilled from QB | Raw |
| Zip Code | Prefilled from QB | Raw |
| Number of Employees | Prefilled from QB | Derived |
| Phone No. | Prefilled from QB | Raw |
| Business Information PAGE 2: | | |
| Age of Business | Not Available in QuickBooks | |
| Business Legal Structure | Not Returned From QuickBooks via API | |
| Borrower's Relation to Company | User Input | |
| Average Annual Revenue | Prefilled from QB | Derived |
| Business operating expenses | Prefilled from QB | Derived |
| Personal Credit Score | Non-Accounting Input | |
| Does your business have outstanding debt? - Yes/No | Prefilled from QB | Derived |
| Debt Type - Business Credit Card/ Line of Credit/ Term Loan | Prefilled from QB | Derived |
| If Debt Type - Business Credit Card | | |
| Year disbursed | Not Available in QuickBooks | |
| Outstanding loan amount | Prefilled from QB | Derived |
| Interest Rate | Not Available in QuickBooks | |
| If Debt Type - Line Of Credit | | |
| Year disbursed | Not Available in QuickBooks | |
| Collateral | Not Available in QuickBooks | |
| Outstanding loan amount | | |
| Interest Rate | Not Available in QuickBooks | |
| If Debt Type - Term Loan | | |
| Year disbursed | Not Available in QuickBooks | |
| Collateral | Not Available in QuickBooks | |
| Original Loan Amount | Not Available in QuickBooks | |
| Outstanding Loan Amount | | |
| Interest Rate | Not Available in QuickBooks | |
| Payment schedule | Not Available in QuickBooks | |

FIG. 8A

| | | |
|---|---|---|
| Term | Not Available in QuickBooks | |
| | | |
| Loan Amount Acceptable (Minimum and Maximum) | User Input | |
| Do you have a business partner | User Input | |
| Is this a franchise? | User Input | |
| How do you plan on using the loan? | User Input | |
| | | |
| Please describe the business's assets (Collaterals) | | |
| Real Estate | | |
| | | |
| | | |
| Status of Property | Not Available in QuickBooks | |
| Type of Property | Not Available in QuickBooks | |
| Current Mortgage | Not Available in QuickBooks | |
| Outstanding Mortgage Amount | Not Available in QuickBooks | |
| Do you want to cash out? | Not Available in QuickBooks | |
| Cash out amount | Not Available in QuickBooks | |
| | | |
| Accounts Receivables | | |
| Average Quarterly Accounts Receivables | Prefilled from QB | Derived |
| Breakdown of latest Accounts Receivables Statement | | |
| 0-30 days: | Prefilled from QB | Derived |
| 31-60 days: | Prefilled from QB | Derived |
| 61-90 days: | Prefilled from QB | Derived |
| 90 + days: | Prefilled from QB | Derived |
| Average Turn Time (days) | Not Available in QuickBooks | |
| | | |
| Inventory | | |
| Total value of Inventory | Prefilled from QB | Derived |
| Breakdown | | |
| Work In Progress | Prefilled from QB | Derived |
| Raw Material | Prefilled from QB | Derived |
| Finished Goods | Prefilled from QB | Derived |
| Average Turn Time (days) | Not Available in QuickBooks | |
| | | |
| Equipment | | |
| Approximate Equipment Value | Not Available in QuickBooks | |
| Age of Equipment - Year/Month | Not Available in QuickBooks | |
| Type of Equipment - Light Machinery/Farm/Medical etc | Not Available in QuickBooks | |
| | | |
| Credit Card Receivables | | |
| Average Monthly CC Sales | Prefilled from QB | Derived |
| Major Credit Cards Processed (Mastercard, Visa, American Express, Discover) | Prefilled from QB | Derived |
| Number of Terminals | Not Available in QuickBooks | |
| Number of monthly transactions | Prefilled from QB | Derived |

FIG. 8B

| | | |
|---|---|---|
| Goodwill | | |
| Estimated value of Goodwill | Not Available in QuickBooks | |
| Business Location Description? - Highway/University/Mall etc | Not Available in QuickBooks | |
| Estimated EBIDTA | Prefilled from QB | Derived |
| | | |
| Personal Financials: | | |
| | | |
| Average Other Monthly Expenses | Non-Accounting Input | |
| Average Monthly Income | Non-Accounting Input | |
| Average Checking Account Balance | Non-Accounting Input | |
| Current Personal Bank | Non-Accounting Input | |
| Marketable Securities | Non-Accounting Input | |
| Retirement Funds | Non-Accounting Input | |
| Other Personal assets outside of business | Non-Accounting Input | |
| | | |
| Residence Status - Own/Rent/Neither | Non-Accounting Input | |
| If selected Residence Status - Own | | |
| Home Value | Non-Accounting Input | |
| Home Mortgage Balance | Non-Accounting Input | |
| Monthly Mortgage Payment | Non-Accounting Input | |
| If selected Residence Status - Rent | | |
| Monthly Rent Amount | Non-Accounting Input | |
| | | |
| Funding Priorities: | | |
| Priority #1 | User Input | |
| Priority #2 | User Input | |
| Priority #3 | User Input | |
| Have you approached your existing business bank for a loan? | User Input | |
| On Selecting Yes - Reason for not getting a loan | User Input | |
| On Selecting No - Why not? | User Input | |

FIG. 8C

HOME / My Account / Loan

Hi, Biz2CreditLLC

Business Information   Funding Priorities   Review   Post Application

○ General Information
○ Business Information
○ Personal Financials

Business Information                                                                 1002

Age of Business   Year    Month

Select Business Legal Structure          Borrower's Relation to Company

Average Annual Revenue                   Business operating expenses

Select Personal Credit Score             ☐ I don't know my credit score

1008

Does your business have outstanding debt? *   ○ Yes   ○ No

Loan Amount Acceptable:  Minimum  Maximum   (exclude commas and cents from figure)

Do you have a business   ○ Yes   ○ No
partner?

Is this a franchise?     ○ Yes   ○ No

How do you plan on using the loan? * (Check all that apply)

Cash Flow Management                Marketing/Advertising

☐ Fulfilling              ☐ Payroll expenses    ☐ Marketing Materials   ☐ Online Advertising
  Contracts/Orders        ☐ Refinancing Debt    ☐ Print/TV Advertising  ☐ Web site Development
☐ Repairing Equipment     ☐ Other Working Capital ☐ Other Marketing

Expansion                            Startup Plans

1010
☐ Buying Equipment        ☐ Buying Real Estate  ☐ Buying Equipment      ☐ Buying Real Estate
☐ Hiring more Employees   ☐ License or Certification ☐ Hiring new Employees ☐ License or Certification
                            Fees                                           Fees
☐ Purchasing a Business   ☐ Purchasing Inventory ☐ Purchasing a Business ☐ Purchasing Inventory
☐ Renovation/Build out    ☐ Other Expansion Plans ☐ Build out Please describe the business's assets * (Check all that apply)

☐ Real Estate             ☐ Credit Card Receivables
1012
☐ Equipment               ☐ Inventory            or ☐ Business does not own any assets
☐ Accounts Receivables    ☐ Goodwill

FIG. 10A

HOME / My Account / Login

Hi, Biz7Credit LLC

| Business Information | Funding Priorities | Review | Post Application |

General Information
Business Information
Personal Financials

Business Information                                              1004

Real Estate

Select Status of Property

1022

Type of Property

○ Automotive        ○ Bed & Breakfast    ○ Day Care          ○ Doctor's Office
○ Dry Cleaners      ○ Flagged Hospitality ○ Funeral Home     ○ Gas Stations
○ Health Care       ○ Industrial         ○ Light Industrial  ○ Mixed Use
○ Mobile Home Park  ○ Motel              ○ Multifamily       ○ Office
○ Other             ○ Residential        ○ Restaurant        ○ Retail
○ Rooming House     ○ RV Park            ○ Self Storage      ○ Special Purpose
○ Unflagged Hospitality ○ Warehouse Select Percentage Occupied          Estimated Property Value Current Mortgage?  ● Yes  ○ No Outstanding Mortgage               Monthly Mortgage Payment Do you want cash out?  ● Yes  ○ No Cash out Amount

| Product Name | Low | Average | Excellent |
|---|---|---|---|
| Micro Loan | < 575 | 575- | 650-850 |
| SBA Loan | < 600 | 600- | 700-850 |
| Real Estate | < 650 | 650- | 700-850 |
| Account Receivables | < 550 | 550- | 700-850 |
| Inventory | < 650 | 650- | 700-850 |
| Equipment | < 680 | 680- | 750-850 |

FIG. 18

| Product Name | Low Risk | Medium Risk | High Risk |
|---|---|---|---|
| Micro Loan | Above 1 Yrs. | 6 Months – 1 Yrs. | < 6 Months |
| SBA Loan | Above 3 Yrs. | 2 Yrs. – 3 Yrs. | 0 Yrs. – 2 Yrs. |
| Real Estate | Above 2 Yrs. | 1 Yrs. – 2 Yrs. | 0 Yrs. – 1 Yrs. |
| Account Receivables | Above 3 Yrs. | 1 Yrs. – 3 Yrs. | 0 Yrs. – 1 Yrs. |
| Equipment | Above 3 Yrs. | 2 Yrs. – 3 Yrs. | 0 Yrs. – 2 Yrs. |
| Inventory | Above 2 Yrs. | 1 Yrs. – 2 Yrs. | 0 Yrs. – 1 Yrs. |

FIG. 21

| DTI % | Low Risk | High Risk |
|---|---|---|
| Micro Loan | 80/100 (More than 1Yrs.) | 50/100 (Start-up less than 1 Yrs.) |
| SBA Loan | 85/100 (More than 2Yrs.) | 75/100 (Start-up less than 2 Yrs.) |
| Real Estate | 90/100 (More than 1Yrs.) | 80/100 (Start-ups) |
| Account Receivables | 90/100 (More than 1Yrs.) | 80/100 (Start-ups) |
| Equipment | 90/100 (More than 1Yrs.) | 80/100 (Start-ups) |
| Inventory | 60/100 (More than 1Yrs.) | 50/100 (Start-ups) |

FIG. 22

| Product Name | Low Risk | High Risk |
|---|---|---|
| Micro Loan | Rest industries | Internet startups, Real Estate, Investment Business |
| SBA Loan | Rest industries | Gas Station, Internet, Whole Sale |
| Real Estate | Rest industries | Gas Station, Waste Managment |
| Account Receivables | Rest industries | Medical, Health Care, Retail, Restaurant |
| Equipment | Rest industries | Whole Sale Distribution, Retail, Gas Station, Super Market, Restaurant |
| Inventory | Rest industries | Online Companies, Franchises |

FIG. 24

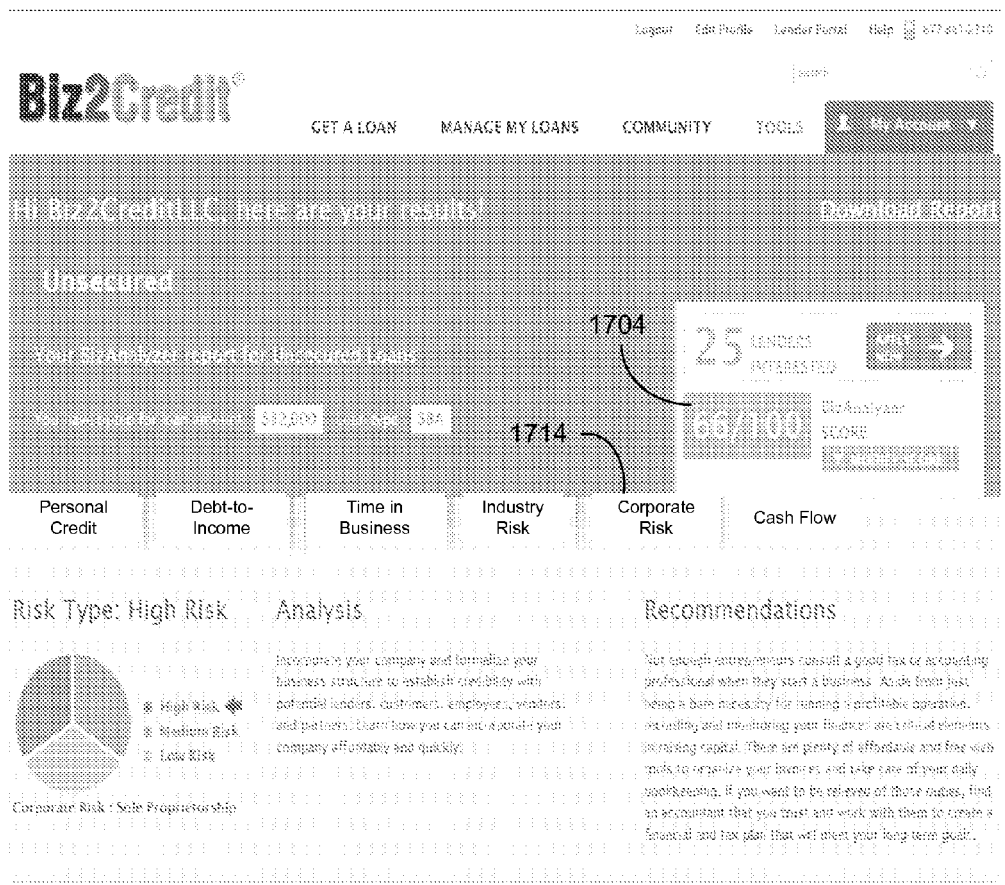
FIG. 25

| Product Name | Low Risk | Medium Risk | High Risk |
|---|---|---|---|
| Micro Loan | C Corp, LLC | S Corp | Sole Propritership |
| SBA Loan | C Corp, LLC | S Corp | Sole Propritership |
| Real Estate | C Corp, LLC | S Corp | Sole Propritership |
| Account Receivables | C Corp, LLC | S Corp | Sole Propritership |
| Equipment | C Corp, LLC | S Corp | Sole Propritership |
| Inventory | C Corp, LLC | S Corp | Sole Propritership |

FIG. 26

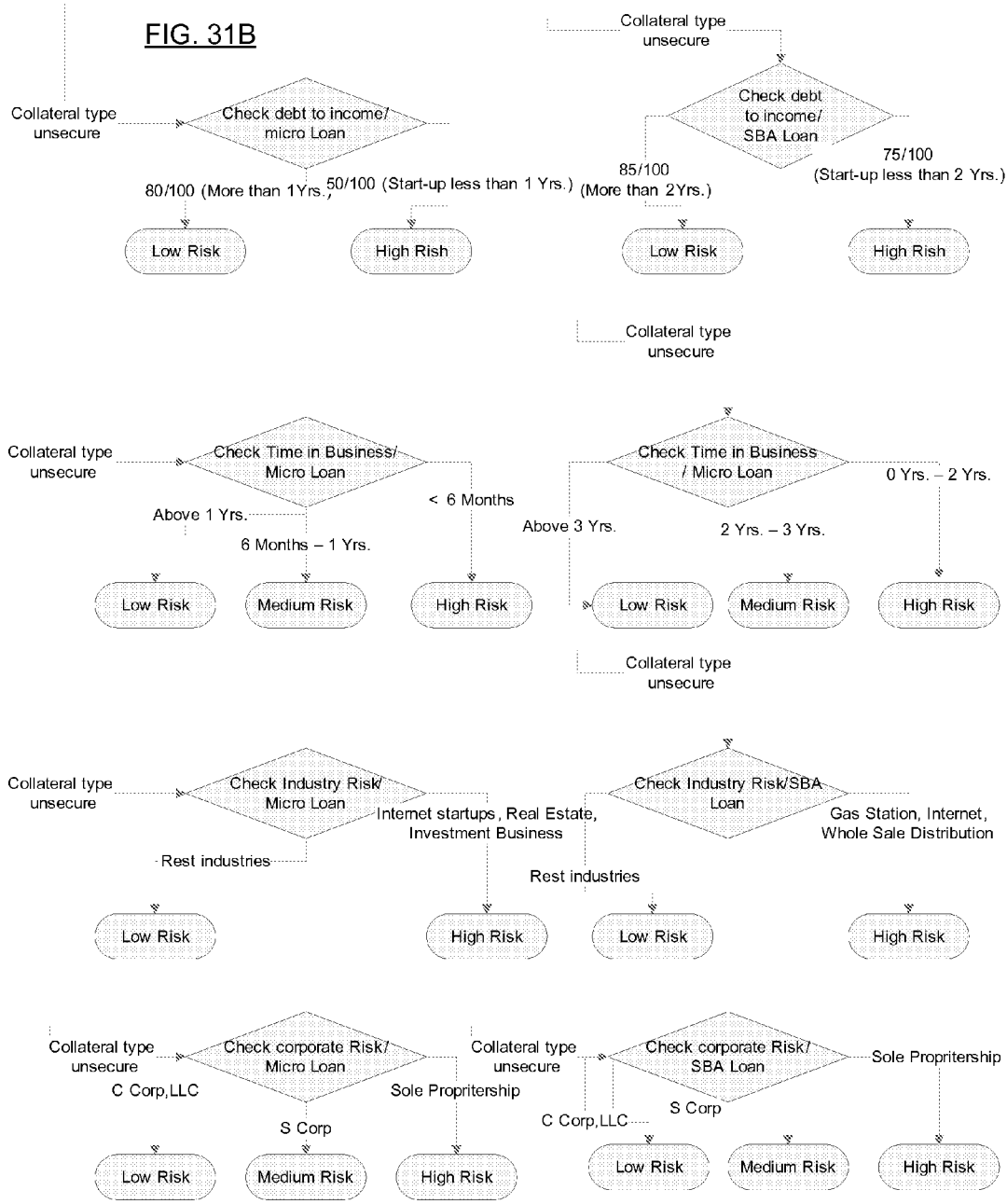

| | |
|---|---|
| Use Case | Internal Process for Matching & Ranking |
| Use Case Id | UC-Match & Rank Unsecure-001 |
| Description | This Use Case Document Related to how the System finds out best Matches into the database. Business User Submit Their Loan Application and System Finds Best Campaign According to Business User Requirement. On the basis of Define Criteria by the Lender user |
| Primary Actor | Primary Actor Apply for a Loan According to their Requirement Loan Search Engine Search the best Product and gives the Product Details for the Primary User according to user's Plan type |
| Triggers | Primary Actor applying for a Loan and after Submition of Loan Application System Navigate to Best Product to the user |
| Pre Condition | Primary Actor Login and Apply for A Loan in My Account area |
| Main Scenario | Check the Matching Criteria For the Campaign<br><br>Check Industry: - There Are Two Options Are Available Include/Exclude. In Case of Include System Check Campaign Industry which is match with Loan Application and in Case of "Exclude" Option System Check those Loan Application which is Not Related to Selected Industry which is define in Campaign<br><br>• Check Age of Business: Campaign Age of Business is always <= Loan Age of Business Otherwise System Don't Match Loan Application.<br><br>• Check Max DTI% Campaign DTI% is always<=Loan DTI% Otherwise System Don't Match Loan Application.<br><br>Formula: how to Find Loan DTI<br><br>In Case of Own: *(Monthly Mortgage Payment+ Avg Other Monthly Expense)\*100/Avg Monthly Income =Loan DTI%*<br><br>In case of rent : *(Avg other Monthly Expense+ Rent Amount)\*100/Avg Monthly Income=Loan DTI%*<br><br>In Case of Neither :*Avg other Monthly Expense\*100/Avg Monthly Income= Loan DTI%*<br><br>• Check Credit Score: Campaign Credit Score <=Loan Credit Score |

FIG. 32

Otherwise System Don't Match Loan Application

- Check Product Exclusivity : In Case of "No" System Is Able to Match The Campaign any other Lender Campaign

- In Case of "Yes" System Check Only those User Who Is Existing Member of the bank and Applied for a Loan. Means only Existing User Apply for a Loan of this Particular Product.

- Check State Status: In Case of "Exclude" State System check the campaign state with Loan Application State and Match only those state which is not Mention In Campaign .(Means If New York Is choose In Campaign than New York User Don't Apply for this Campaign) and in Case of "Only Include the following" System check the campaign state with Loan Application State and Match only those state which is add In Campaign

- Check Minimum Avg Annual Revenue: Campaign Avg Annual Revenue<= Loan Avg Annual Revenue

- Check DSR : Campaign DSCR <= Loan Application DSCR(Net Operating Income/Loan Payment)

Where:    Net Operating Income= Revenue - Expense

Formula how to Calculate DSCR For Loan Application

DSR=Net Operating Income/Loan Payment

Match Will be Made if Principal Loan Amount Is Greater or Equal to Minimum Loan Amount In Case of Loan Type Line of Credit (LOC) System Use Following Formula Y=NOI/Min DSR*Average of Interest Rate fields In Case of Term Loan System Use Following Formula Y=(NOI/12*Min.DSR)((1-((1+Average of Interest rate fields/12)^ - (Amortization Term*12)))/ (Avg of Interest rate fields/12 ))

Avg of Interest Rate Fields= Is the Avg of the Minimum Interest and Maximum rate fields

General Information

| | |
|---|---|
| Borrower Location: | United States |
| Relation to Borrower: | Self |
| Borrower Name: | Kanchan Sharma |
| Borrower Email: | test@test.in |
| Application Title: | Test_loan |
| Legal Name Of Business: | test business |
| Industry: | |
| Other Services (except Public Administration)- | Drycleaning and Laundry Services |
| Physical Business Address: | 1 business add |
| Country: | United States     State:     New York |
| City: | BABYLON     Zip Code:     32121 |
| Number of Employees: | 1200 |
| Mobile Phone: | 2133213213 |
| Years in Operation: | 9 Years and 0 Months |
| Business Legal Structure: | Sole Proprietorship |
| Relation to Company: | Owner |
| Average Annual Revenue: | 1000000000 |
| Annual business operating expenses: | 1200 |

FIG. 72A

| | |
|---|---|
| bank for a loan | Yes |
| Reason for not getting a loan | test |
| Is this a franchise? | No |
| How do you plan on using the loan? | Buying Real-Estate,Online Advertising |
| Business's assets: | Real Estate,Accounts Receivables |

Messages

Messages (0)

Shared Documents

DECISION MAKING ENGINE AND BUSINESS ANALYSIS TOOLS FOR SMALL BUSINESS CREDIT PRODUCT OFFERINGS

CROSS-REFERENCE TO RELATED APPLICATIONS/PRIORITY CLAIM

The present application claims the priority benefit of provisional U.S. Patent Application Ser. No. 61/503,782, filed on Jul. 1, 2011, the entirety of which is hereby incorporated by reference.

FIELD OF THE INVENTION

The present invention generally relates to tools, strategies, and techniques for matching the needs of small business owners with the credit products offered by lenders such as banking institutions, alternative lenders, and private money lenders. In certain embodiments, the invention relates to matching the funding requirements of small business owners with credit products offered by multiple banks and facilitating an intelligent comparison of the multiple credit options.

BACKGROUND

Traditionally, small business owners have lacked the time or the bandwidth to compare financing and credit options to determine which lending products best suit their needs. In addition, information about lenders and their credit products is typically not consolidated at one web site, in one book, or at another central location for ready access and review by the prospective borrower. Often the only solution available to small business owners is to talk to retail bankers at the branch level who may not be well versed with the needs of small businesses and the relevant aspects of the industries in which they do business. In addition, such branch bankers may not be able or willing to advise small business owners on suitable products available from other banks. This disconnect often hampers the ability of small business owners to obtain access to credit products at competitive rates.

Another issue arises when small business owners do not qualify for credit products. Lending institutions may identify an owner as a credit risk and there may be no way for the owner to become more creditworthy. Also, for lenders it can be difficult to reach out to small business owners in a targeted way without investing substantial marketing dollars. For example, a bank may spend a significant percentage of the loan amount for a single transaction just in the form of marketing costs.

It can be seen that problems faced by small business owners may include lack of financial education, mistrust of financial institutions, lack of available information about credit products at a single point of access, and lack of document management systems to help collect and transmit required loan documents. On the other side of the transaction, issues experienced by lenders may include high marketing costs, lack of availability of a platform that consolidates products from other lenders for comparison, lack of tools for matching businesses to credit needs based on underwriting criteria, and lack of business analysis tools for monitoring the creditworthiness of their small business clients.

What are needed, therefore, are enhanced tools for analyzing the financial condition of small business borrowers and for matching appropriate credit products or credit arrangements between small business owners and lenders such as banking institutions, alternative lenders, and private money lenders.

BRIEF DESCRIPTION OF THE FIGURES

The utility of the embodiments of the invention will be readily appreciated and understood from consideration of the following description of the embodiments of the invention when viewed in connection with the accompanying drawings, wherein:

FIGS. 2 through 7B include examples of screen displays associated with data collection, analysis, and processing aspects of a web-based embodiment of a decision making engine;

FIGS. 8A through 8C include a data table representation of data that may be communicated to a decision making engine;

FIGS. 15 through 17 include examples of screen displays associated with data collection, analysis, and processing aspects of a web-based embodiment of a decision making engine, including certain operational aspects of a business analysis tool;

FIG. 18 includes a data table representation of data that may be used in connection with the operation of a business analysis tool;

FIGS. 21 and 22 include data table representations of data that may be used in connection with the operation of a business analysis tool;

FIG. 24 includes a data table representation of data that may be used in connection with the operation of a business analysis tool;

FIG. 25 includes an example of a screen display associated with certain operational aspects of a business analysis tool;

FIG. 26 includes a data table representation of data that may be used in connection with the operation of a business analysis tool;

FIGS. 32 and 33 include a use case presented in table format which includes examples of matching processes performed by a decision making engine;

FIGS. 36 through 51 include examples of screen displays associated with data collection, analysis, and processing aspects of a web-based embodiment of a decision making engine;

DESCRIPTION

Figure 1:
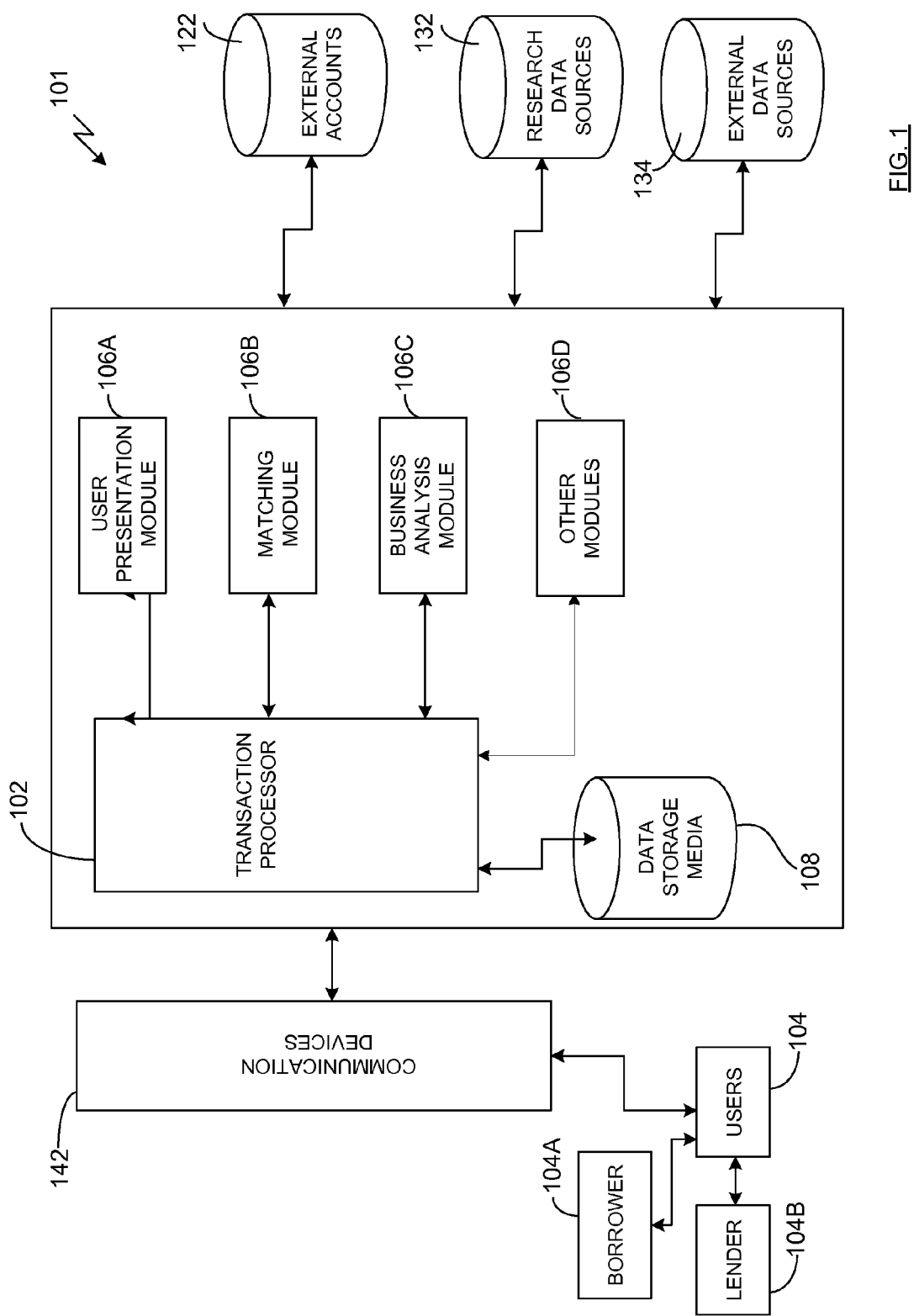
FIG. 1 schematically illustrates an example of a decision making engine and its associated computer system architecture as employed in an operative environment.

In various embodiments, the present invention can be used to bridge the gap between small business owners and lenders by matching the credit needs of small business owners with lender credit products. Aspects of the present invention may be used to match borrowers to best credit solutions and to provide electronic updates for the matched and unmatched borrowers. Also, certain system embodiments can be employed to guide borrowers to apply for micro-loans when creditworthiness is an issue, which can improve their credit ratings. This can be accomplished by performing a detailed analysis of personal and business credit scores and recommending appropriate service providers who can improve their scores and creditworthiness.

In certain embodiments, aspects of the present invention may permit financial institutions to establish their own credit product campaigns while centrally managing and tracking customer leads. A lender dashboard may be provided which includes a combination of lead management and work flow tools that allow bankers to direct leads to loan officers and to track the progress of leads while collecting necessary supporting documentation.

In various embodiments, the invention includes a decision making engine that provides a single point of access for multiple lenders and their products. The engine can be programmed to allow small business owners to input their requirements and generate results based on those requirements. The engine may be programmed with matchmaking technology that can be used to pre-qualify prospects for banks and other credit providers. Accordingly, the decision making engine can integrate business logic with technology to provide intelligent results, including allowing small business owners to store documents, share technology with third party providers, and integrate business credit and personal credit modules to allow banks to obtain pre-qualified leads.

In various embodiments, the present invention provides small business owners with the capacity to compare different financial products matched to their unique requirements. The present invention can provide an online decision making engine that is capable of determining the specific requirements of the small business owners and match it against the lenders' underwriting criteria to determine the best product options available to the owners. The decision making engine may be programmed to generate results for multiple products from the same lender and multiple products from multiple lenders, which is unique within the industry. For banks, this provides a cost effective mechanism for obtaining pre-qualified leads for small business owners. An online repository can be provided to improve the matchmaking and decisioning process. Small business owners can store financial records and other documents in the repository and share this information with banks and other service providers.

Aspects of the decision making engine may be programmed to facilitate ranking credit products based on certain qualitative and quantitative parameters. It can be considered a two-way ranking system because it can take into account both the banks' underwriting criteria as well as borrowers' preferences. The ranking aspects of the engine are dynamic because they can change product rankings, for example, based on borrower feedback about actual product or service performance versus product or service characteristics as promised by lending institutions.

Information entered by the business owners can be processed with a business analysis tool (at times referred to as a "BizAnalyzer" tool) which helps businesses evaluate the probability of being approved for different loan products. As described below in more detail, various embodiments of a business analysis tool can provide borrowers and lenders with a platform for benchmarking the risk profile of a business against the lending criteria for different financial products. Based on a weighted formula of recent underwriting trends, the business analysis tool can generate an overall score (e.g., on a scale from 0-100%) indicative of the level of risk that a business presents to a potential lender. The assessment performed by the business analysis tool can be subdivided into one or more of the following sections: personal credit score, debt-to-income ratio, time in business, industry risk, and/or corporate risk, among other potential financial or risk measurements. Data regarding these different financial and risk measurements can be updated through real-time or near real-time data communicated to the decision making engine, such as from one or more external accounts or research data sources, for example. In certain embodiments, the business analysis tool can employ a formula (e.g., an average or weighted average) to determine recommendations and recommended service providers on the basis of risk factors that can be characterized as low, medium, or high, for example, as a function of the risk score calculation. For example, the business analysis tool can recommend specific service providers that may help a small business owner take the steps necessary to decrease risk and thereby increase the chances of getting a loan. In certain embodiments, the business analysis tool can create a snapshot of a borrower's risk level and how the owner can decrease that risk to a potential lender. Various embodiments of the present invention provide a business analysis tool that operates in an environment that is easy for users to navigate and to obtain access to the kinds of information that they need to evaluate borrowing and lending opportunities.

In one example of the operation of an embodiment of the invention, a small business owner looking to apply for financing connects to a web site and enters business information, financial information, and a credit profile. The owner then selects the most important reason for seeking financing and preference among criteria such as interest rate, higher loan amount, or processing speed, for example, among other possible criteria. Once this information has been entered, the decision making engine can automatically generate results for lending options compatible with the small business owners' needs and provide multiple options per lender. In various embodiments, small business owners can login to the decision making engine to create user profiles, submit lending criteria, and generate results based on particular credit or capital needs. The engine may also rank the lending products based on the criteria selected by borrowers, the lenders' underwriting criteria, and/or performance factors based on stated product criteria such as interest rates and processing times. The matching can be programmed and executed as two-way matching, wherein one or more of the preferences of the borrowers and matching underwriting criteria of the lenders is assigned a weighted mean, leading to optional ranking of different available choices. The engine may also adjust the rankings by comparing a number of key variables such as interest rates and processing time against the actual performance of the lenders. Also, new products introduced by existing lenders or new lenders may be automatically matched with the existing loan applications. The system may also provide real time electronic updates to borrowers as well as lending institutions.

FIG. 1 illustrates various aspects of an example of a decision making engine 101 configured in accordance with certain embodiments of the invention. The engine 101 may include one or more transaction processors 102 which may be programmed to process financial information, risk factor data, borrower data, lender data, and a variety of other information related to applying for or matching credit products such as commercial loans, for example. In certain embodiments, the transaction processor 102 may include a web server architecture, for example, or another computer system capable of processing data and serving screen displays and other user interface tools to various users 104. The users 104 may include representatives of a variety of borrowers 104A (e.g., small business owners) or lenders 104B (e.g., banks or lending institutions), for example.

The transaction processor 102 may be operatively associated with one or more modules 106A-106D that perform various functions within the decision making engine 101. In various embodiments, the modules 106A-106D may include software, hardware, firmware, and/or other types of computer-readable instructions or devices programmed for executing various functions or tools that can be executed by the engine 101. For example, a user presentation module 106A can be programmed to display different screen displays, electronic notifications, or user interface tools that permit users 104 to issue commands to the engine 101 or to access data stored within the engine 101. In another example, a matching module 106B can be programmed to match credit product requirements and criteria of a borrower 104A with corresponding suitable requirements and criteria of one or more lenders 104B. A business analysis module 106C can be programmed to analyze risk factors and other business information associated with a business seeking a credit product. It can be appreciated that various other modules 106D may also be programmed to perform various functions or provide user interface tools within the engine 101. Various embodiments of the decision making engine 101 can be programmed to match the needs of small business owners or other borrowers 104A with various types of credit products or credit arrangements offered by different lenders 104B such as banks or other lending institutions. For example, the engine 101 may be programmed for matching the requirements of small business owners 104A with the credit products offered by multiple banks 104B and comparing the multiple credit options.

In various embodiments, the decision making engine 101 may include one or more data storage media 108 operatively associated with the transaction processor 102. The data storage media 108 may include data and other information associated with one or more user 104 accounts. Examples of data that may be stored in the data storage media 108 include data related to credit products, supporting document for applying for credit products, risk factor data, and many other kinds of financial information or data related to matching credit products between borrowers and lenders. The engine 101 may also communicate with one or more external accounts 122 to receive or transmit data. One or more of the external accounts 122 may be financial accounts associated with the users 104, for example. The engine 101 may also be configured for communication with one or more research data sources 132. For example, one or more of the research data sources 132 may include a connection to a commercial credit score entity or to a source for loan documentation. In certain embodiments, one or more external data sources 134 may be operatively associated with the engine 101, such as to provide a source of accounting data or other financial information associated with a user 104. For example, one such external data source 134 may include a data communication link to a "QuickBooks" account held by the user 104. In various embodiments, the users 104 may communicate or interact with the engine 101 through a variety of communication devices 142. Examples of possible communication devices 142 include personal computers (e.g., laptops, notebooks, desktops, etc.), mobile phones, smart phones, personal data devices, and many other devices which can connect to the engine 101 through a wireless or wireline connection (e.g., Internet, intranet, or another type of connection). For example, the engine 101 may be programmed to communicate with users 104 by texting, e-mail communication, or other like messaging systems.

Figure 2:
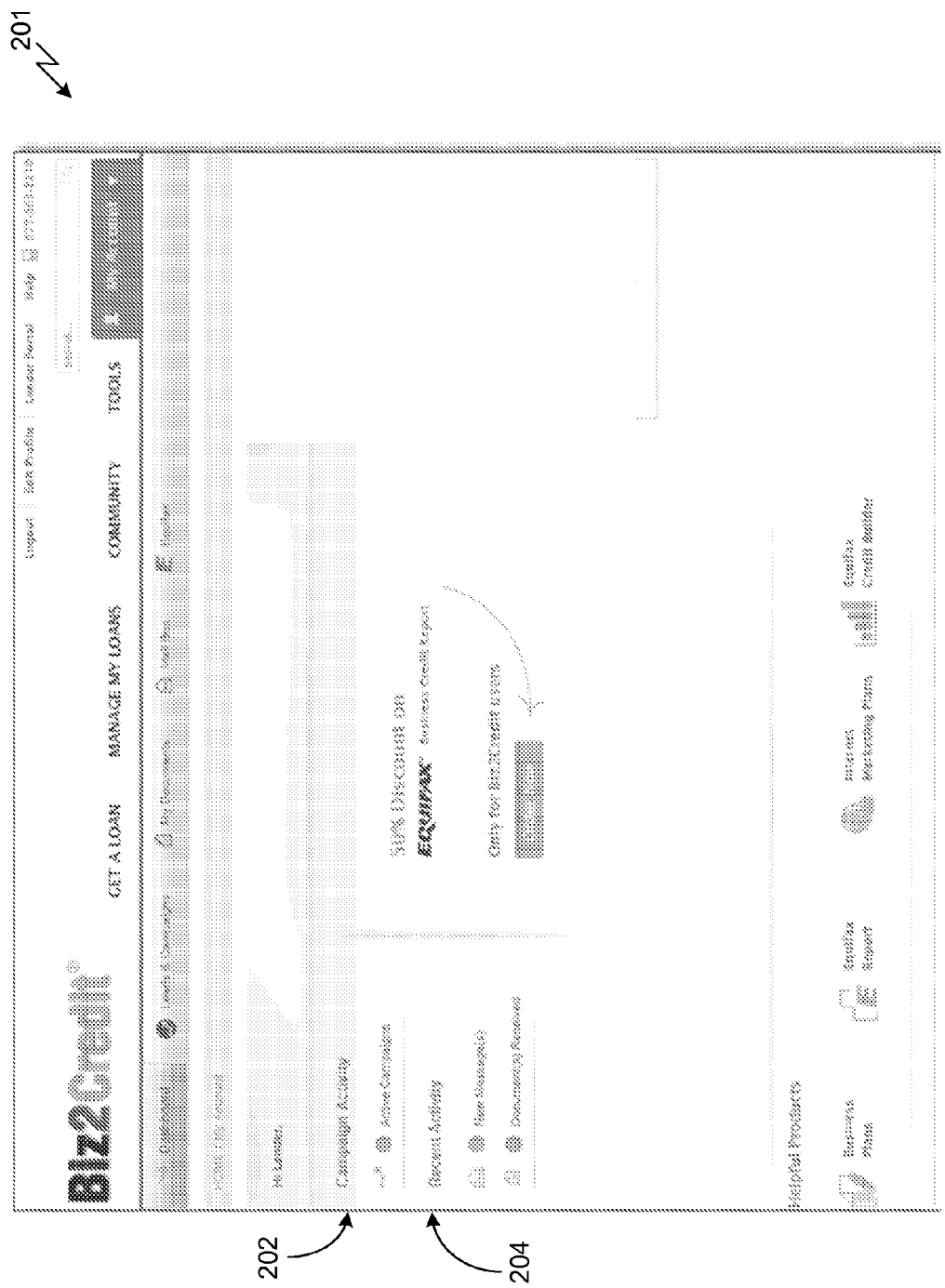

FIG. 2 illustrates an example of a lender dashboard 201 that may be presented to one or more lenders 104B through the decision making engine 101, such as by operation of the user presentation module 106A. As shown, the lender dashboard 201 includes a campaign activity section 202 and a recent activity section 204. The campaign activity section 202 may include data related to one or more product "campaigns" currently conducted by the lender 104B, wherein the campaign includes one or more different types of credit product offerings such as loans, for example. The recent activity section 204 includes indications of messages and documents received from borrowers 104A, for example, in connection with credit product offerings extended by the lender 104B. The lender dashboard 201 can be considered a combination of the lead management and work flow tools that facilitate sourcing leads to loan officers, track leads that have been assigned, or attaching documentation, among other borrowing or lending activity.

Figure 3:
Figure 4:
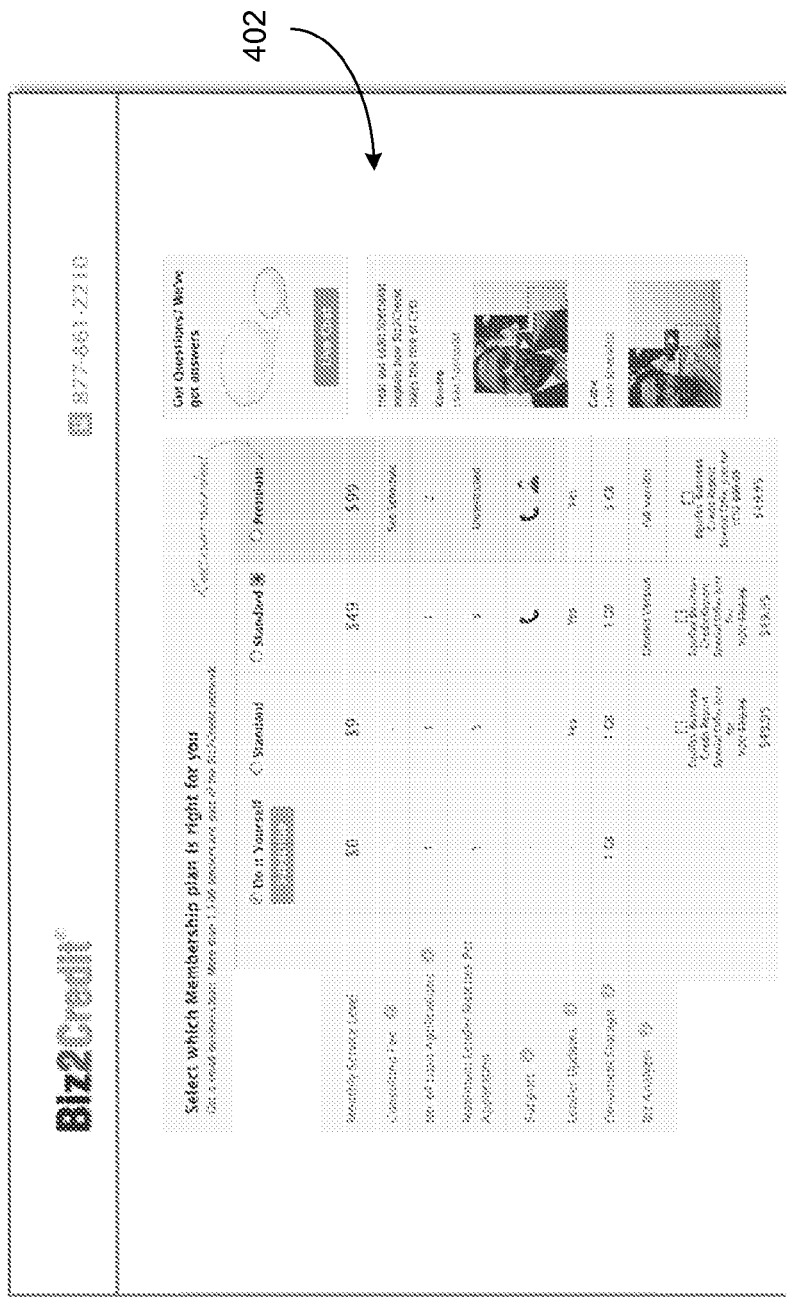
Figure 5:
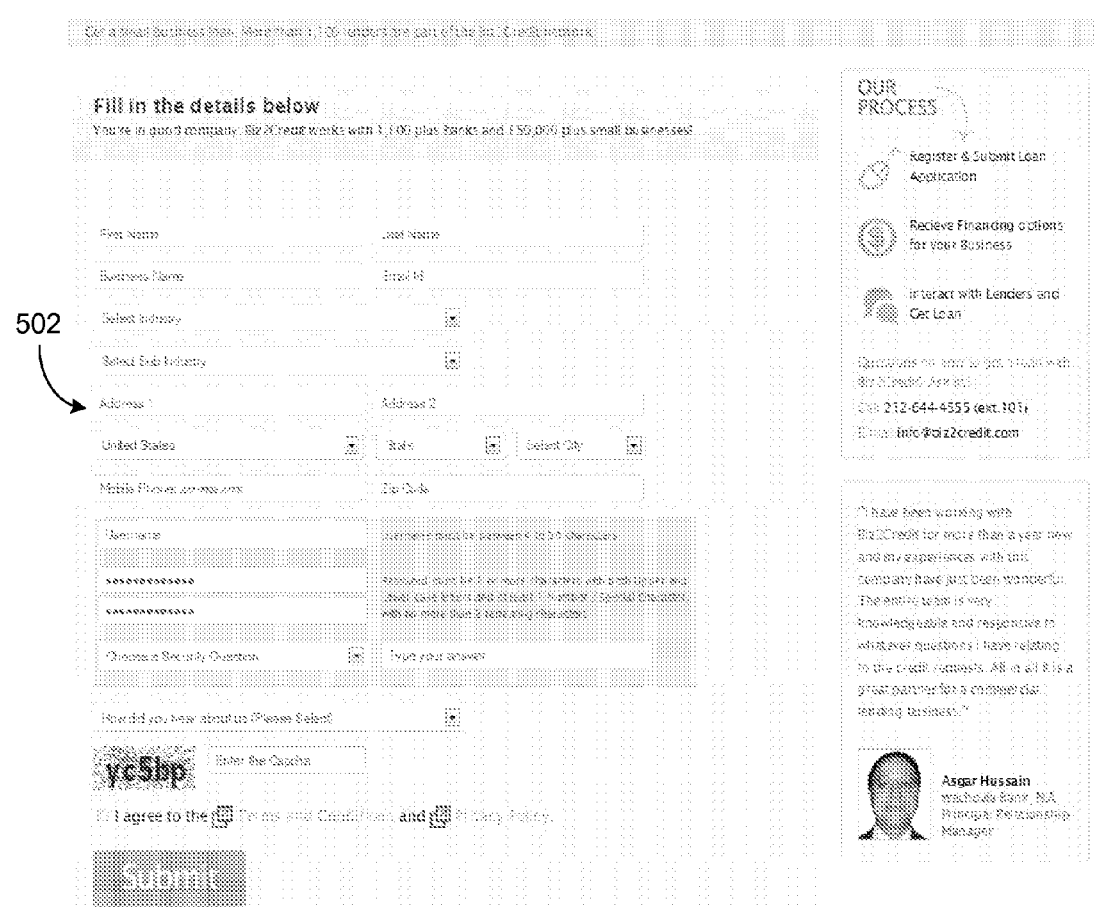

FIG. 3 illustrates an example of a web-based screen display 302 that may be presented to potential users 104 seeking to access the services provided by the decision making engine 101. The screen display 302 facilitates the user 104 obtaining a user name, password, and other standard log-in data that are needed to access the engine 101. FIG. 4 includes an example of a screen display 402 listing various subscription plans that a user 104 may undertake to access the services of the engine 101. FIG. 5 illustrates a sample screen display 502 that can be used to collect data associated with the 104, such as user 104 name and address, contact information, and log-in credentials.

Figure 6:
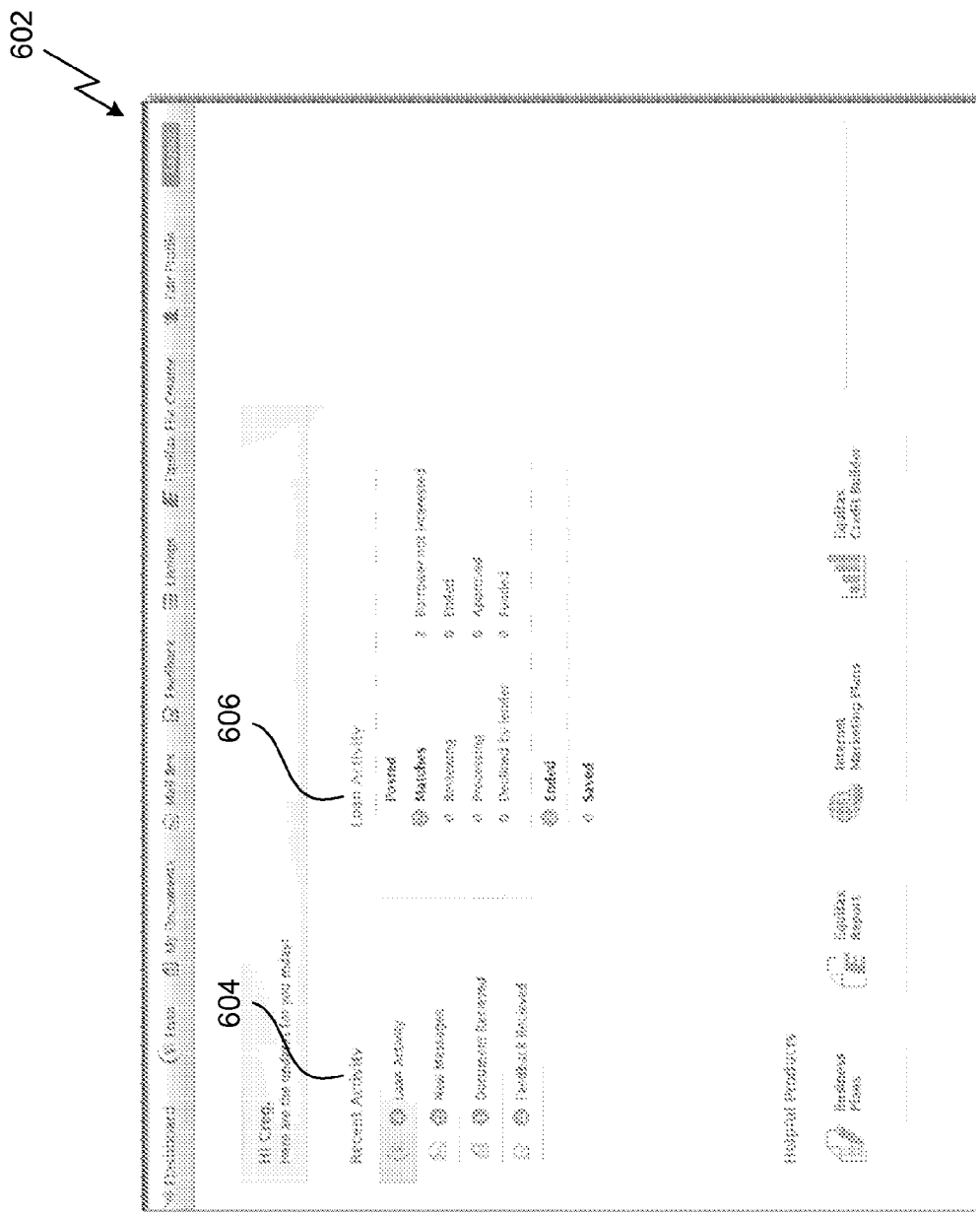

FIG. 6 includes an example of a dashboard screen display 602 that may be displayed in connection with processing performed by the engine 101. The dashboard 602 includes a recent activity section 604 and a loan activity section 606. The recent activity section 604 provides data associated with credit product offering applications in process, correspondence or other messages, documents received (such as documents required to close a loan), and other feedback about the borrowing/lending process. The loan activity section 606 provides a summary of statistics indicative of loan requests that have been matched, approved, declined, or which are still in process, among other indicators.

Figure 7A:
Figure 7B:
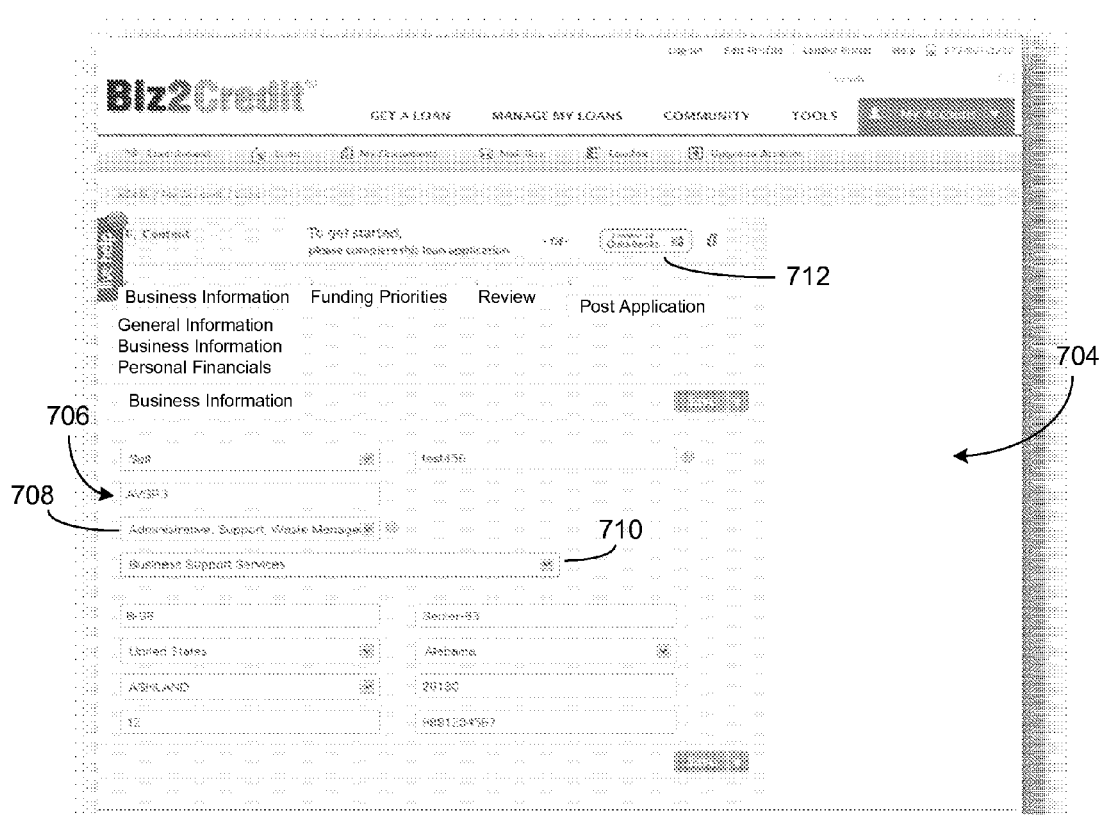
Figure 9:
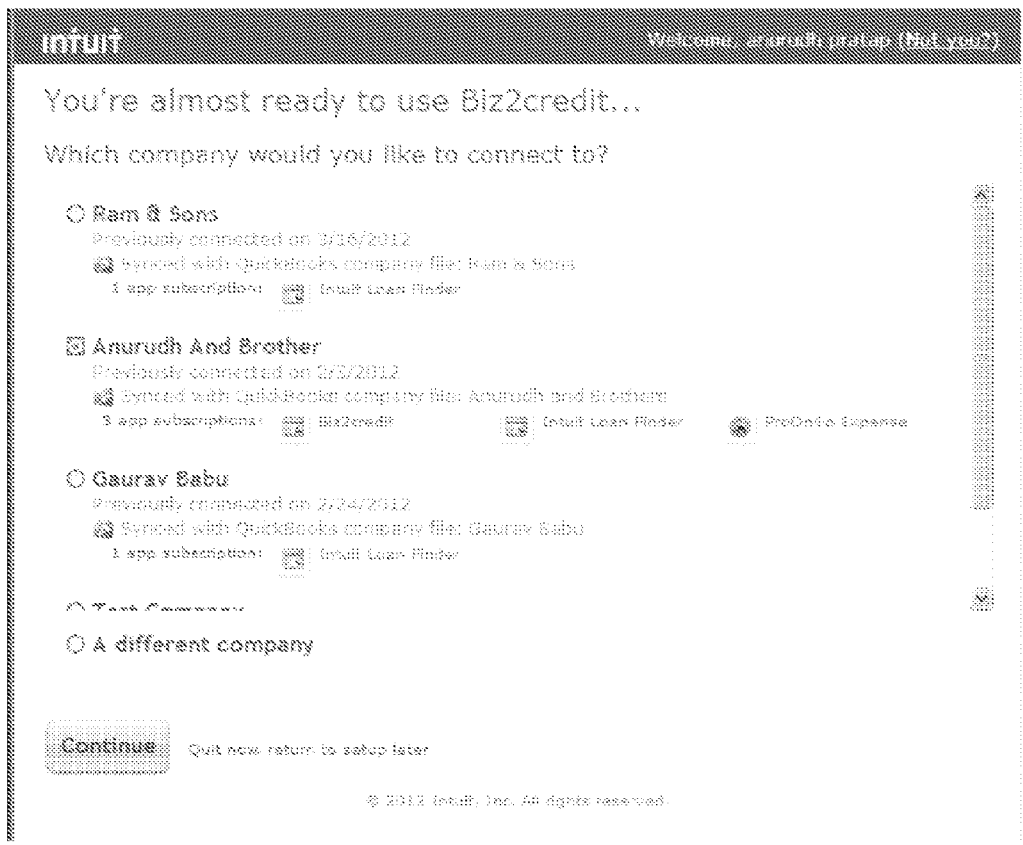
FIGS. 9 through 13 include examples of screen displays associated with data collection, analysis, and processing aspects of a web-based embodiment of a decision making engine.

FIGS. 7A and 7B include examples of screen displays 702, 704 that can be used for collecting basic business information about a borrower 104A, for example, that can be processed through the decision making engine 101. As shown, such information may include company name 706 and address, industry type 708, and the nature of products or services 710 offered by the company. In certain embodiments, a user 104 may be able to import financial data, including financial data or accounting data, from an external data source 134 such as a "QuickBooks" account, for example. If the user 104 clicks on a "Connect to QuickBooks" button 712, for example, then an authentication process may be initiated wherein the user 104 authorizes the engine 101 to access and/or import financial data from a "QuickBooks" account 134. As shown in FIGS. 8A-8C, financial data pulled from the "QuickBooks" account 134 may be in raw format. In certain embodiments, based on applicable loan application fields, for example, the raw data may be processed into derived data to be used for the loan application. The data tables of FIGS. 8A-8C include examples of data that may be communicated from the "QuickBooks" account 134 to the engine 101. FIG. 9 illustrates an example of a screen display that may be employed by a user 104 to select a "QuickBooks" account for accessing or importing financial data or accounting data.

Figure 10C:
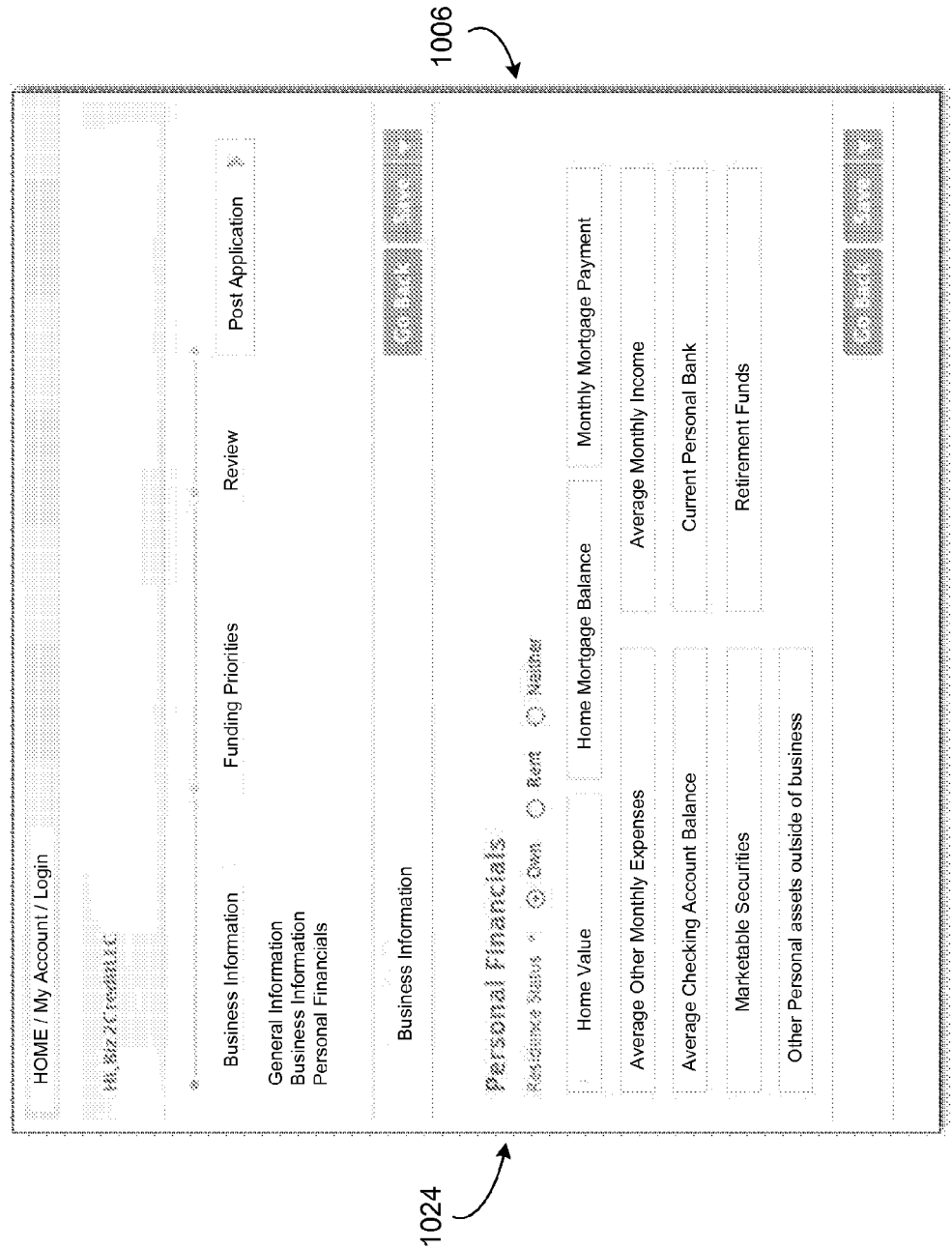

FIGS. 10A-10C include examples of additional screen displays 1002, 1004, 1006 that can be employed to collect data about a given business user 104. For example, a data entry section 1008 can be provided for collecting data such as the age of the business, legal entity type, revenue, operating expenses, debt information, credit score information, partnership data, and/or franchise data, among others. This section 1008 can also be used to specify an acceptable range for a credit product offering, such as the minimum and maximum amount desired for a loan. Another data entry section 1010 can be provided for indicating the purpose for which the borrower 104A is seeking funds. In another example, a data entry section 1012 can be provided for indicating more details of the types of assets of the business associated with the borrower 104A. As shown in FIG. 10B, a real estate section 1022 can be provided for specifying details about real estate leased, maintained or owned by the business. In another example, a personal financials section 1024 can be provided for collecting details about the personal income, debts, and assets (e.g., securities) of the borrower 104A. It can be appreciated that one or more assets of the business or personal assets of the borrower 104A may be applied as collateral for a loan obligation, for example.

Figure 11:
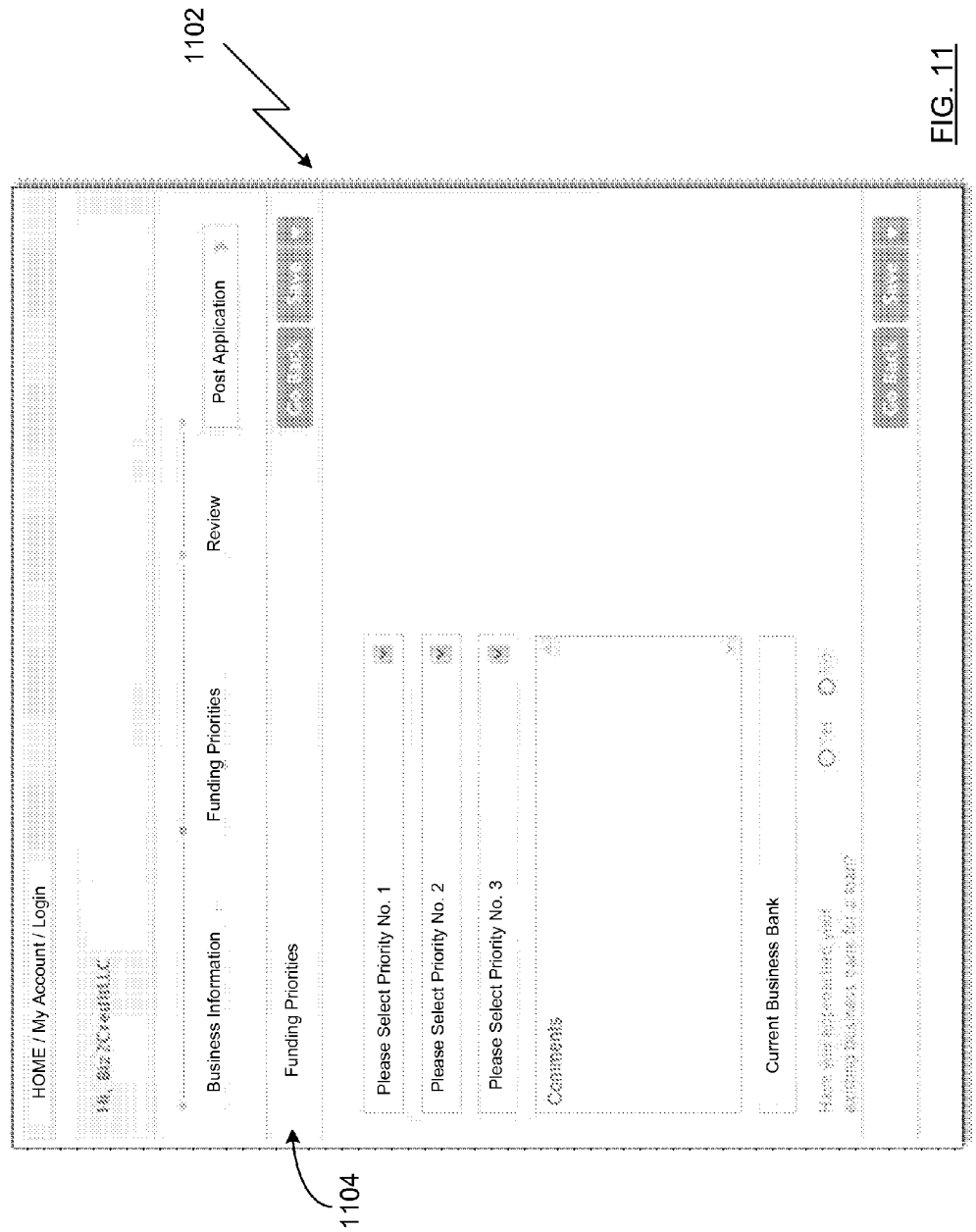
Figure 12:
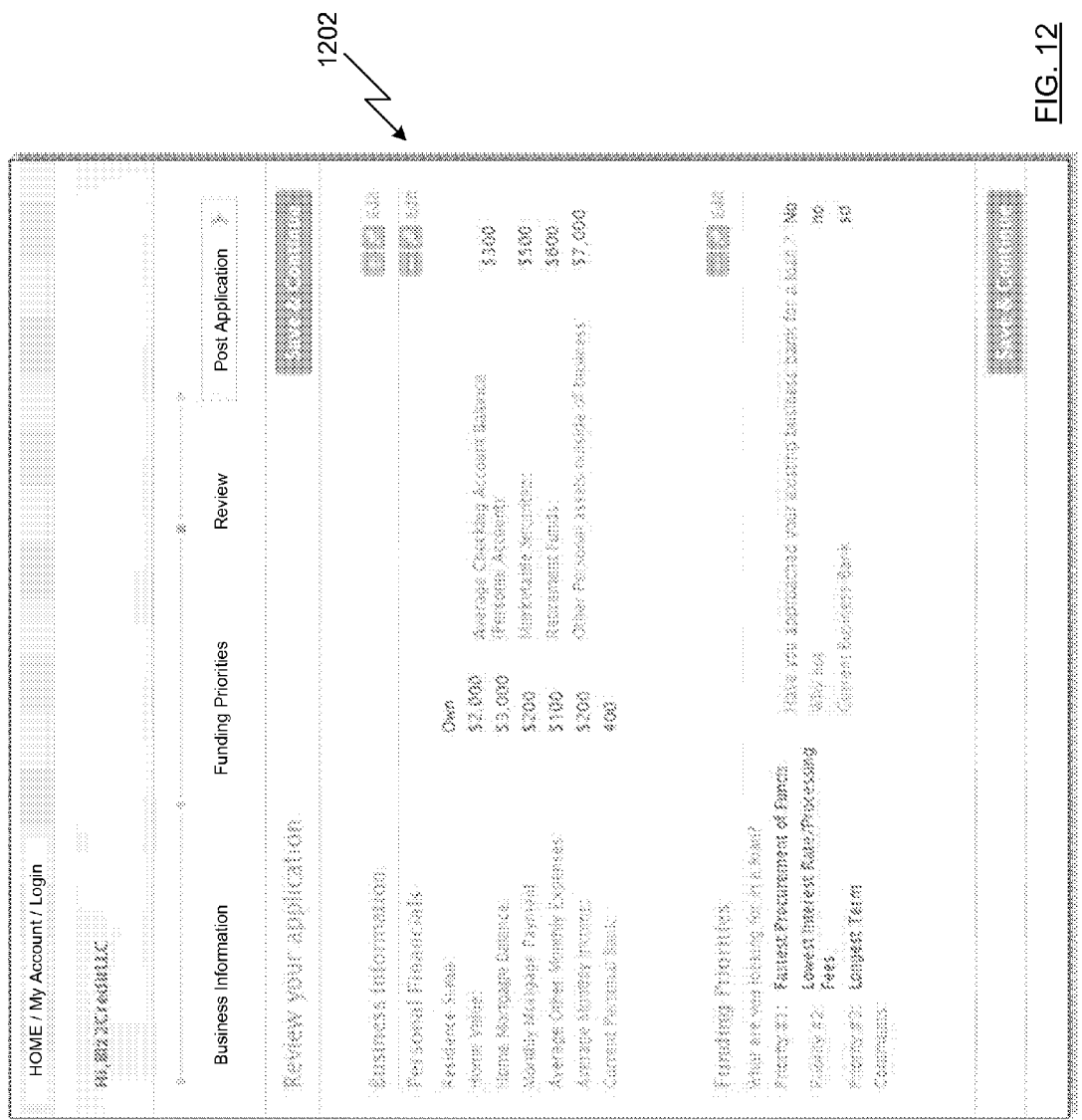

FIG. 11 illustrates a screen display 1102 including a funding priorities section 1104. In the funding priorities section 1104 the borrower 104A can specify one or more criteria that can be used by the decision making engine 101, among other criteria, to match an appropriate credit product offering with the borrower 104A. Examples of funding priorities may include speed of procurement of funds or loan closing, interest rate, processing fees, documentation required, or other factors. FIG. 12 shows a summary screen display 1202 that can be used as a confirmation screen prior to acceptance by the borrower 104A of certain terms and conditions attached to seeking a credit product offering through the engine 101.

After an application has been submitted by a borrower 104A, the decision making engine 101 can then process the data associated with the borrower 104A in an attempt to match the borrower 104A with one or more credit product offerings. For example, the engine 101 may match the requirements of campaigns established by one or more lenders 104B within the engine 101 against one or more criteria of the borrower 104A to identify one or more matching credit product offerings. Examples of borrower 104A criteria may include various financial data, risk factor data, business asset information, business debt information, funding priorities, loan amount minimum or maximum, or various other factors, as described herein. The matching may involve a best fit approach, for example, that identifies the lender 104B campaign that most closely matches the requirements and status of a given borrower 104A. In one example, a credit product offering may be matched with a borrower 104A if at least a predetermined number of specified criteria can be correlated between the borrower 104A and at least one lender 104B.

Figure 13:
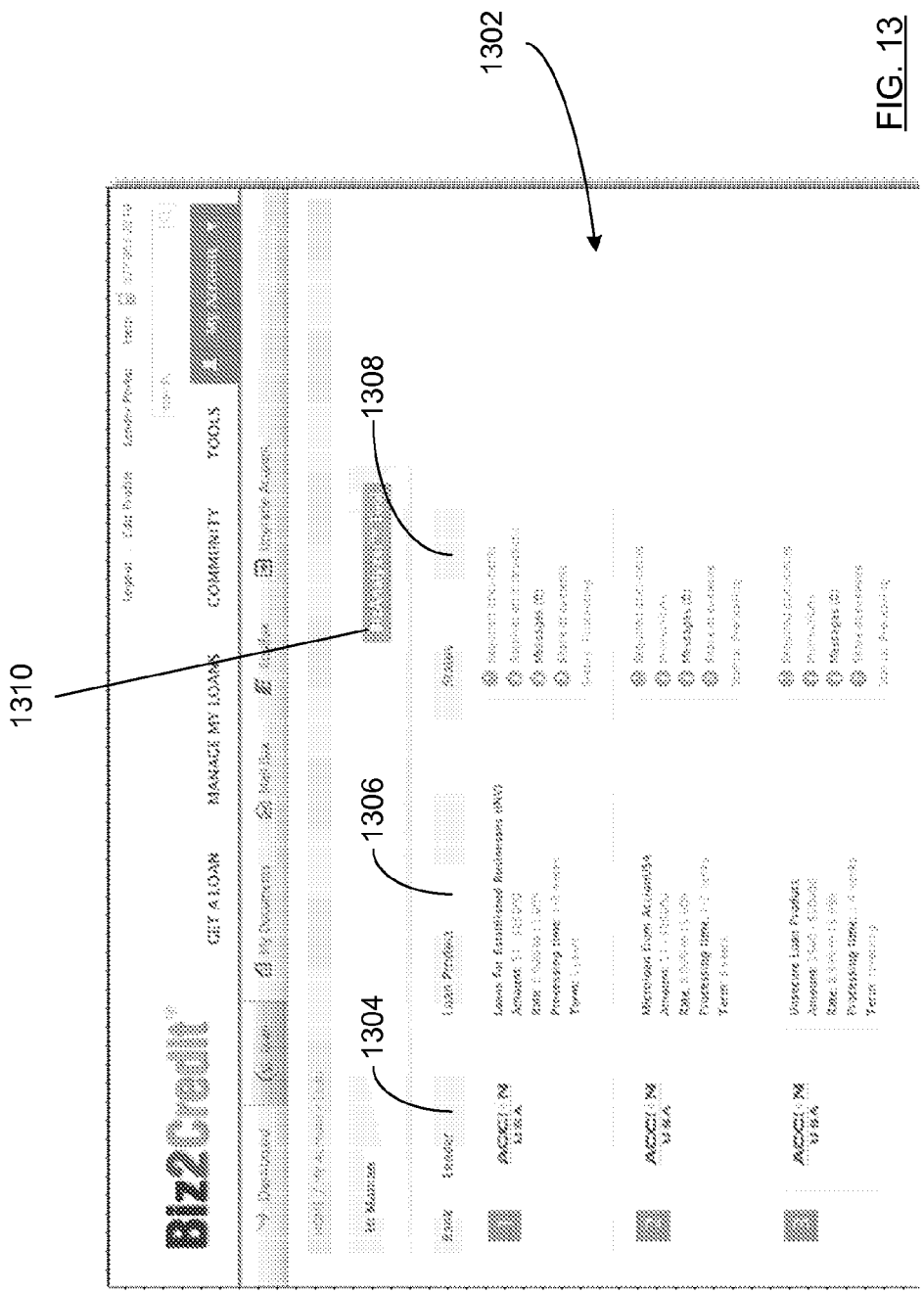
Figure 14:
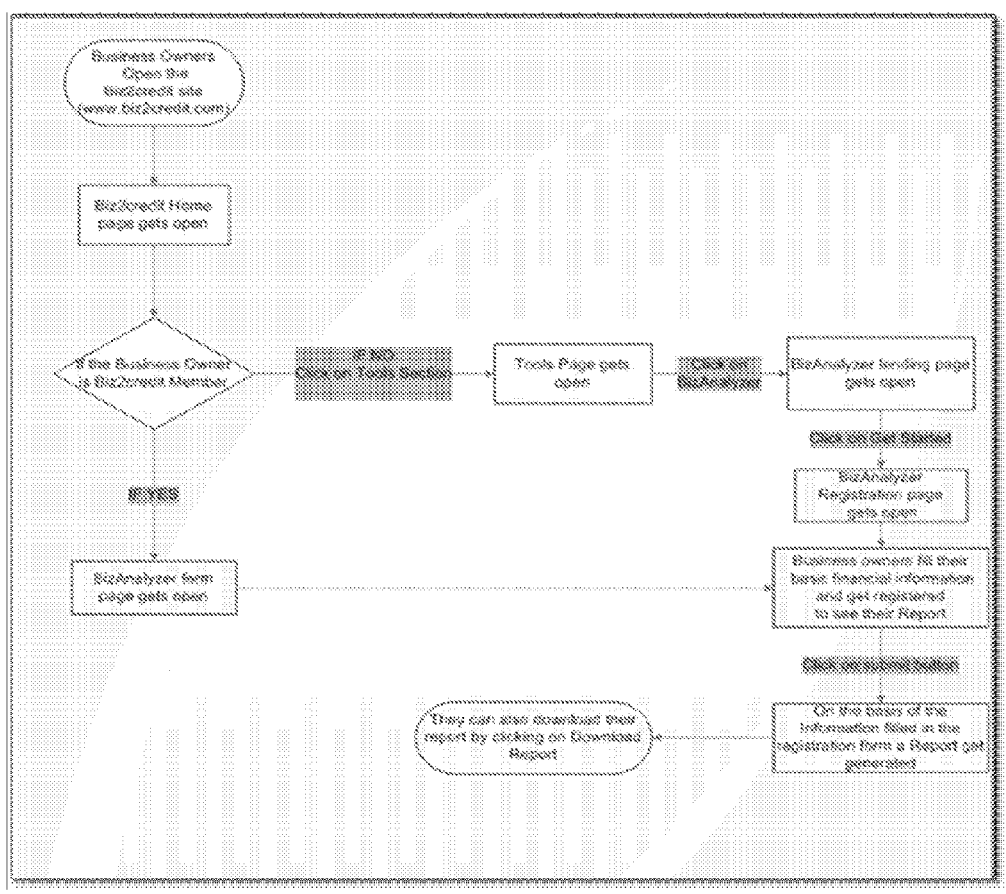
FIG. 14 includes a process flow diagram illustrating an example of accessing and using a decision making engine and certain associated analysis tools.

FIG. 13 includes an example of a screen display 1302 that provides three credit product offerings that have been matched to the criteria and requirements of a given borrower 104A. As shown, each credit product offering may include a lender name 1304, loan product details 1306, and status data 1308. The loan product details 1304 may include, for example, a type of loan (e.g., unsecured, secured, micro loan, etc.), a loan amount, a rate, processing time, and term. The status data 1308 may include, for example, required documentation, instructions, or correspondence related to the credit product offering. After match results have been displayed, relevant risk factors associated with the borrower 104A and/or the credit product offering itself may be processed through the business analysis module 106C of the decision making engine 101. For example, a user 104 may press a "Biz Analyzer Tool" button 1310 included in the screen display 1302. The "Biz Analyzer Tool" button 1310 can be programmed to initiate processing of the business analysis module 106C and presenting displays wherein users 104 are able to review a consolidated business analysis report for different loans or credit product offerings. The report may be generated to include information such as opted loan amount, risk factors, and/or loan type involving factors such as secured or unsecured loan, real estate, account receivables, inventory, and/or equipment, among others. FIG. 14 includes a process flow diagram illustrating certain aspects of a user 104 accessing the decision making engine 101 (e.g., through a "www.biz2credit.com" web site) to use the business analysis tool and to initiate processing of the business analysis module 106C.

Figure 15:
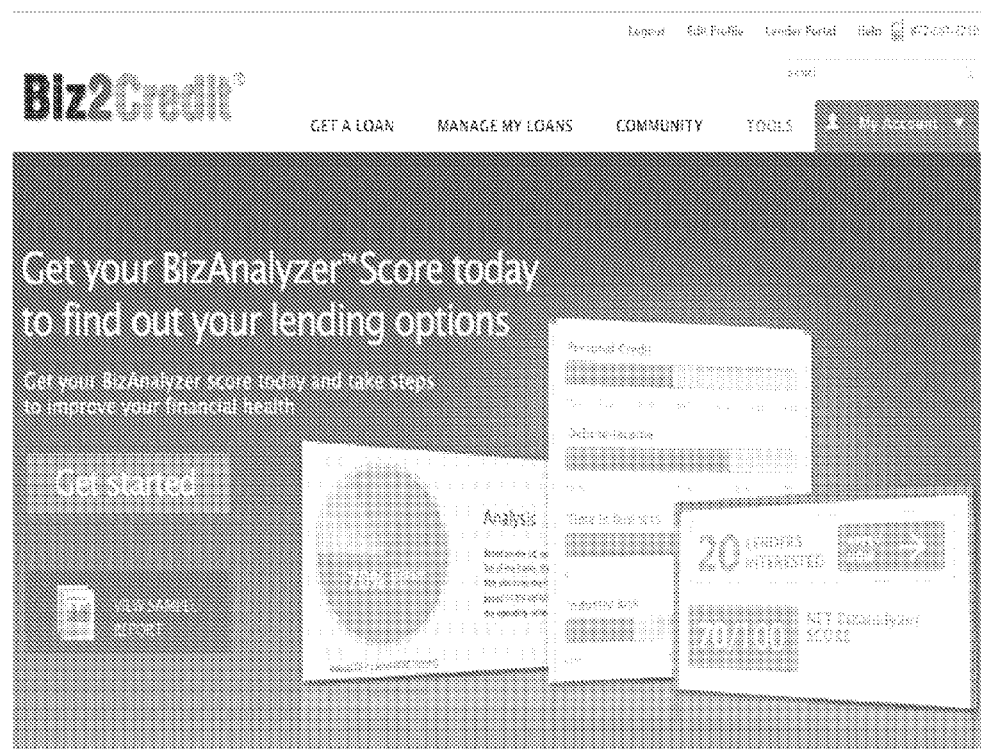
Figure 16:
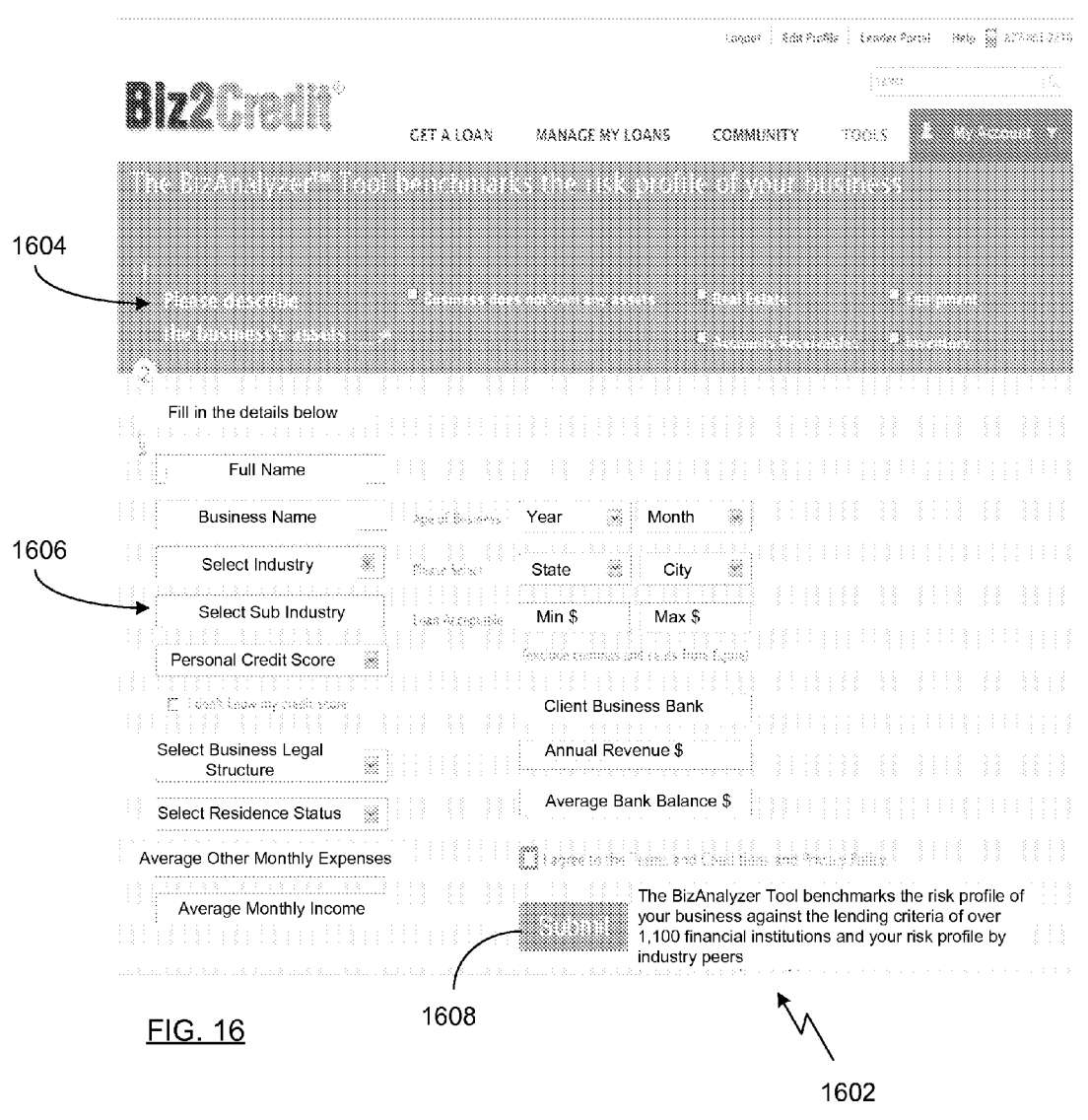

FIG. 15 includes an example of a portal screen display 1502 that provides access for a user 104 to the business analysis tool. FIG. 16 illustrates an example of a screen display 1602 that can be used to enter information about the business associated with a borrower 104A, for example. The screen display 1602 may be programmed to receive information including data associated with assets 1604 of the business, for example, and/or data associated with certain risk factors 1606 connected to the business. Examples of asset information 1604 include real estate, equipment, accounts receivable, inventory, or an indication of no assets, among other possible asset data. Examples of risk factors include the industry or sub-industry in which the business operates, the age of the business, a loan amount range that would be acceptable to the borrower 104A, a personal credit score associated with the borrower 104A, a business structure or entity type associated with the business, revenue data, income data, or expense data, among other possible risk factors.

In addition to data entered in the screen display 1602, the decision making engine 101 may also access and process data previously entered or stored in one or more of the data storage media 108. In certain embodiments, risk factor data or other information may be communicated to the engine 101 for use by the business analysis module 106C by one or more of the external data sources 134. Data may be communicated to the engine 101 on a periodic basis or through real-time or near real-time data feeds or updates. For example, credit score data may be communicated to the engine 101 on a periodic basis, automatically when the business analysis tool is accessed, and/or in response to an update to other risk factor data. The business analysis tool may employ data derived from information entered into the screen display 1602 and/or data derived from the engine 101 in executing its analysis. A user 104 may select a "Submit" button 1608 to initiate the processing of the business analysis tool and execution in connection with the engine 101 to match various credit product offerings in connection with the business information and/or risk factor information.

Figure 17:
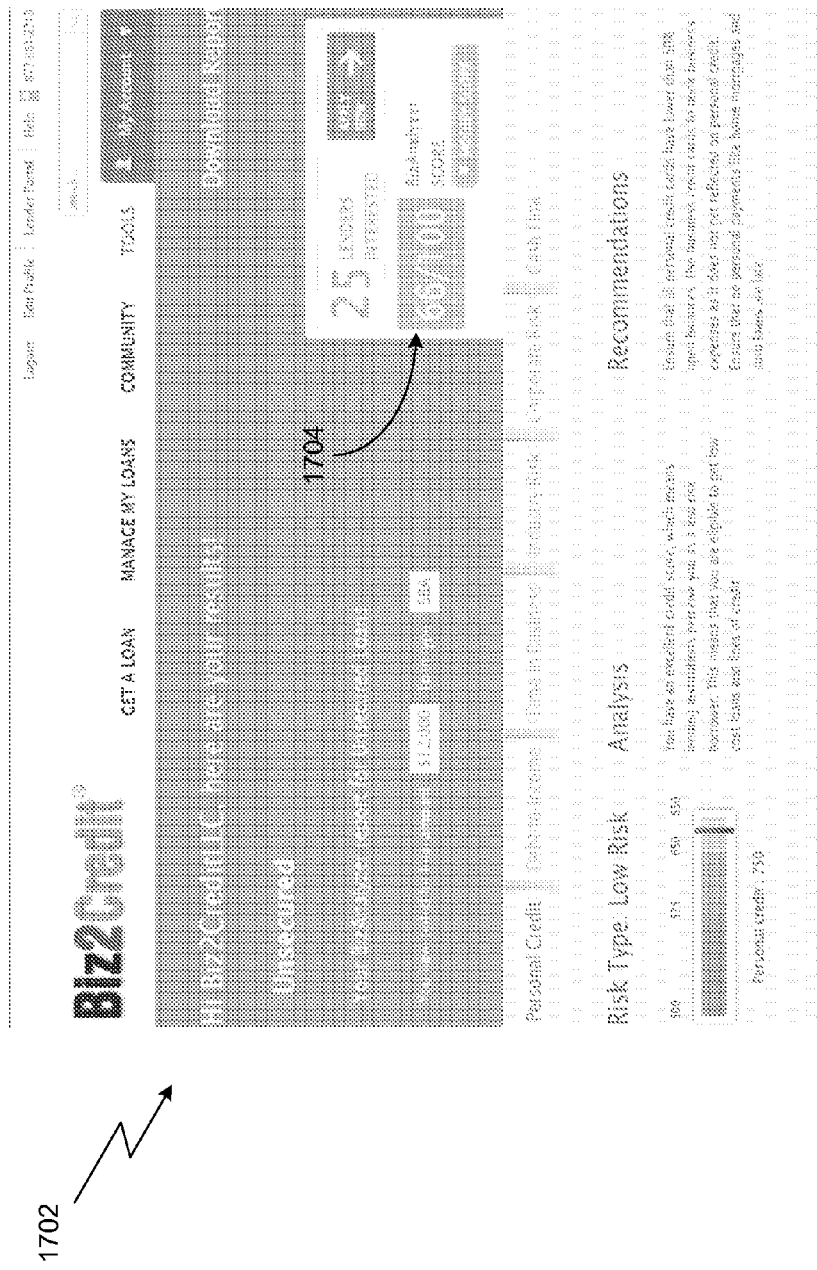

FIG. 17 includes a screen display 1702 summarizing the results of the processing of the business analysis module 106C in response to the business and risk factor data. As shown in this example, the user 104 has selected an SBA type loan, unsecured, in the amount of $12,000. After processing the risk factor information, the business analysis tool has calculated an overall risk score 1704 of "66/100" for the business. In this example, a higher overall risk score generally indicates a more attractive borrower 104A to prospective lenders 104B; whereas a lower overall risk score generally indicates a less attractive borrower 104A to prospective lenders 104B. As shown, the business analysis tool has also determined through its processing that 25 lenders would be interested in offering a credit product to the borrower 104A under this set of circumstances. The overall risk score may represent an aggregate score of separate risk analysis sub-sections such as personal credit, debt-to-income ("DTI"), time in business, industry risk, corporate risk, and/or cash flow, among other potential sub-sections. In various embodiments, the overall risk score may be calculated by the engine 101 as an average or weighted average of the individual risk scores associated with each sub-section.

Referring again to FIG. 17, a personal credit section 1706 describes analysis of the personal credit data which can be factored into the overall risk score 1704. FIG. 18 includes an example of a data table representation of personal credit scores compared against different product types or assets of the business. It can be appreciated that the engine 101 can draw data from the data table to calculate a risk score associated with personal credit data, among other metrics. For example, a personal credit score of less than "550" for a business with account receivables could result in a lower risk score (corresponding to a higher level of risk for potential lenders 104B). In this example, a "low" indicator may correspond to a personal credit risk score in the range of 25/100 to 30/100; an "average" indicator may correspond to a personal credit risk score in the range of 30/100 to 70/100; and an "excellent" indicator may correspond to a personal credit risk score in the range of 70/100 to 100/100. Such risk scores may also be represented as a percentage, or on another scale, within the scope of the embodiments described herein.

Figure 19:
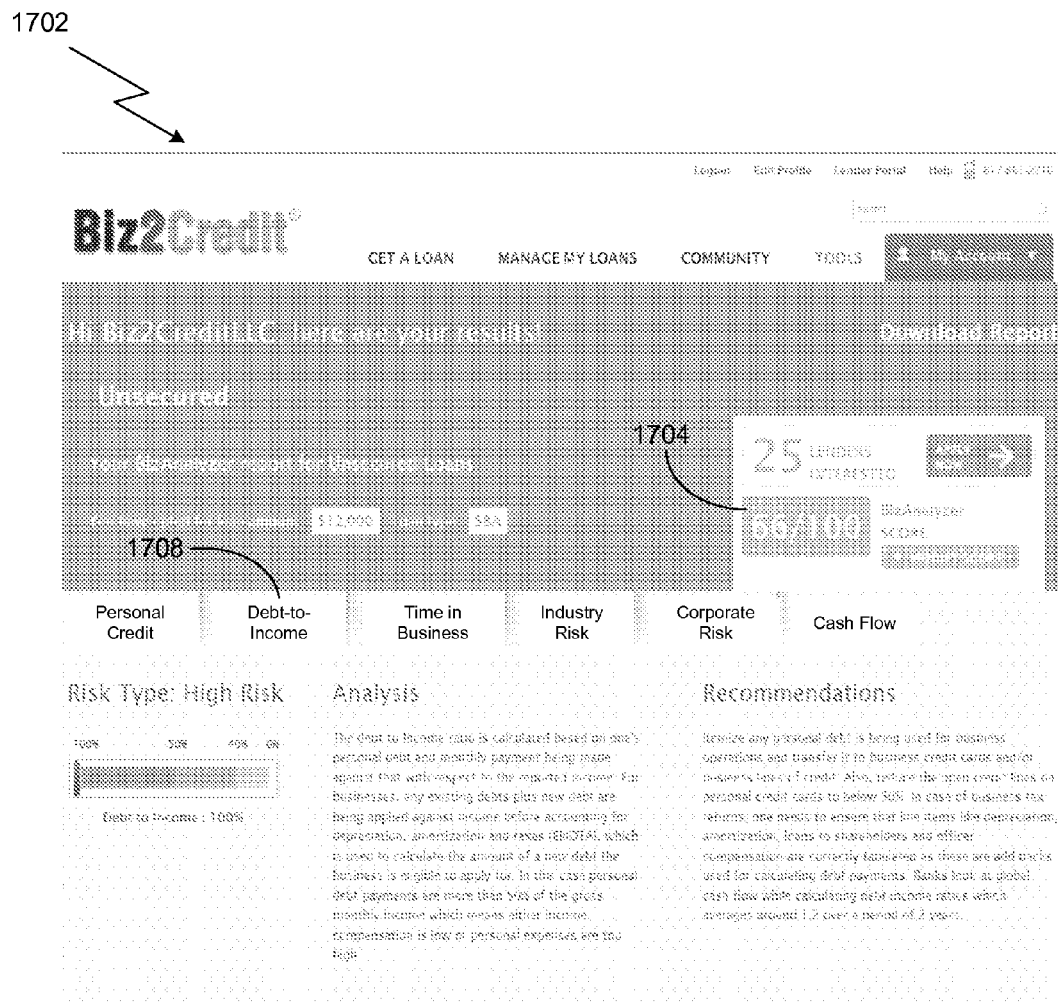
FIG. 19 includes an example of a screen display associated with certain operational aspects of a business analysis tool.

FIG. 19 illustrates the screen display 1702 highlighting an analysis associated with a debt-to-income section 1708 which can be factored into the overall risk score 1704. A debt-to-income ("DTI") analysis may involve calculating the ratio of debt to income associated with a business. A higher percentage DTI may contribute to a lower overall risk score; while a lower percentage DTI may contribute to a higher overall risk score.

Figure 20:
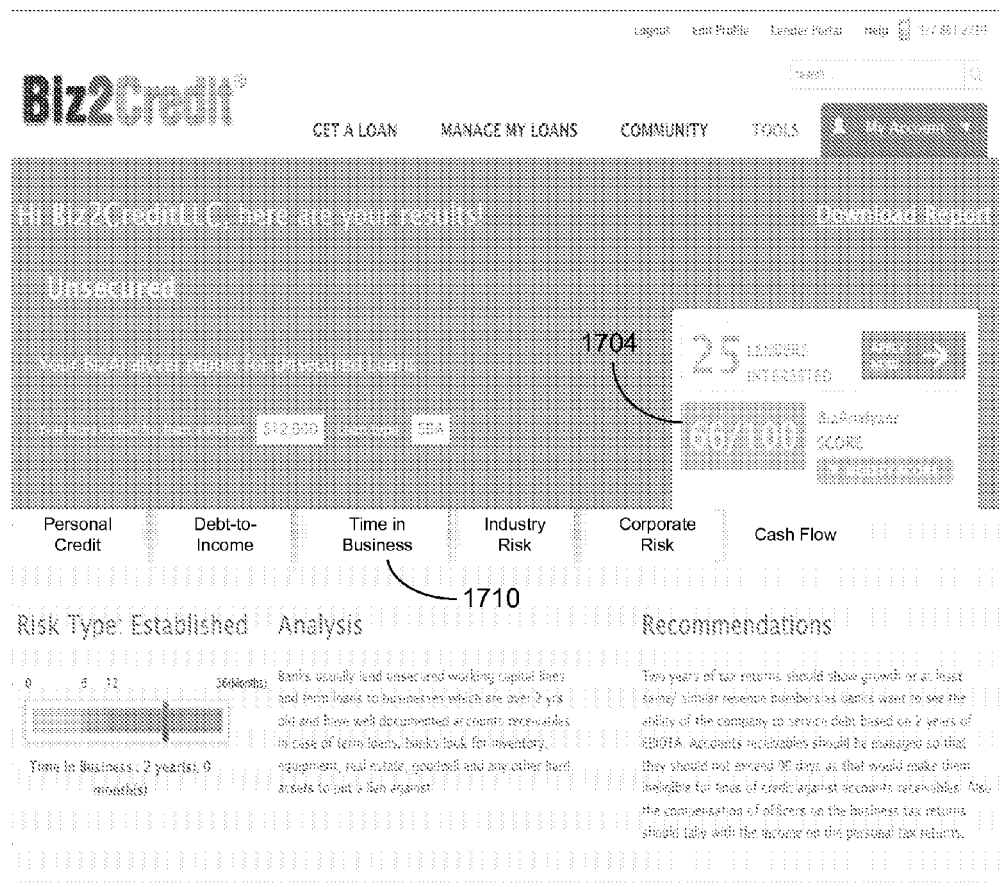
FIG. 20 includes an example of a screen display associated with certain operational aspects of a business analysis tool.

FIG. 20 illustrates the screen display 1702 highlighting analysis associated with a time in business section 1710 which can be factored into the overall risk score 1704. A time in business analysis may involve associating the current age of a business to a risk score calculation. FIGS. 21 and 22 include examples of data table representations of time in business compared against different product types or assets of the business. It can be appreciated that the engine 101 can draw data from these data tables to calculate a risk score associated with time in business, among other metrics.

Figure 23:
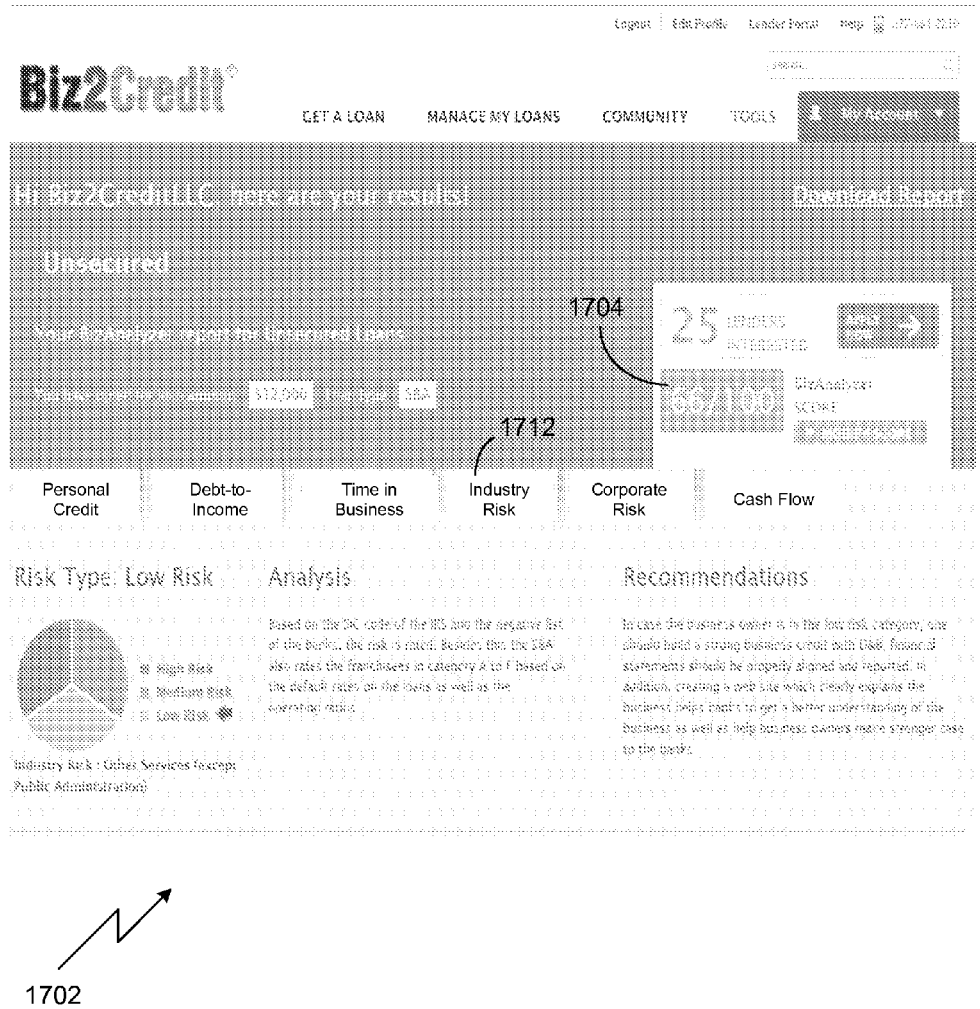
FIG. 23 includes an example of a screen display associated with certain operational aspects of a business analysis tool.

FIG. 23 illustrates the screen display 1702 highlighting analysis associated with an industry risk section 1712 which can be factored into the overall risk score 1704. An industry risk analysis may involve assigning a risk score to a business in response to an industry sector type or sub-sector type in which the business provides products or services. FIG. 24 includes an example of a data table representation of industry type compared against different product types or assets of the business. It can be appreciated that the engine 101 can draw data from this data table to calculate a risk score associated with industry type risk, among other metrics.

FIG. 25 illustrates the screen display 1702 highlighting analysis associated with a corporate risk section 1714 which can be factored into the overall risk score 1704. A corporate risk analysis may involve assigning a risk score to a business in response to an entity type of the business (e.g., S-corporation, C-corporation, sole proprietorship, etc.) FIG. 26 includes an example of a data table representation of corporate entity type compared against different product types or assets of the business. It can be appreciated that the engine 101 can draw data from this data table to calculate a risk score associated with corporate entity type risk, among other metrics. In certain embodiments, certain corporate entity types may be deemed to present a higher or lower risk to potential lenders 104B and their credit product offerings.

Figure 27:
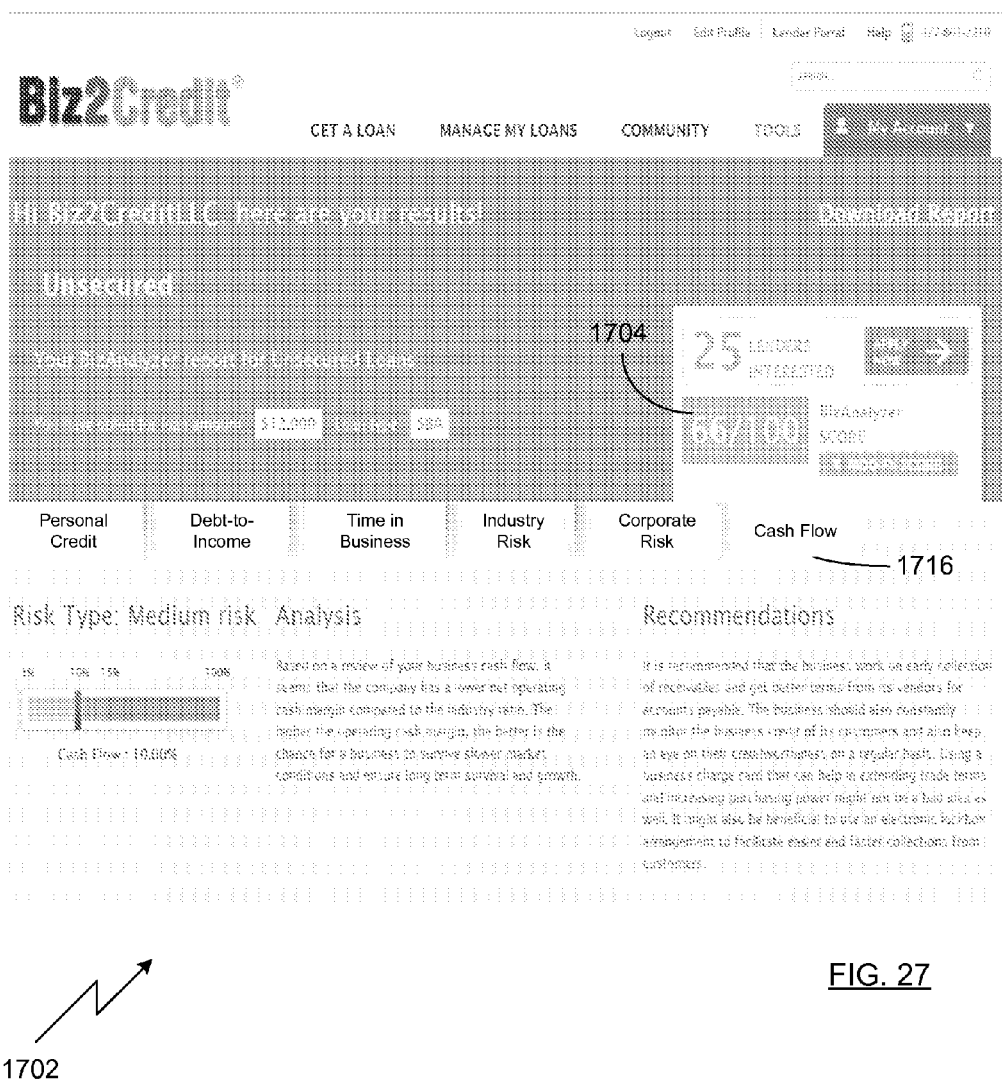
FIGS. 27 and 28 include examples of screen displays associated with certain operational aspects of a business analysis tool.

FIG. 27 illustrates the screen display 1702 highlighting analysis associated with a cash flow risk section 1716 which can be factored into the overall risk score 1704. A cash flow analysis may involve assigning a risk score to a business in response to a cash flow calculation. In certain embodiments, a predetermined cash flow value or range of values may be deemed to present a higher or lower risk to potential lenders 104B and their credit product offerings.

Figure 28:

FIG. 28 illustrates the screen display 1702 after a "Modify Score" button 1722 has been selected by a user 104. A scenario modification tool 1724 can be displayed in which one or more what-if scenarios can be manipulated to calculate a corresponding effect on overall risk score or number of lenders 104B interested, for example. As shown, each risk analysis sub-section may include a slider bar, or other equivalent functionality, for experimentally varying the value for the sub-section. For example, the slider bar for cash flow can be manipulated from a lower value to a higher value. In response to this change, the decision making engine 101 can re-calculate the overall risk score and/or execute one or more of the various matching algorithms described herein to determine, for example, whether more or less lenders 104B would be interested in the borrower 104A if the cash flow situation were changed as indicated in the scenario modification tool 1724. In various embodiments, the tool 1724 allows the user to change various financial parameters such as personal credit score, DTI ratio, time in business, industry risk, corporate risk and cash flow, among others. Based on the changes to one or more of the parameters, the overall risk score can be modified providing potentially important insights to the user 104 as to which parameter can help improve credit health and/or the ability to obtain desirable credit products.

Figure 29:
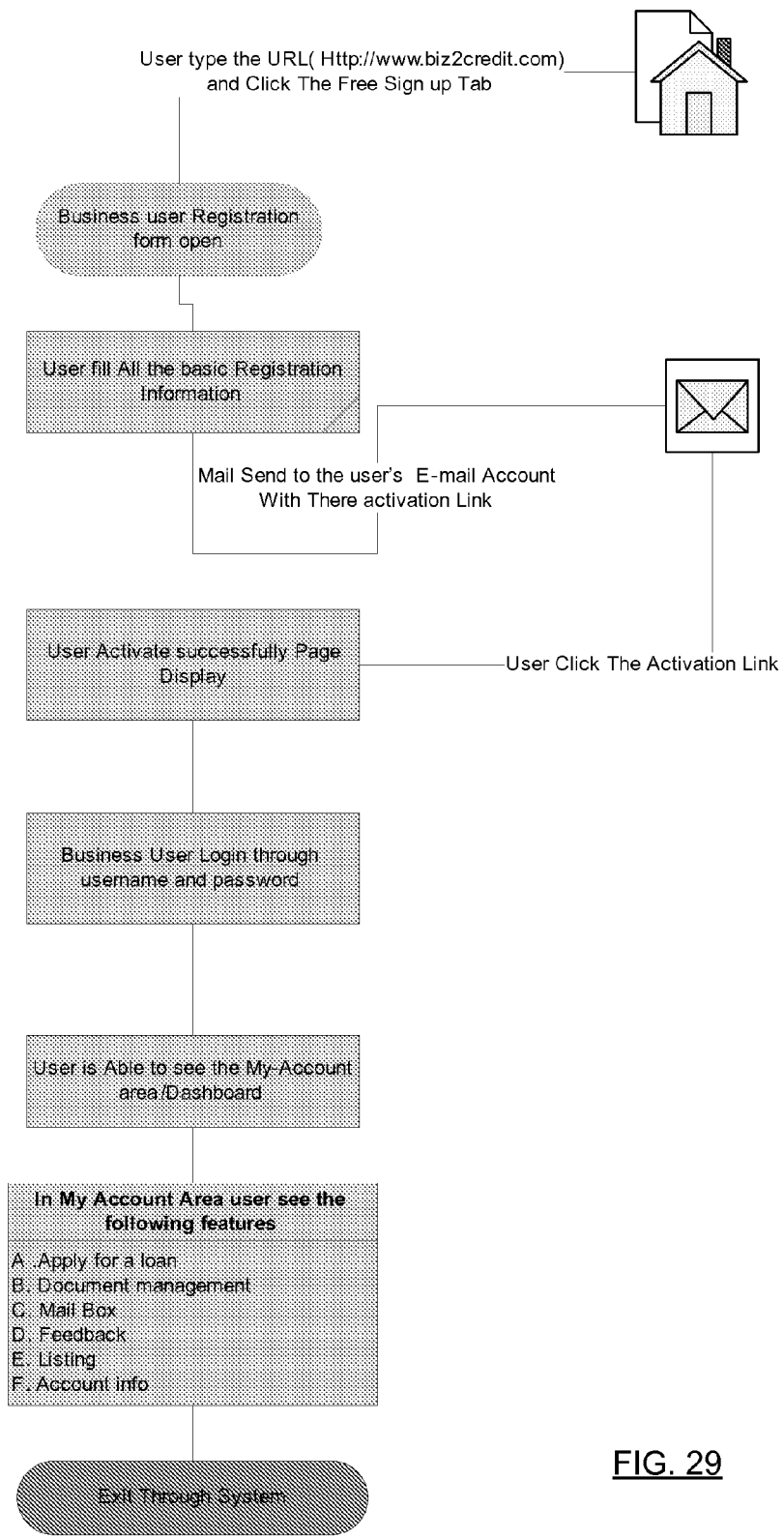
FIGS. 29 through 31B include process flow diagrams illustrating certain data collection, analysis, and processing aspects of a web-based embodiment of a decision making engine and its operatively associated business analysis tools.
Figure 30:
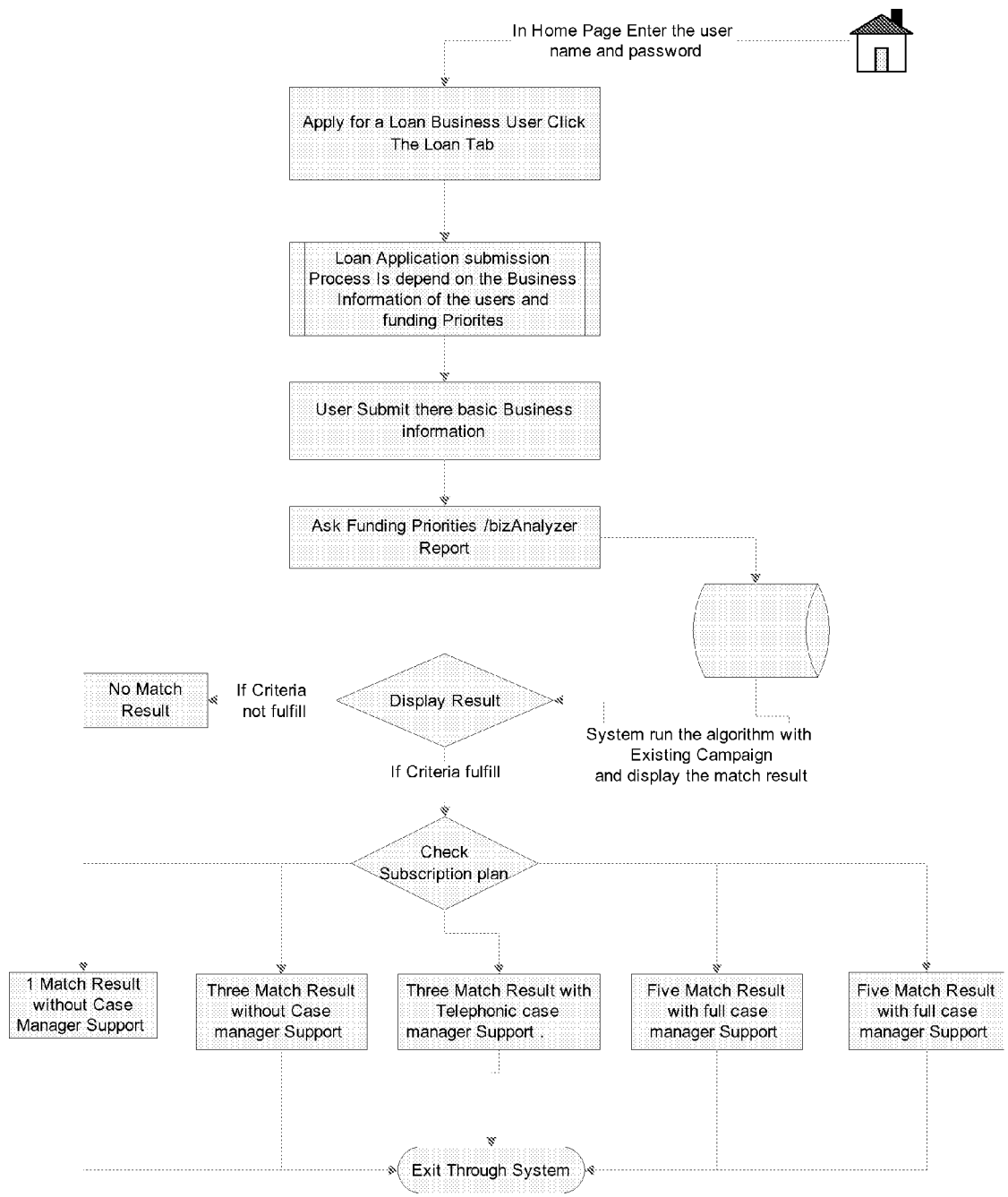
Figure 31A:
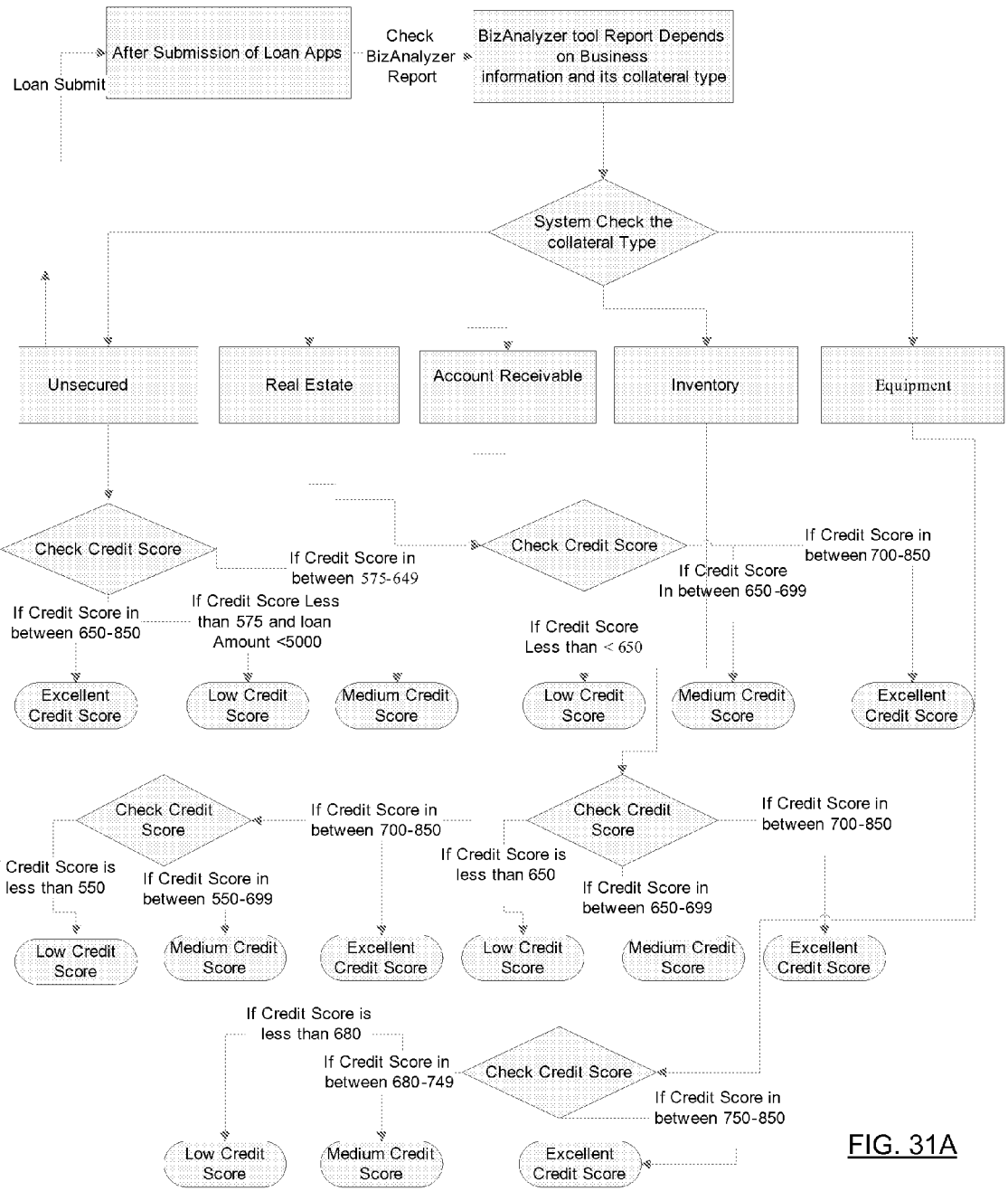
Figure 34:
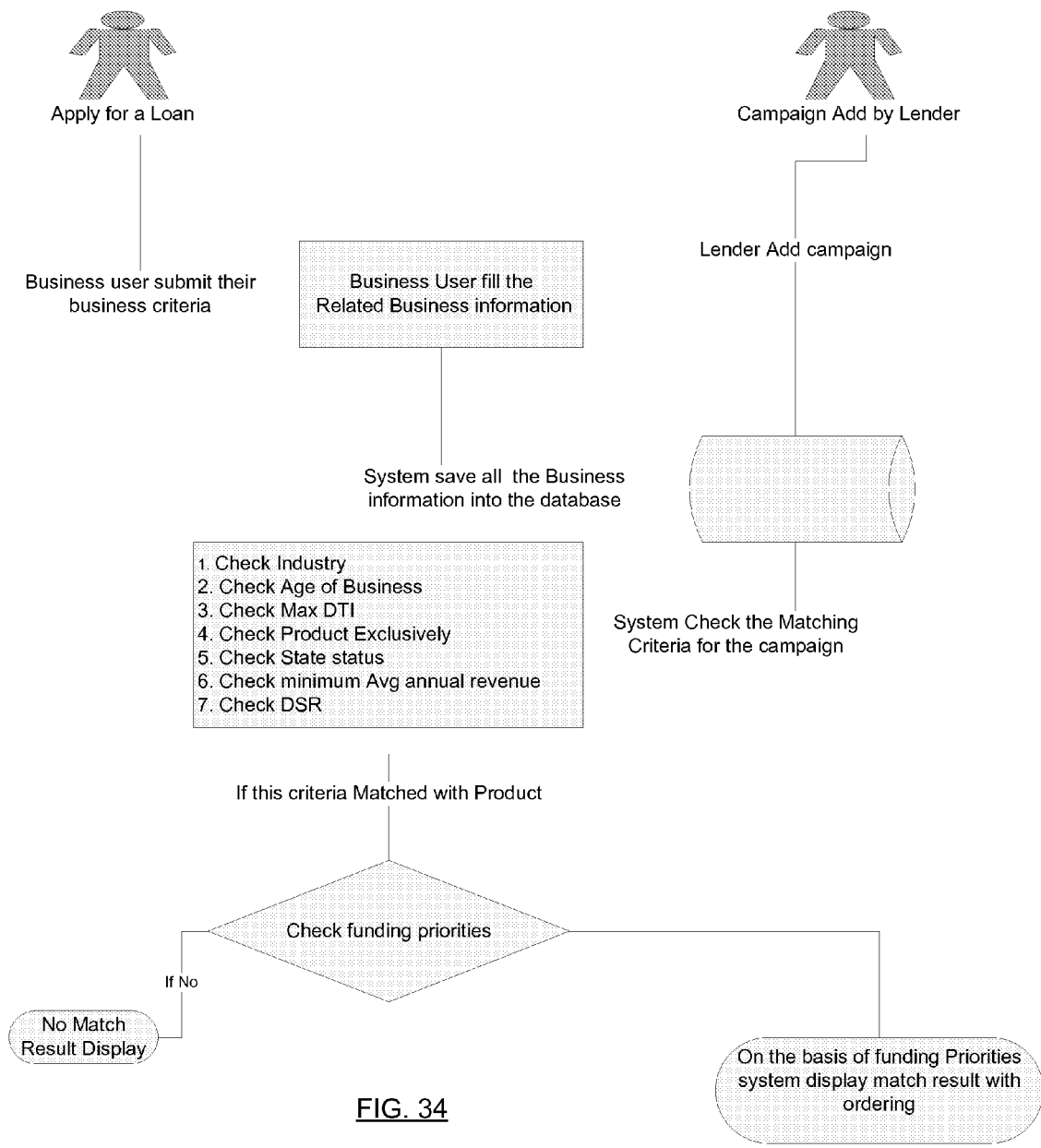
FIGS. 34 and 35 include process flow diagrams illustrating certain data collection, analysis, and processing aspects of a web-based embodiment of a decision making engine and its operatively associated business analysis tools.
Figure 35:
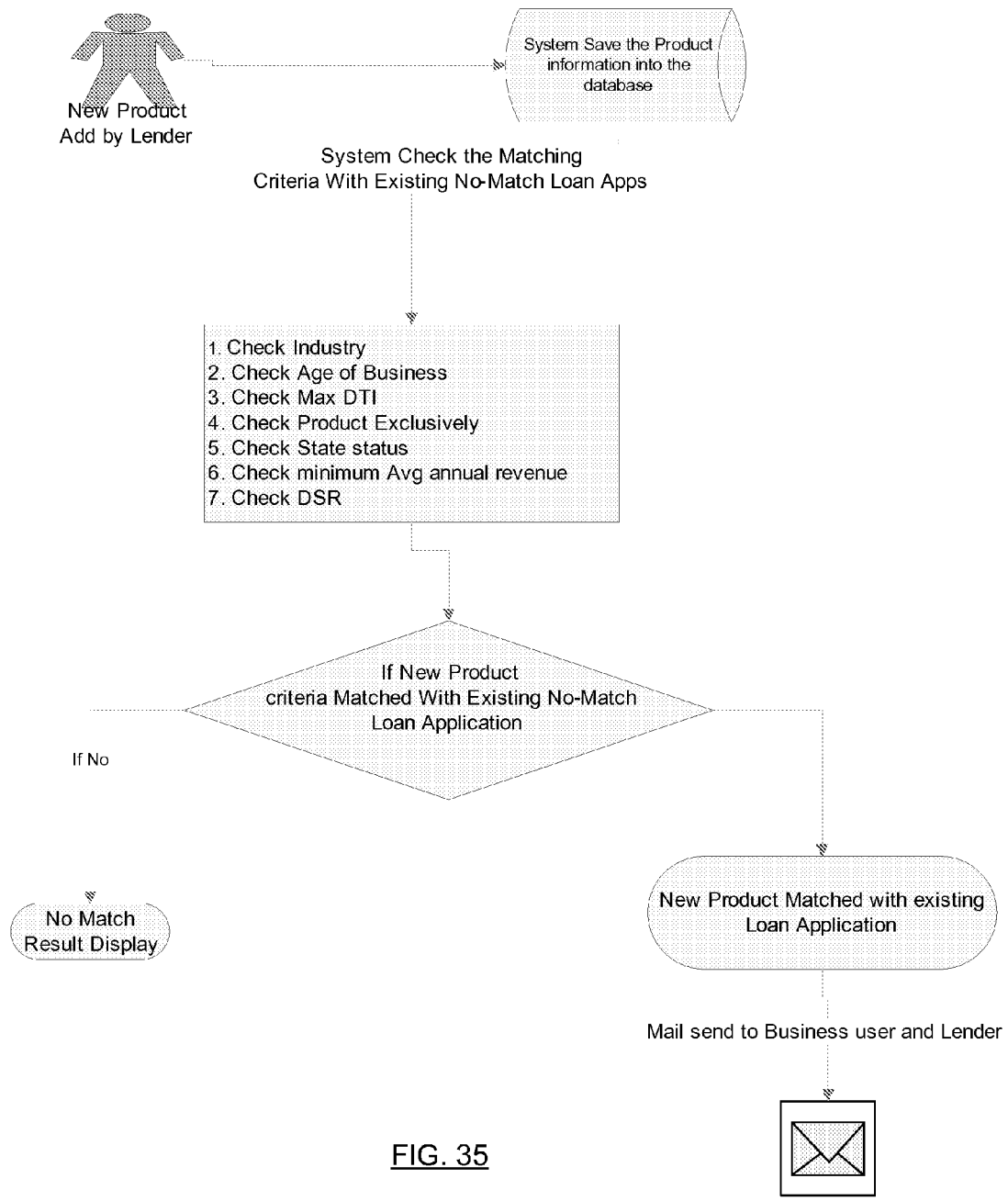

FIGS. 29 through 35 illustrate examples of algorithms that may be applied to various processes or data analyses conducted by the decision making engine 101. FIG. 29 includes a process flow diagram illustrating an example of how users 104 can register to access and use the services provided by the engine 101. FIG. 30 includes a process flow diagram illustrating an example of how users 104 can initiate a loan application process including providing business information and funding priorities for matching by the engine 101 against lender 104B campaigns and credit product offerings. FIGS. 31A and 31B include a process flow diagram illustrating an example of how the business analysis module 106C can process and calculate an overall risk score for a business in response to factors such as collateral type, credit scores, DTI, time in business, industry type risk, and corporate entity type risk. FIGS. 32 and 33 include a table representation of a use case in which an example is presented of how the engine 101 can identify a best match between a borrower 104A and a potential lender 104B. FIGS. 34 and 35 include process flow diagrams illustrating examples of how business information and user preferences such as funding priorities can be matched against various lender 104B campaigns or new credit products.

FIGS. 36 through 57 illustrate alternative embodiments of the invention that may be used in place of, as a complement to, or as a supplement to embodiments of the invention previously described hereinabove.

Figure 36:
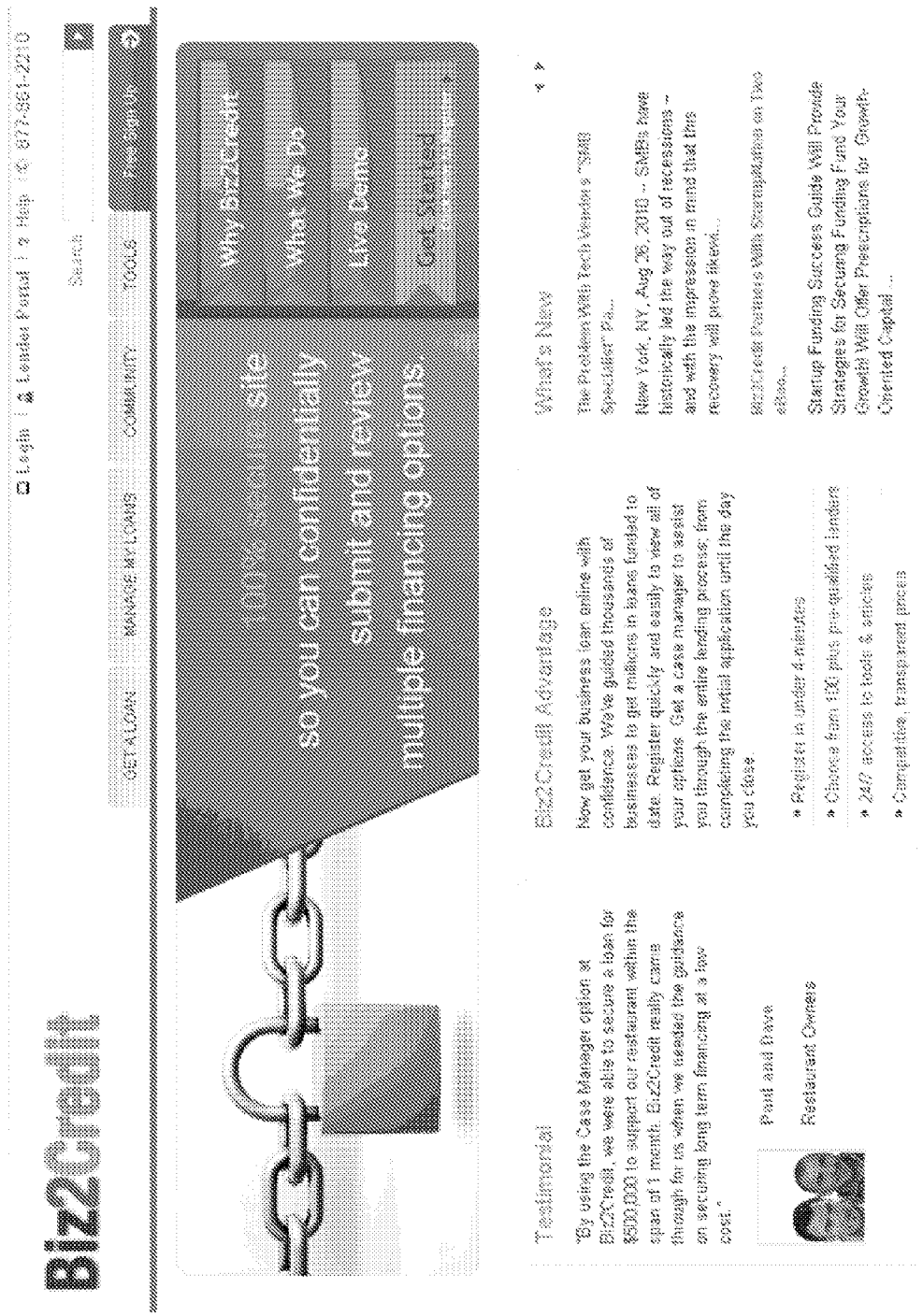
Figure 37:
Figure 38:
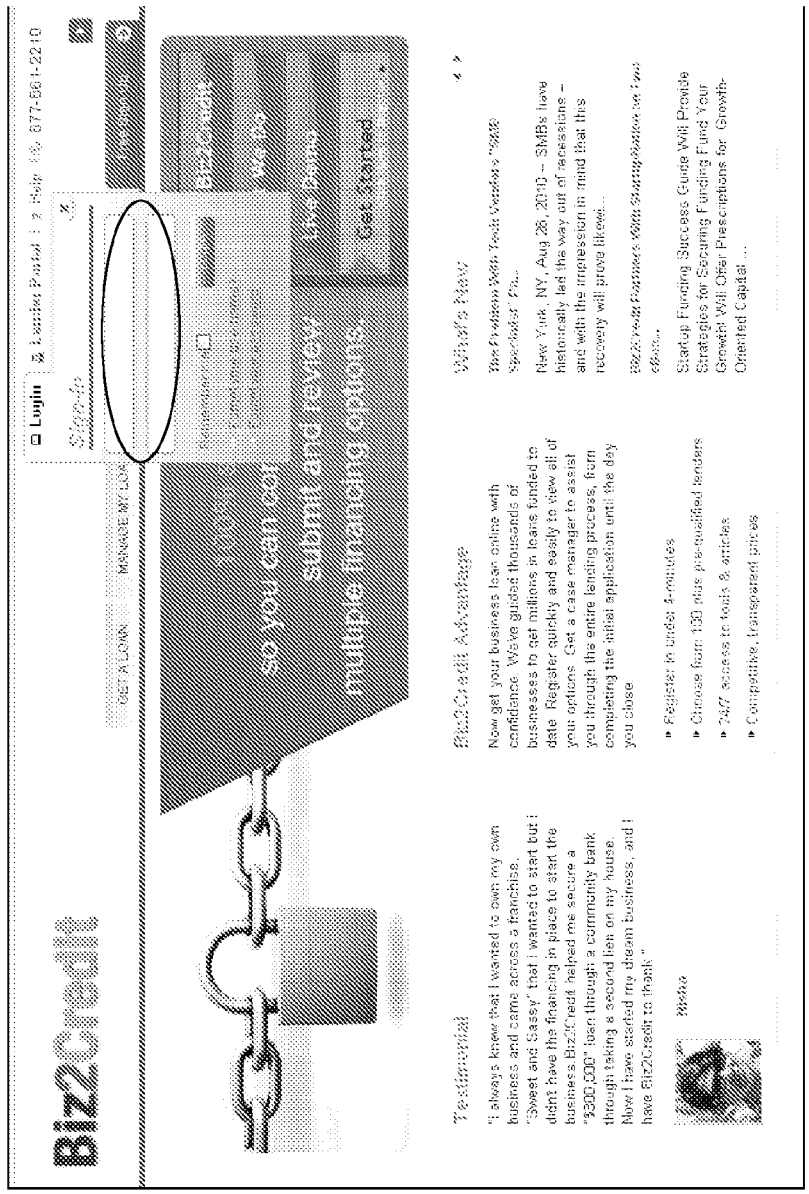
Figure 39:
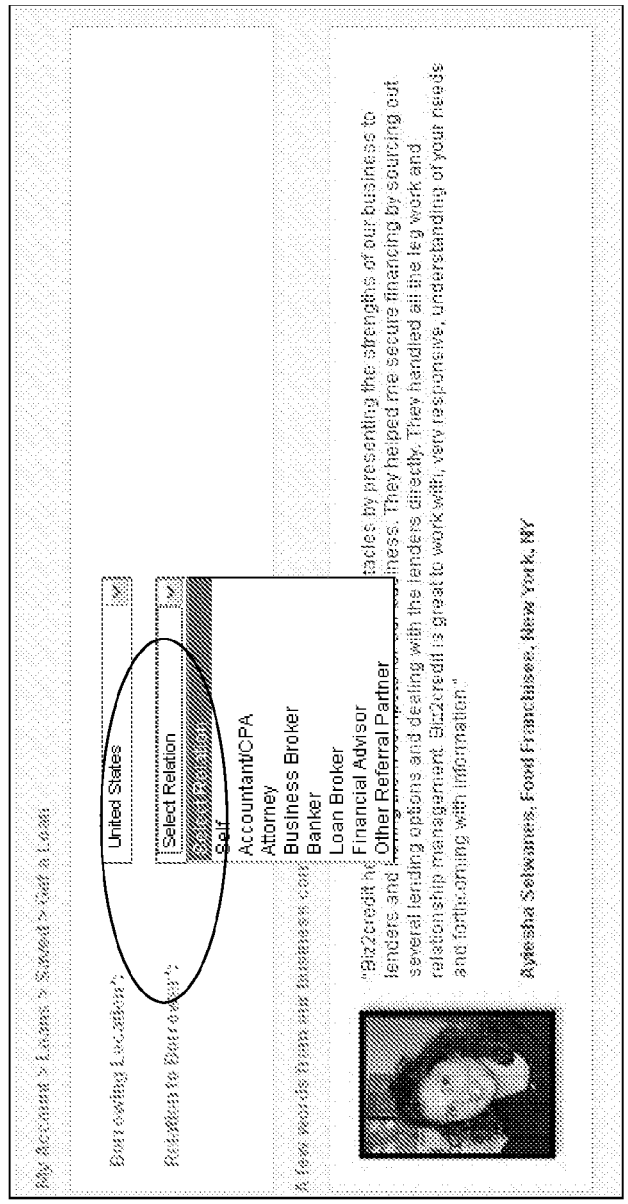

FIG. 36 illustrates an example of a web-based portal that can be displayed to one or more users 104 of the decision making engine 101 upon arrival at a web site that provides a user interface to the engine 101. Once a user 104 enters the web login, they may be directed to a registration page. FIG. 37 illustrates how a small business owner, for example, may be asked relevant details regarding their business such as name, name of the business, industry and sub industry and the primary business address. FIG. 38 illustrates an example of how a user can access the decision making engine 101 through a conventional login procedure, for example, after registration has been completed.

With reference to the example screen displays shown in FIGS. 39 through 45, the business owner may be asked for a variety of information that can be used to match one or more appropriate credit products which correspond to the needs and borrowing situation of the owner. For example, more information may be solicited regarding the history and age of business, number of employees, current business assets (e.g., real estate or other property), the legal structure of the business, annual turnover, operating expenses, the relationship of the owner to the company, date of birth, the average annual revenue, personal credit score and the current business bank. The owner may also provide information regarding any assets, property, or other collateral that might be used as security for a loan or other obligation. In another example, the business owner may be asked about information regarding personal monthly expenses and about personal monthly income, in order to calculate a debt to income ("DTI") ratio. In addition, to facilitate matching appropriate credit products with the needs and borrowing situation of the business owner, a choice of priorities may be made in terms of what is important to the owner with respect to different loan attributes. For example, the borrower may select priorities for fund requirements such as document requirements, funding with low interest rates, or funding with low processing fees, among many other priorities.

Figure 46:
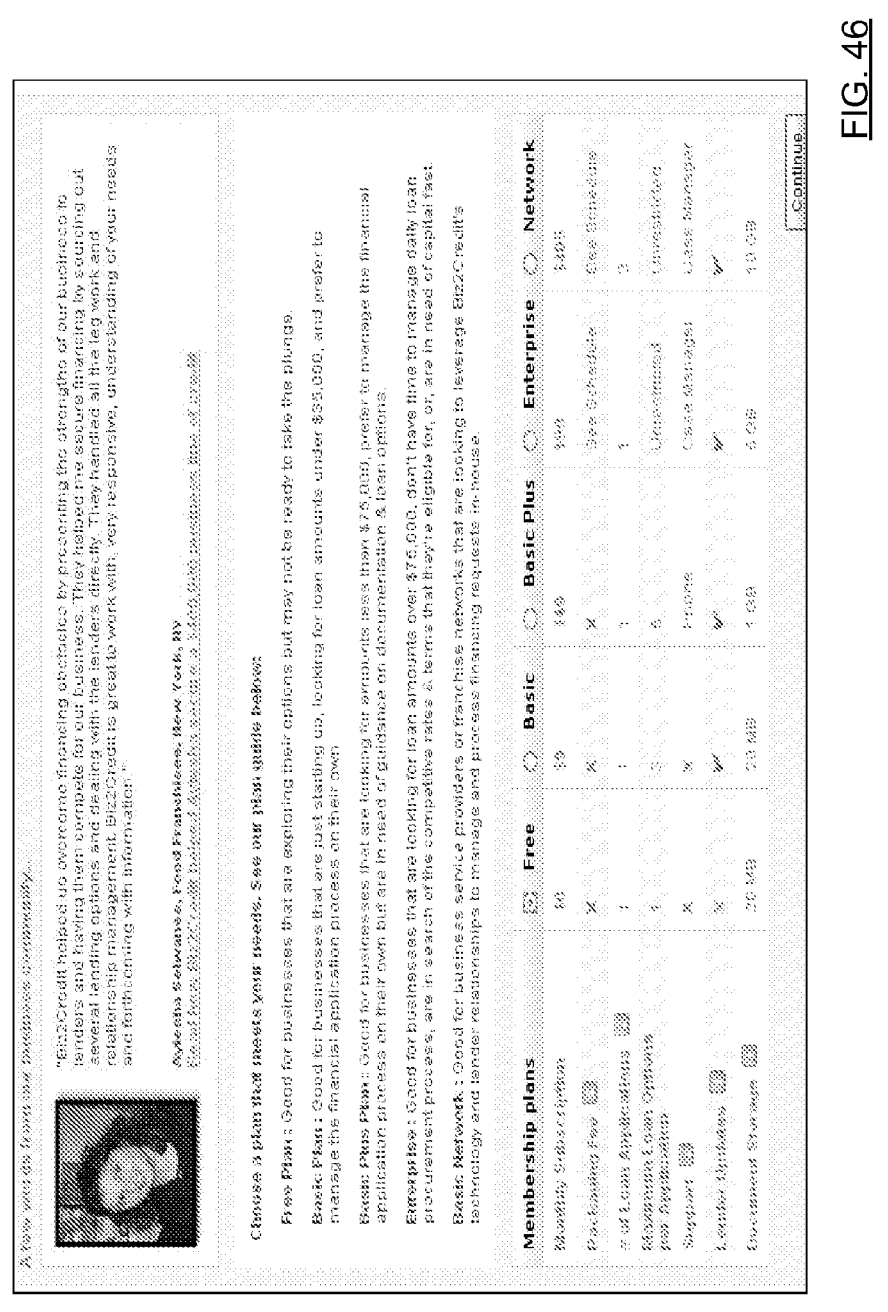

FIG. 46 illustrates an example of a list of potential options from which the borrower may select to indicate the level of service and features that the borrower desires from the engine 101 by way of subscribing to the engine 101 as a service, for example.

Figure 47:
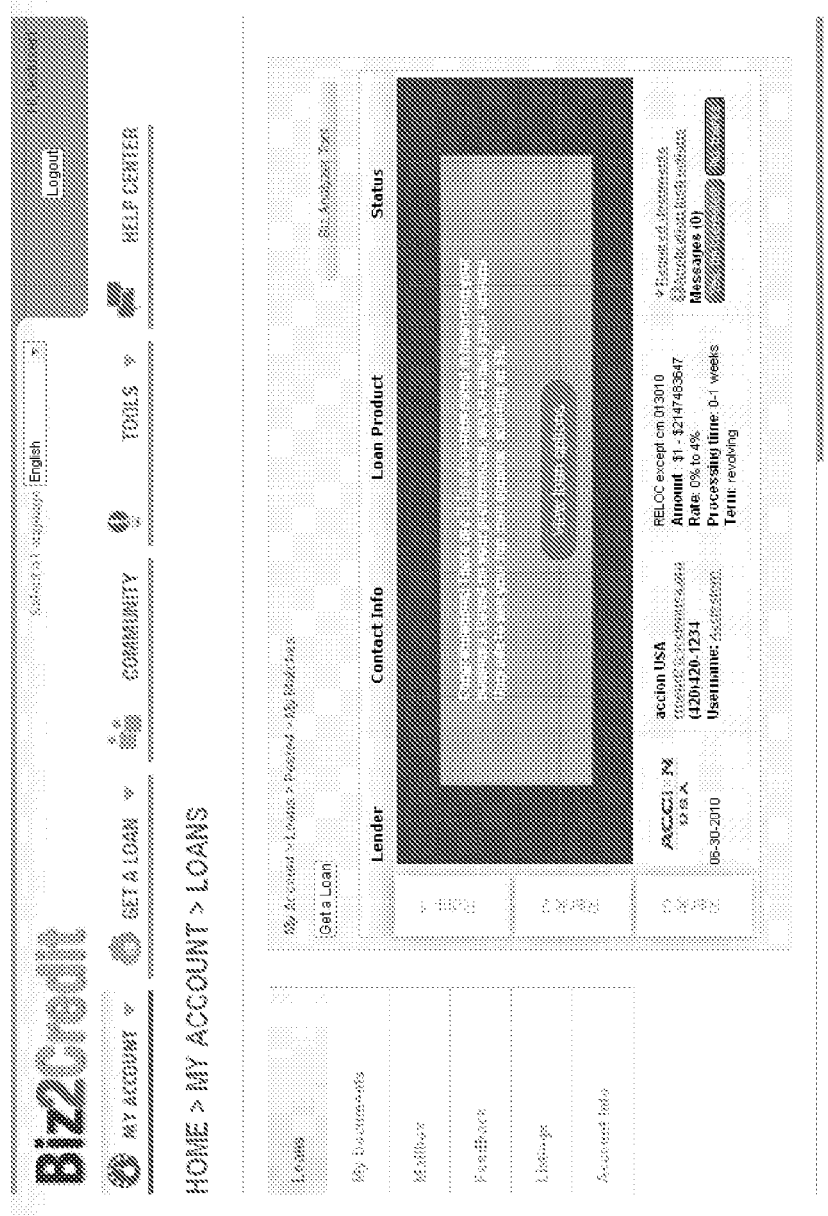

As shown in FIG. 47, the engine 101 can be programmed to automatically generate results best suited to the business owner's requirements as corresponding to various credit product offerings by multiple lenders. A more detailed discussion of the various matching algorithms that may be employed by the engine 101 have been included throughout the present disclosure.

Figure 48:
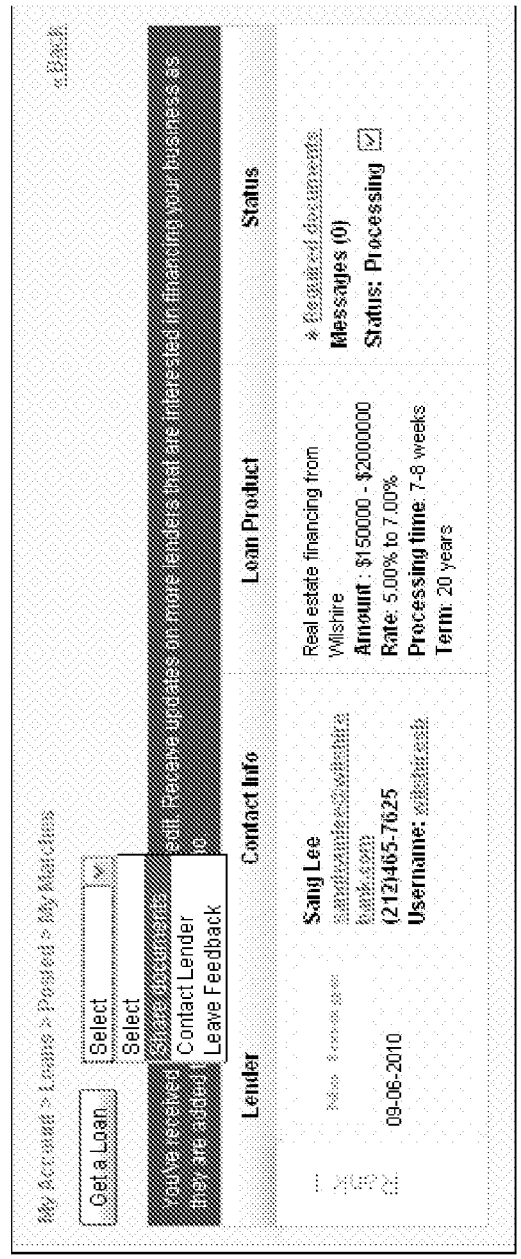
Figure 50:
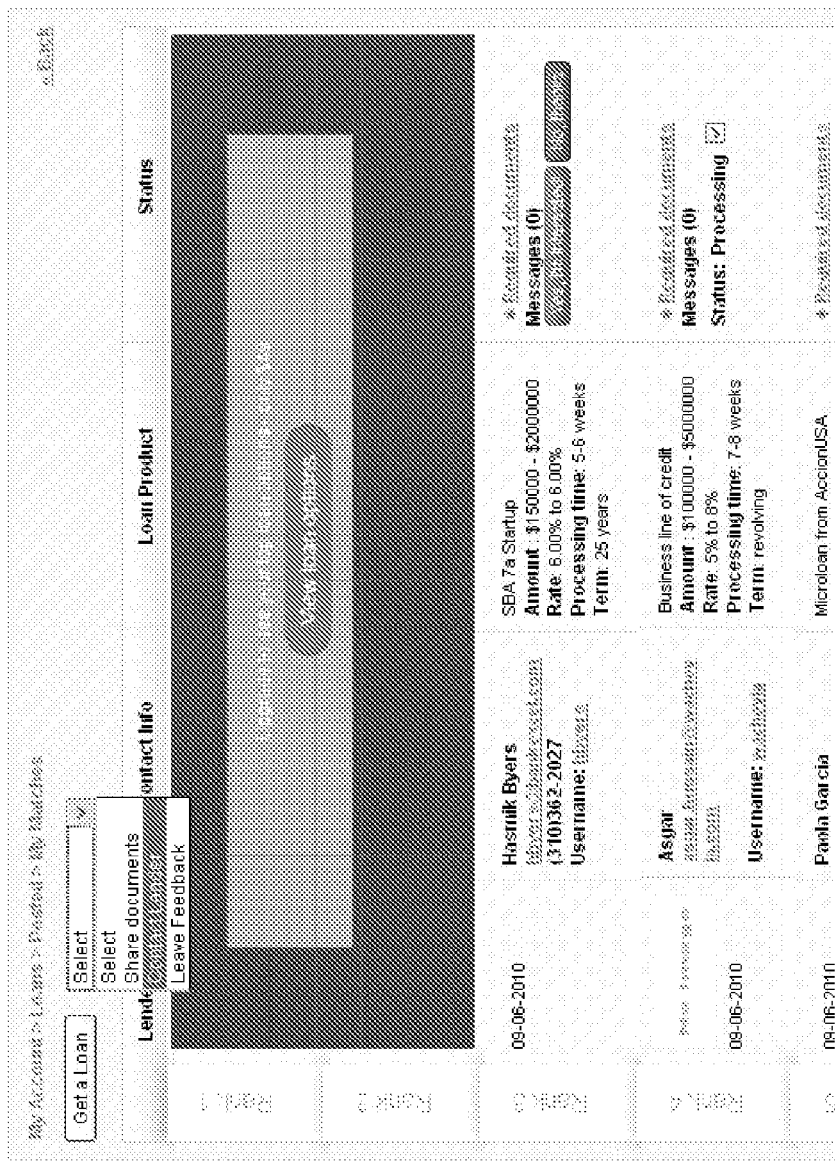
Figure 51:
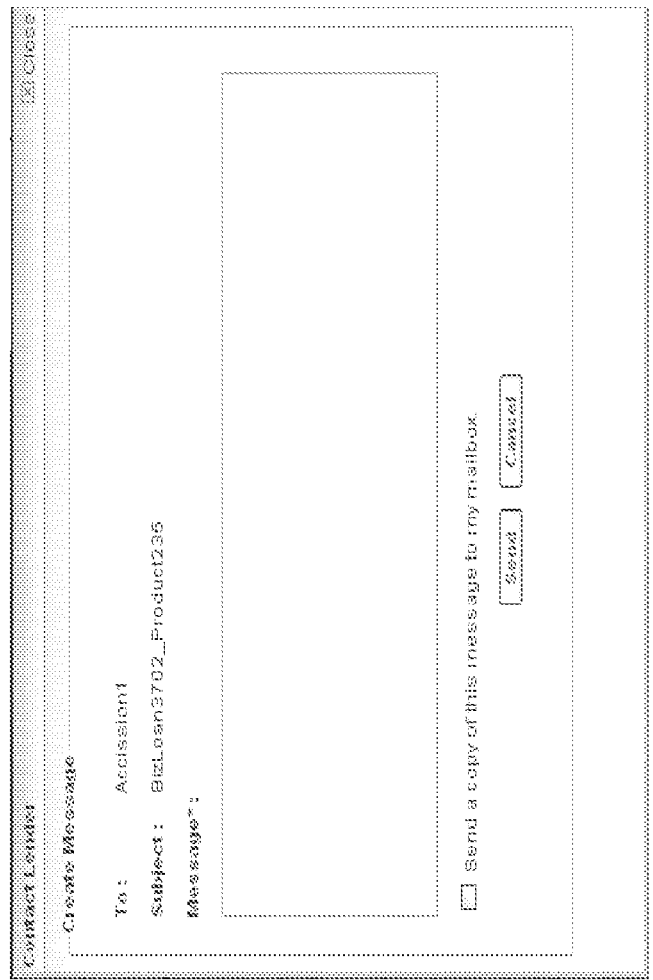
Figure 52:
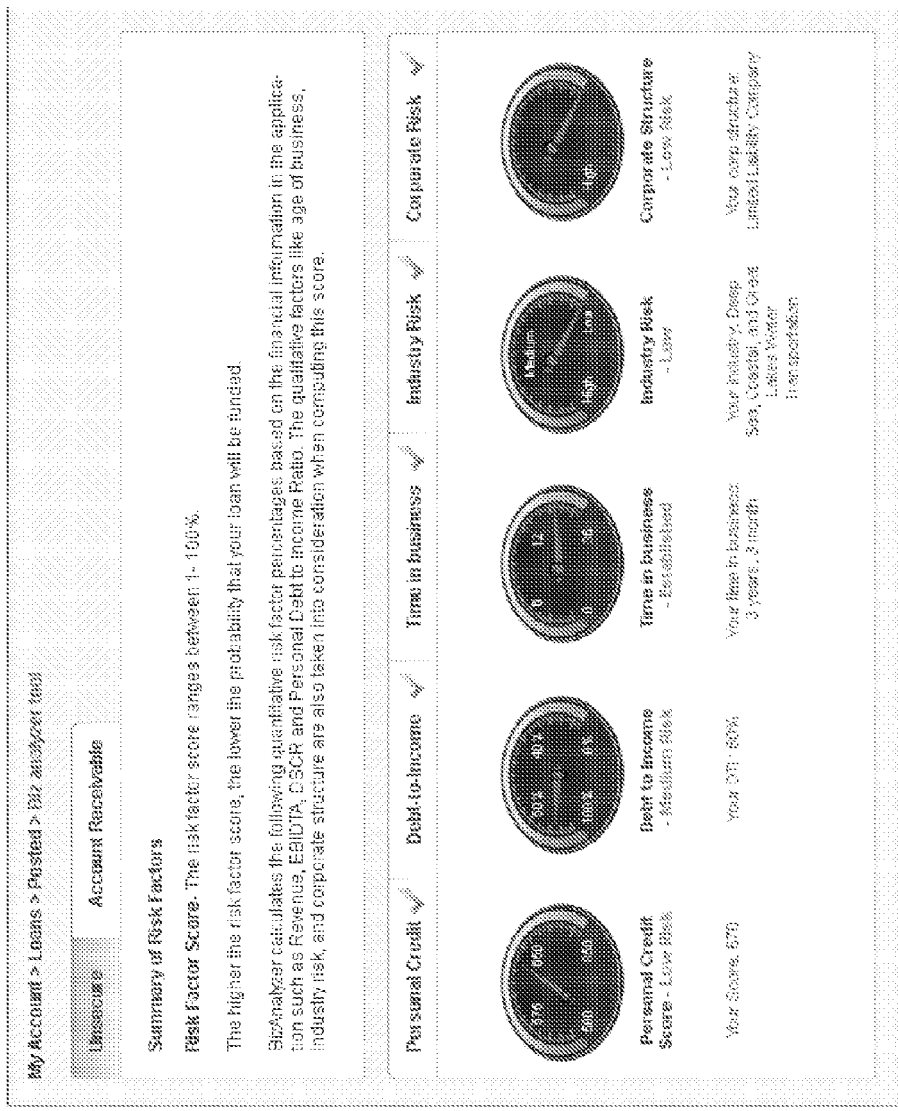
FIGS. 52 through 58 include examples of screen displays associated with data collection, analysis, and processing aspects of a web-based embodiment of a decision making engine, including certain operational aspects of a business analysis tool; and, FIGS. 59 through 77 include examples of screen displays associated with data collection, analysis, and processing aspects of a web-based embodiment of a decision making engine, including tools specifically designed for use by lenders of credit products.

FIGS. 48 and 49 include screen displays that illustrate an example of a feature that permits the borrower 104A to store and share documents within the engine 101. In this example, the borrower 104A has authorized the sharing of certain documents with the lender 104B associated with the "Rank 1" result of the matched credit product search results. As shown more particularly in FIG. 49, the borrower 104A can select which documents stored in a repository within the engine 101 are to be shared with a given lender 104B and/or for a given credit product offering. FIGS. 50 and 51 illustrate an example of a feature that permits the borrower 104A to contact the lender 104B regarding a credit product offering.

In various embodiments, the engine 101 may provide a communication link to a tax credit program database, wherein users can input ZIP code information and identify state tax credits available to them. In certain embodiments, the engine 101 may be integrated through application program interfaces (APIs) associated with "QuickBooks" software (as described above), small business accounting applications, or other external data sources 134 to provide direct data communication feeds of financial information associated with borrowers 104A or lenders 104B. In addition, integrating APIs may be provided from banks for providing checking and money market information, for example. History functionality may also be incorporated, wherein registered users 104 can track documents uploaded, tagged, shared, or downloaded by the recipient.

In various embodiments, the BizAnalyzer tool may be provided for processing risk factors associated with the profiles of different borrowers 104A and the types of credit products that may be offered to borrowers 104A. With reference to the screen display of FIG. 52, the BizAnalyzer tool may provide a consolidated business analyzer report for a selected credit product or borrower 104A, based on factors including opted loan amount, risk factor, or loan type (e.g., unsecured, real estate, account receivables, inventory, equipment, or other), among other factors. As shown on FIG. 52, tabs can be provided on the screen display which included the results of analysis performed on the information provided by the user 104. For example, the tabs may include sections for risk assessment based on personal credit, debt-to-income ratio, time in business, industry risk, corporate risk, and/or other sections.

Figure 53:
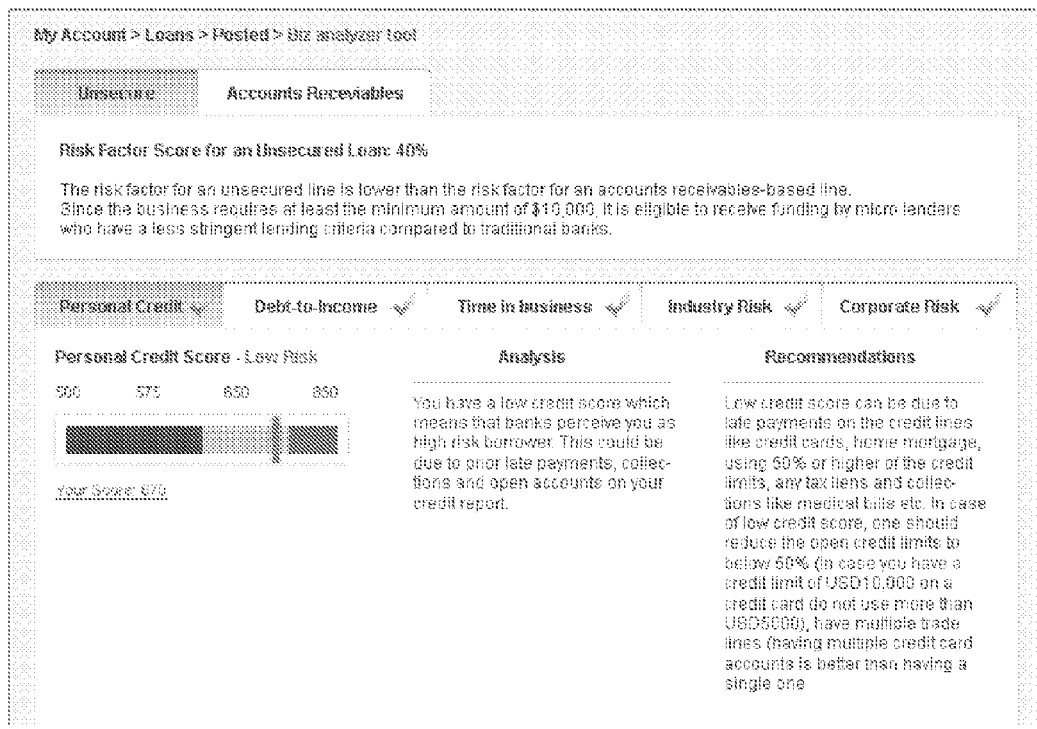
Figure 54:
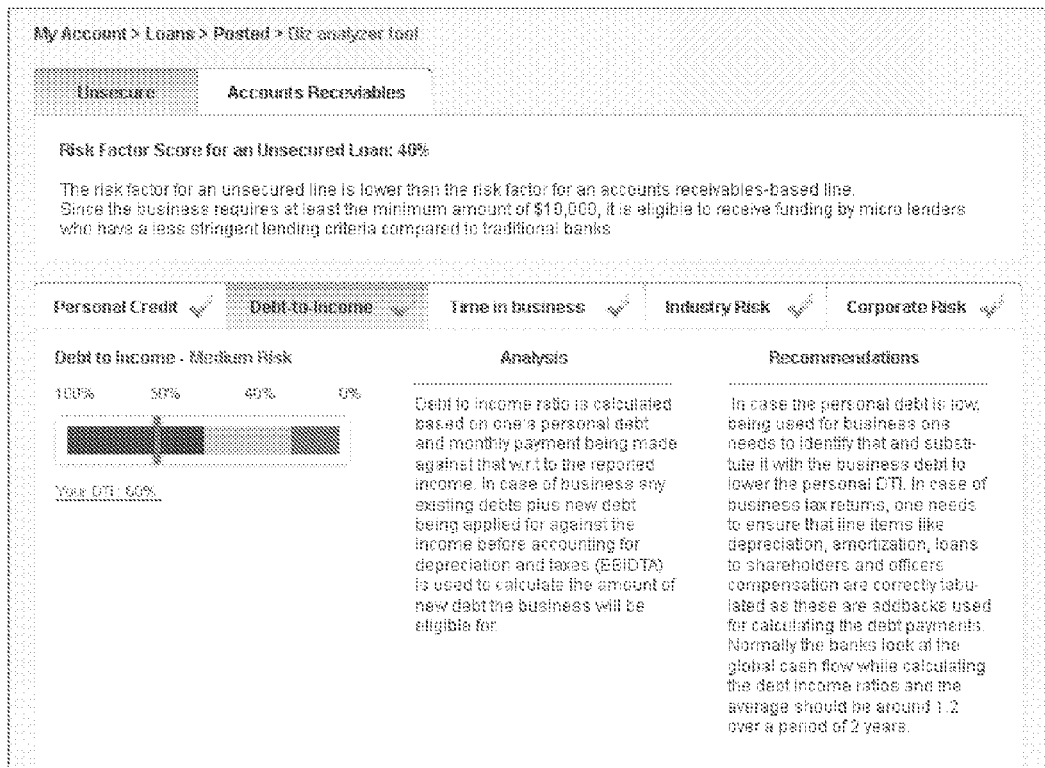
Figure 55:
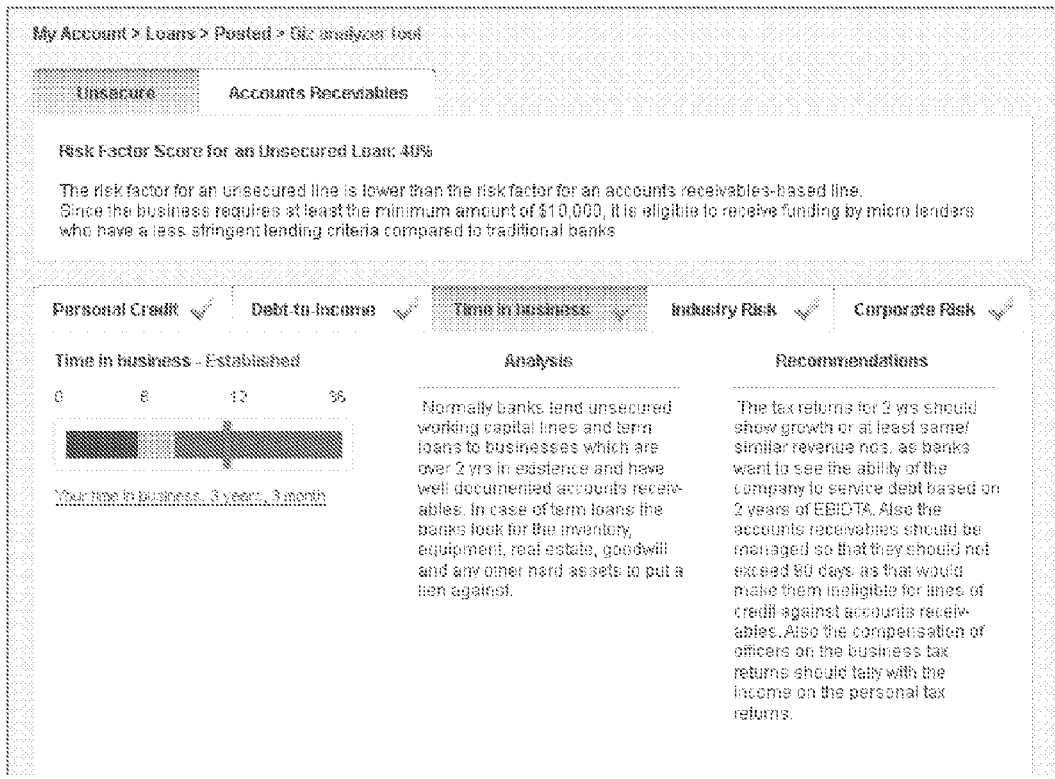
Figure 56:
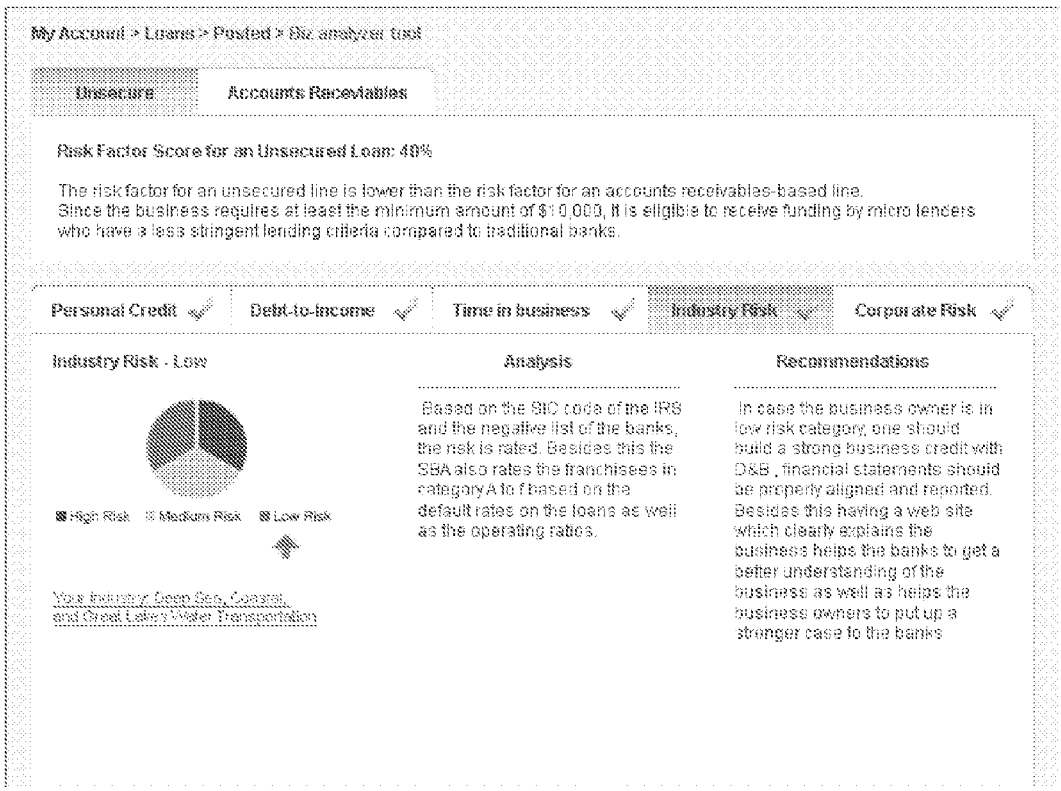
Figure 57:
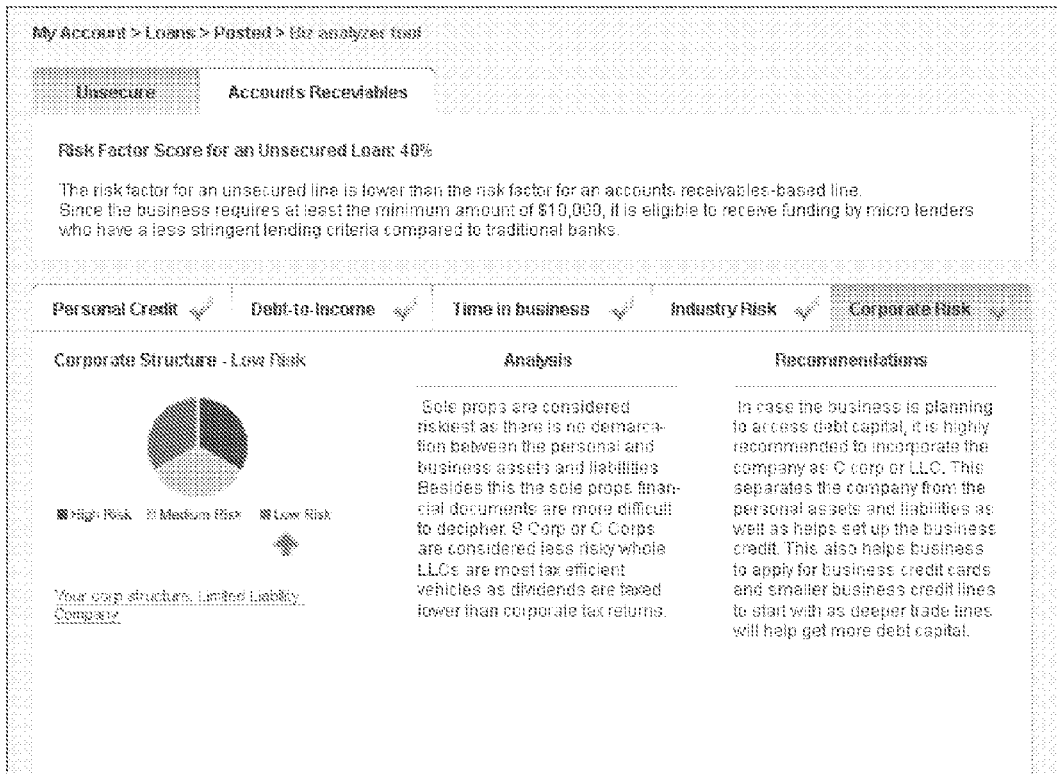
Figure 58:
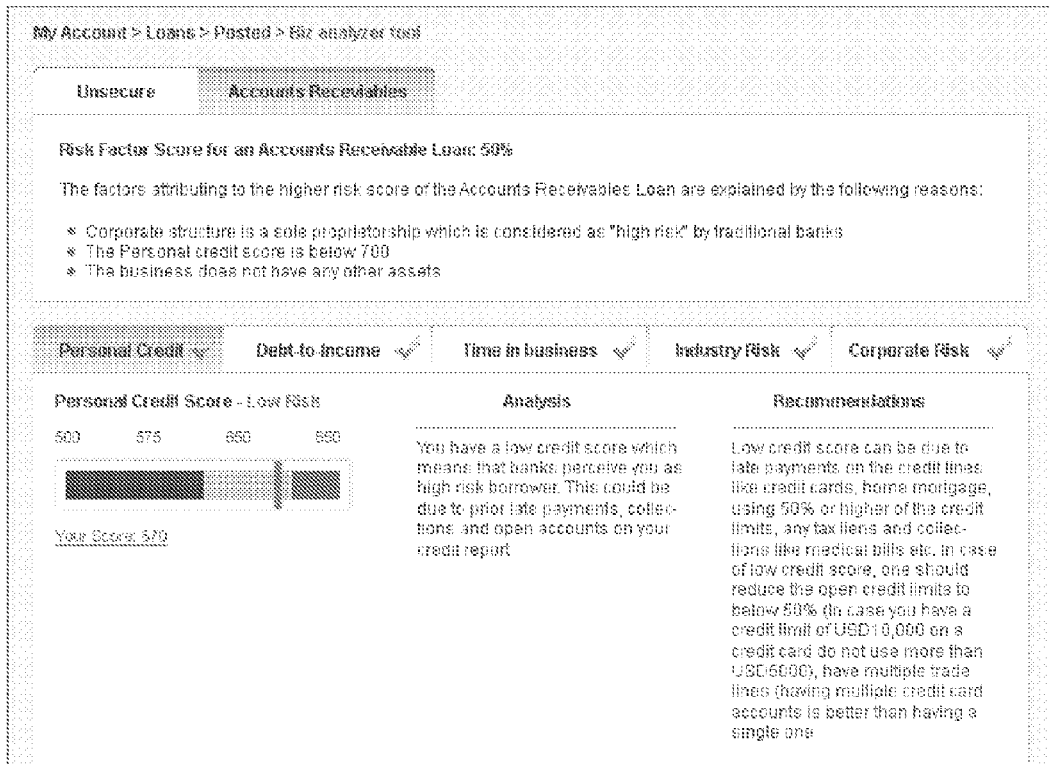

FIG. 53 includes detailed information on the personal credit section. FIG. 54 includes detailed information on the debt-to-income section. FIG. 55 includes detailed information on the time in business section. FIG. 56 includes detailed information on the industry risk section. Examples of industry types include Internet startups, real estate, investment business, gas station, Internet, whole sale distribution, waste management, medical, healthcare, retail, restaurant, supermarket, online company, franchises, and many others. FIG. 57 includes detailed information on the corporate risk section. FIG. 58 includes an example of an analysis performed for an account receivables loan type.

In various embodiments, the BizAnalyzer tool may employ a cash flow analysis. The cash flow analysis may take into account the operating cash margin of the borrower 104A, for example. In certain embodiments, operating cash margin may be calculated by dividing the average business bank balance by the annual revenue of the borrower 104A. The operating cash margin ratio employed may be similar to a traditional profit margin ratio but may use cash flow from operations in place of either net income or operating income as the numerator. The operating cash margin ratio can provide a more robust indicator of performance based on cash generating ability as compared to a profit margin ratio with its focus on accrual based accounting income. The operating cash margin ratio may be used to highlight the timing of cash flows with respect to the timing of sales. Therefore, the ratio can prove useful as part of a process to evaluate cash management performance, as well as credit granting policies and receivable collections. Since cash flow margins are likely to exhibit substantial variations among companies in different industries, it may be useful to focus a comparative analysis on companies within the same industry type. In certain embodiments, a cash flow ratio in the range of 1-10% may represent a high risk; a ratio in the range of 10%-15% may represent a medium risk; and a ratio above 15% may represent a low risk.

In various embodiments, the BizAnalyzer tool may include a "What if Scenario" wherein business owners 104A can be permitted to see what matches they prospectively would have if a personal credit score, for example, goes up or down, or another factor such as DTI ratio, industry risk, corporate risk, time in business, and/or cash flow ratio changes. For example, if the business owner 104A has a current credit score of 600, then a slider or other user interface tool can be used to adjust the score to see what credit product options would be available if the score rose to 680 or more. In another example, a business having high DTI ratio could see what credit options would be available if DTI ratio falls to the low risk category. Such a "What If Scenario" feature can help businesses to understand the impact of their creditworthiness. A similar tool could be employed by lenders 104B, too.

In various embodiments, a tool can be provided to help lenders or banks to benchmark their credit products against a peer group based on a personal and business credit score threshold, DTI ratio, processing time, and/or cash flow thresholds. This tool can help the lenders to assess how competitive their products are compared to their competitors and the strength of their risk management in the context of small business credit products.

Figure 59:
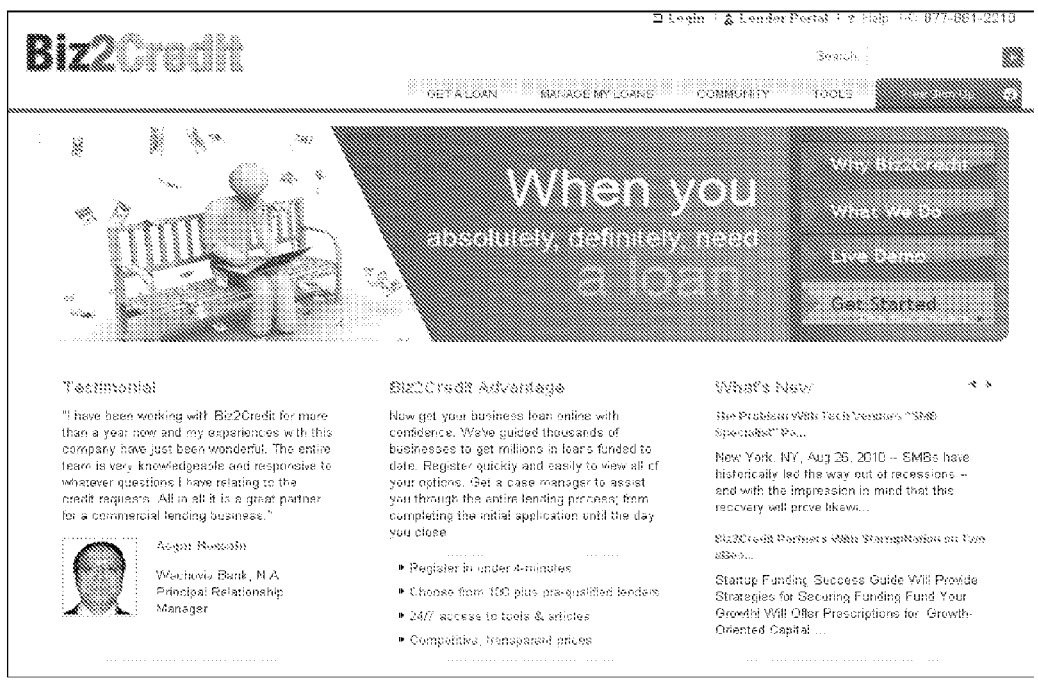
Figure 60:
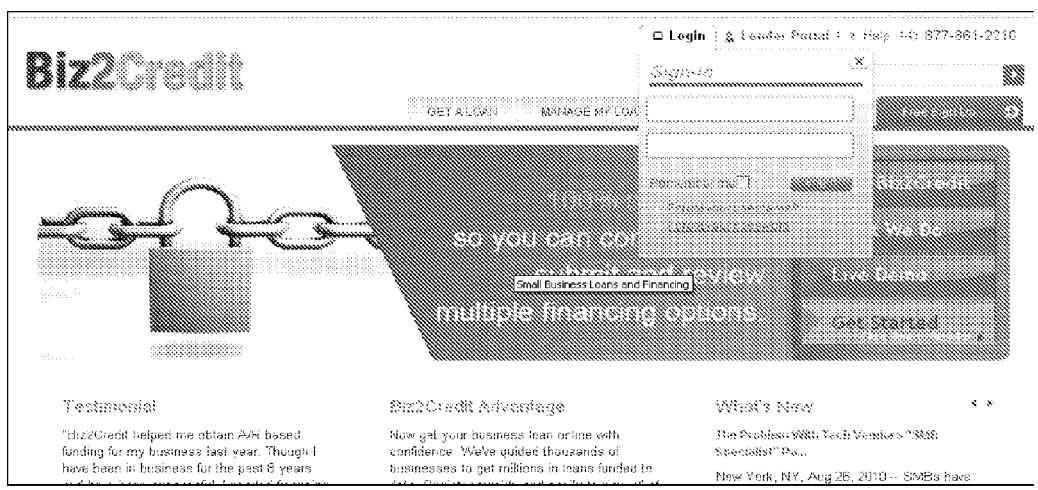
Figure 61:
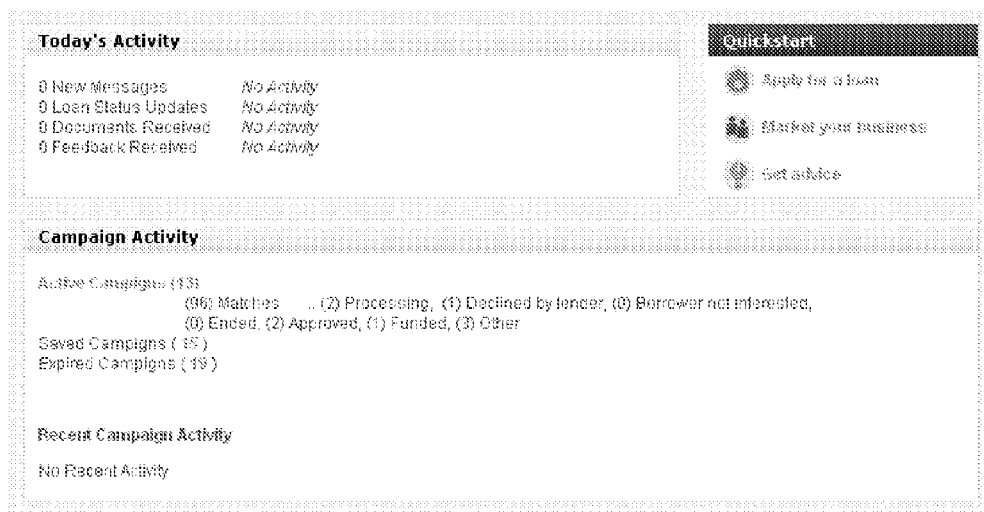
Figure 62:
Figure 63:
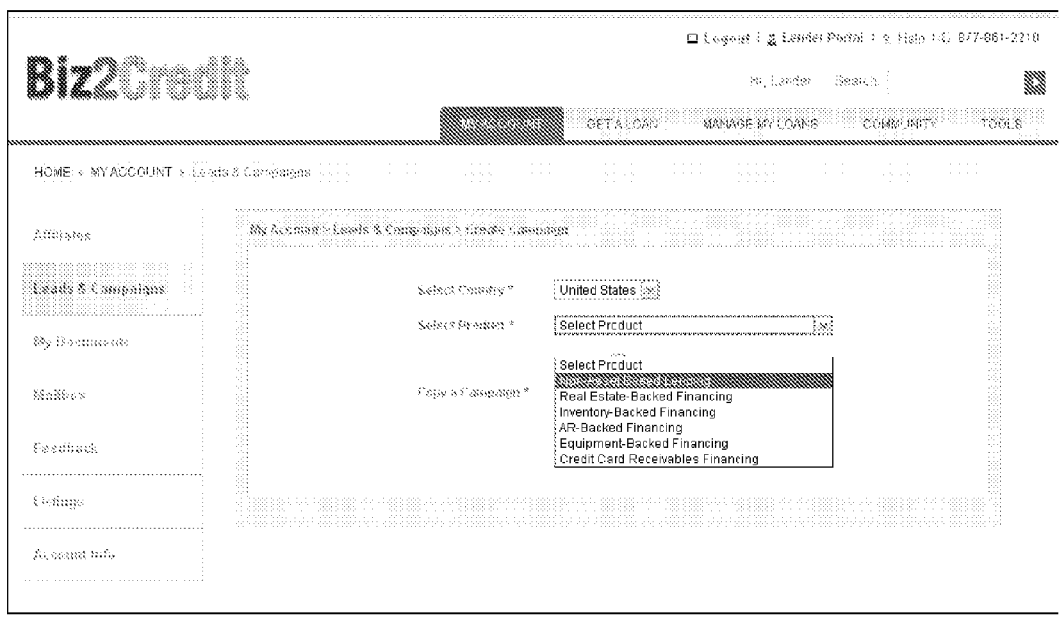

FIGS. 59 and 60 include examples of web portal and login screen displays that may be presented to a lender 104B accessing the decision making engine 101. FIG. 61 illustrates an example of a lender dashboard that may be presented to the lender 104B. The lender dashboard may include campaign activity, matched credit product offerings, number of loan applications in process, documents received, feedback received, and other information.

Figure 64:
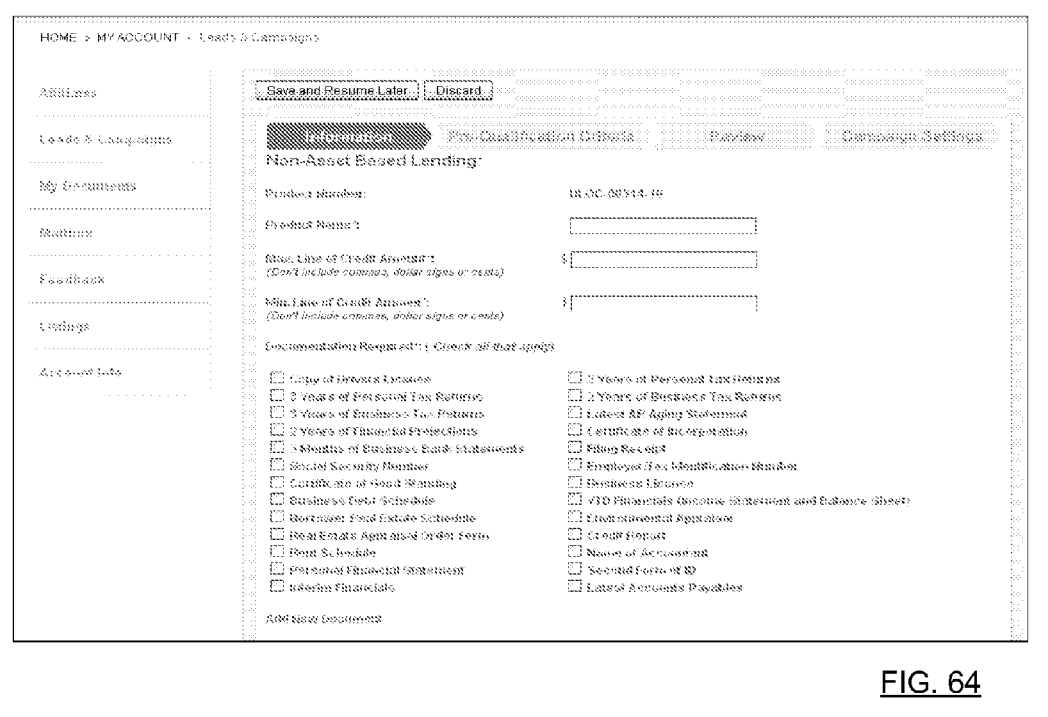
Figure 65:
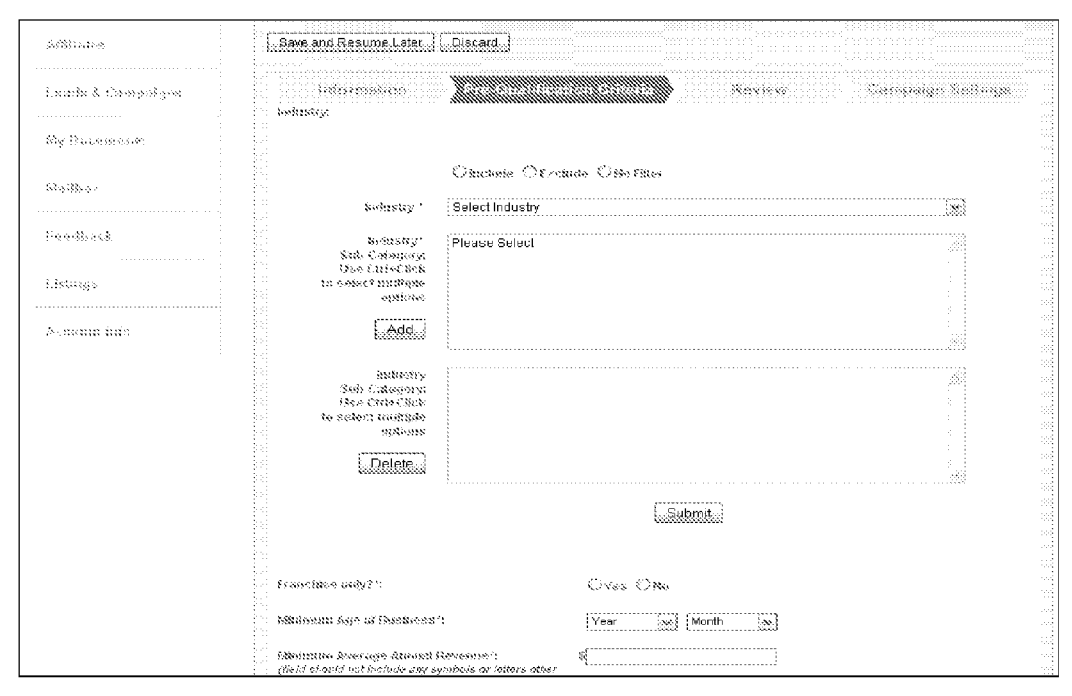
Figure 66:
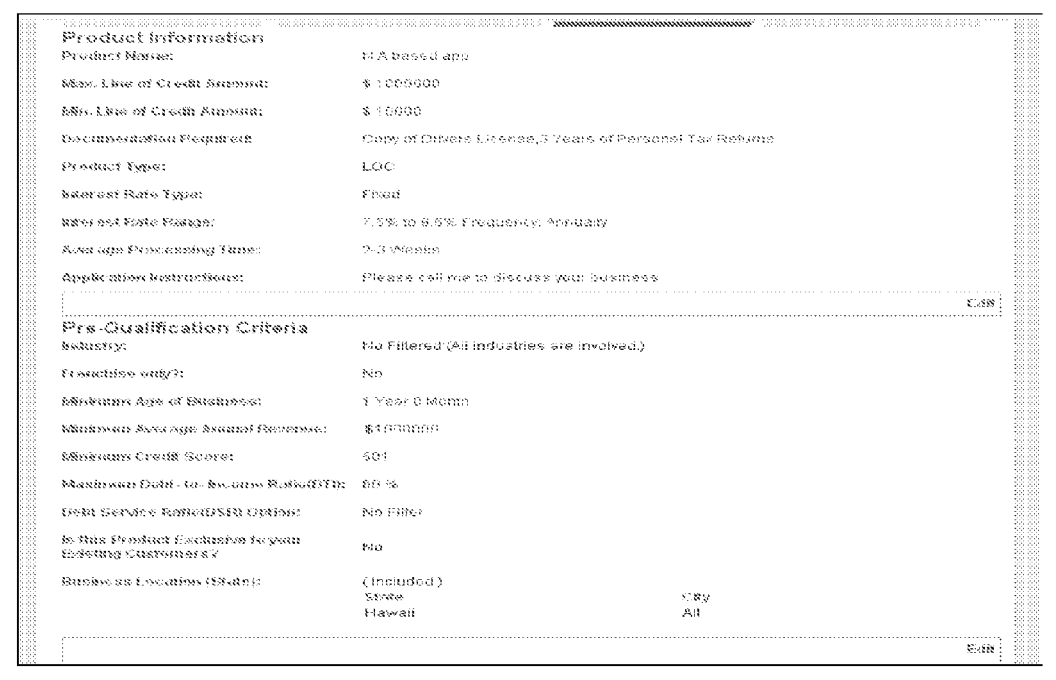

FIGS. 62 through 67 illustrate various aspects of the creation of a credit product campaign by a lender 104B. Basic campaign information may be entered such as product type, loan type, interest rate range, maximum loan amount, required documents, and other attributes. On the basis of the credit product information, the engine 101 can match funding requests from borrowers to the credit product offerings of lenders 104B. The lender 104B may also choose who can view campaign information by using the feature shown in FIG. 67.

Figures 67, 68:
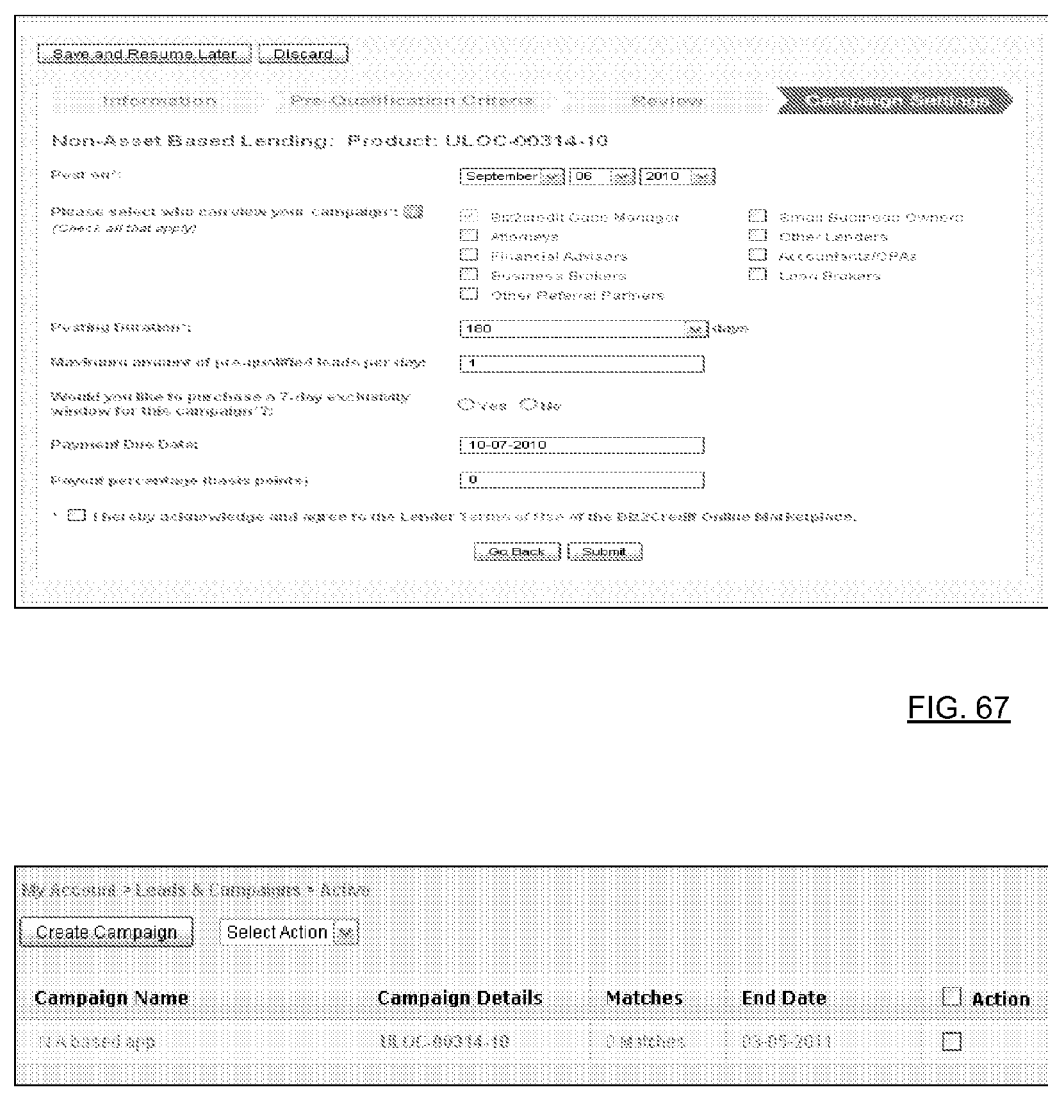
Figure 69:
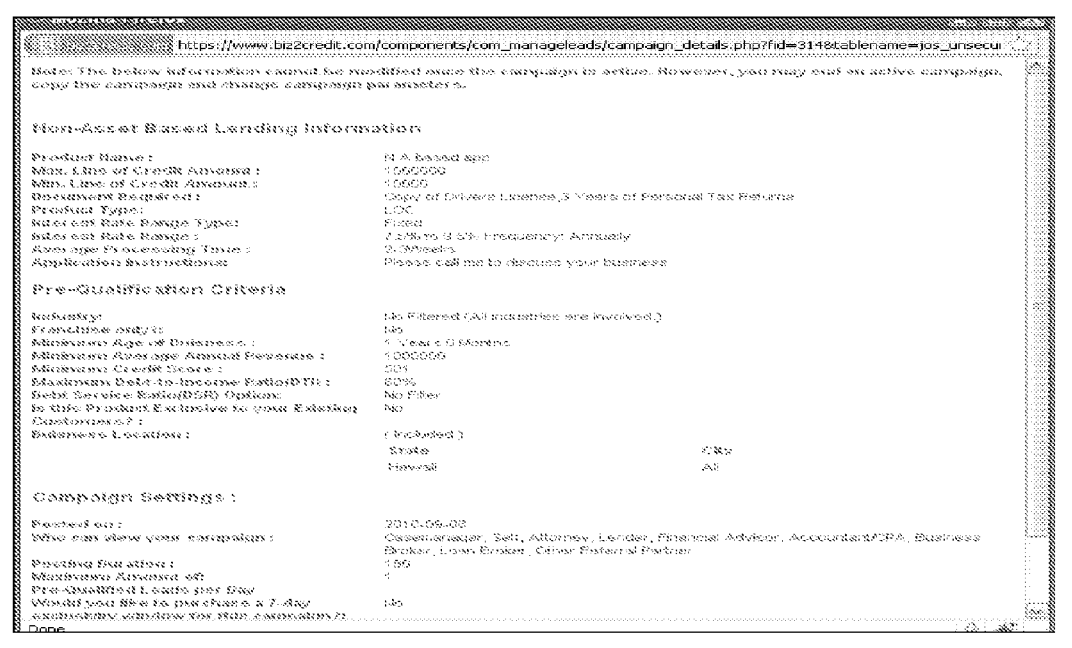
Figures 70, 71:
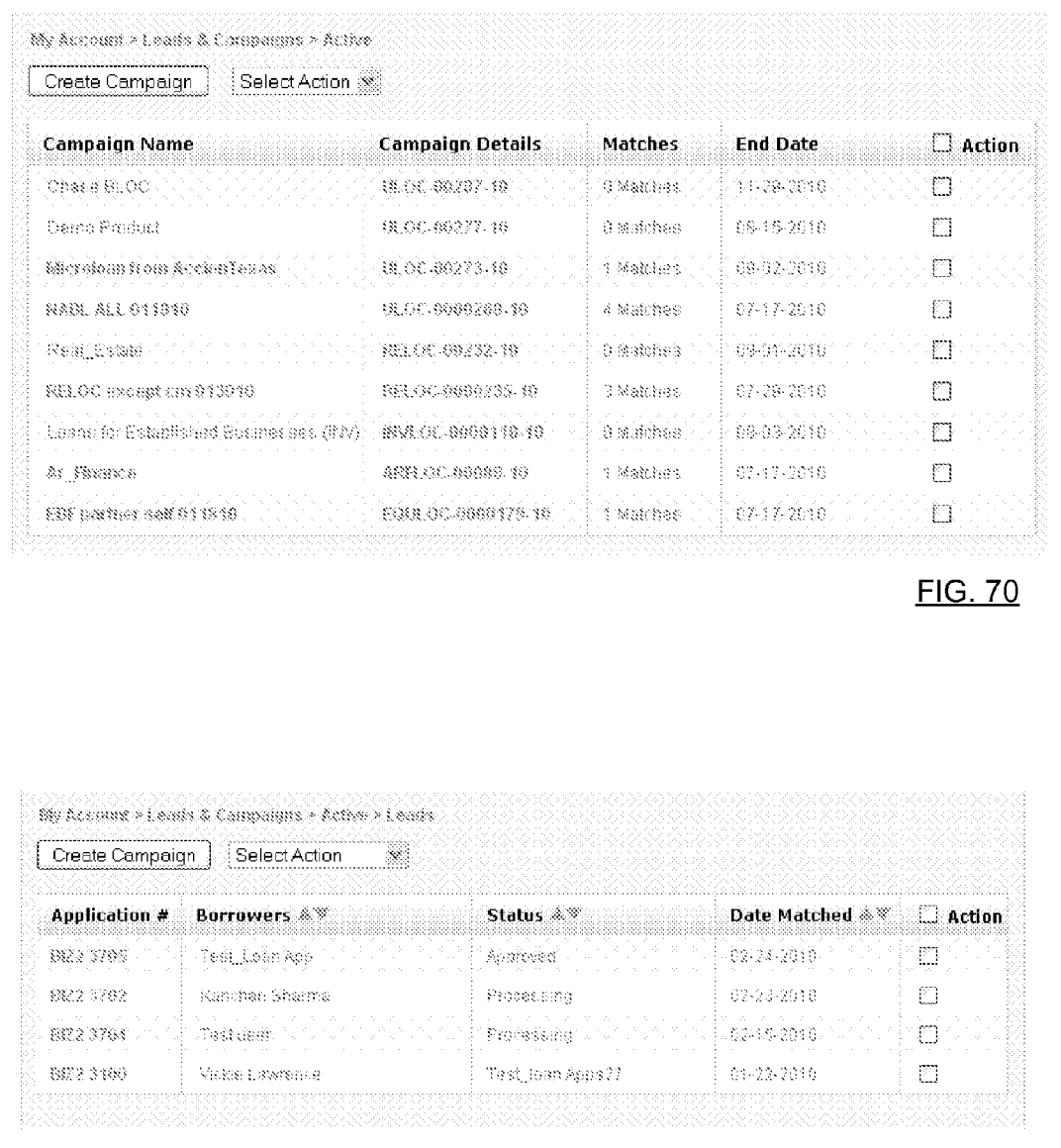
Figures 73, 74:
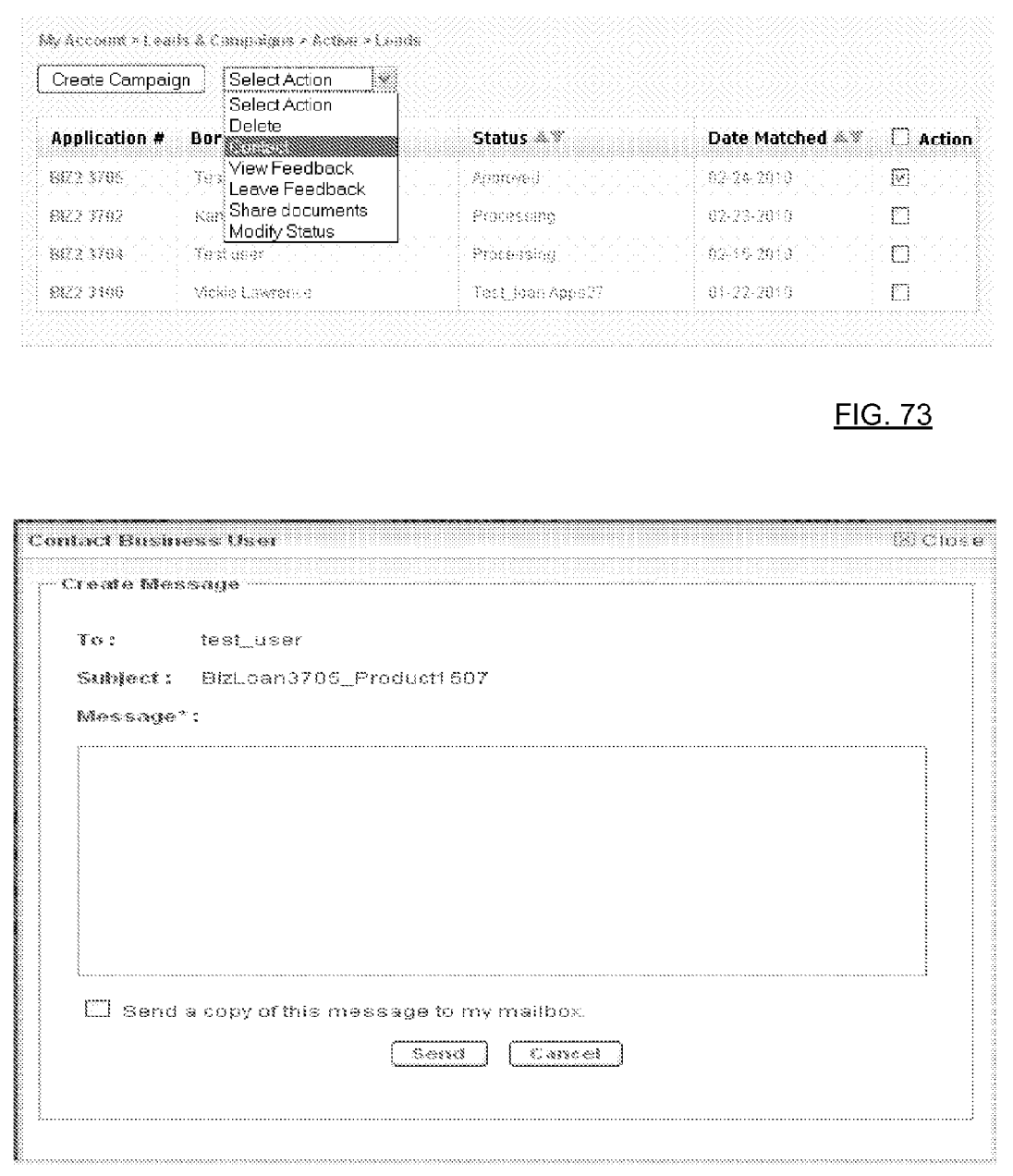
Figure 75:
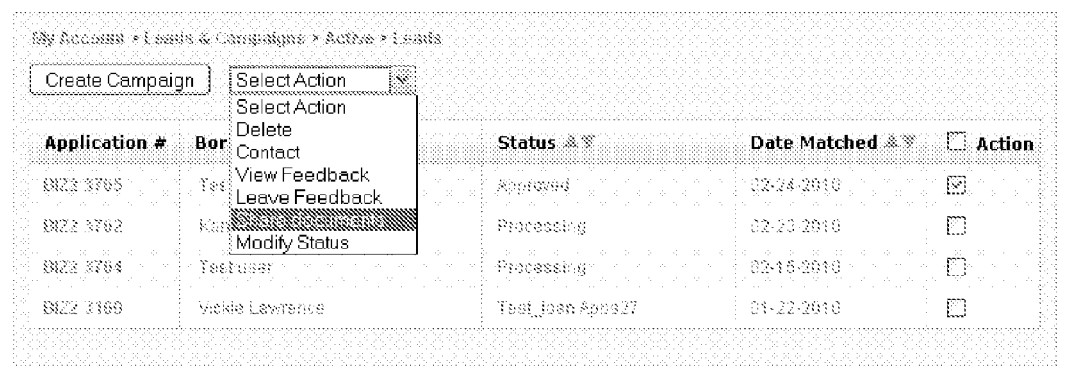
Figure 76:
Figure 77:
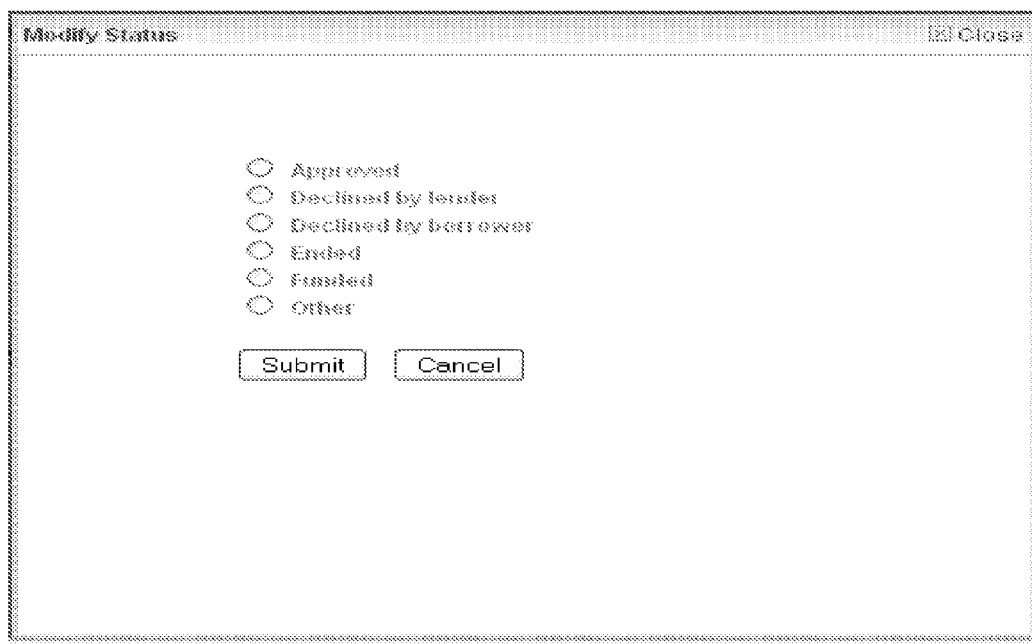

As shown in FIG. 68, the lender 104B can view campaign activity by selecting an active campaign link. If there are any matches, the engine 101 can provide a link under the campaign column. Selecting a name in the campaign name column can be used to display a summary screen for the display, as shown in FIG. 69, for example. In another example, selecting a group of matches in the screen display of FIG. 70 can cause the list of FIG. 71 to be displayed for the associated campaign. Selecting a specific matched result in the list of FIG. 71 can generate the summary screen as shown in FIGS. 72A and 72B. In various embodiments, if the lender 104B desires to communicate with a business owner 104A, then the feature illustrated in FIGS. 73 and 74 can be employed to facilitate such communication. FIGS. 75 and 76 illustrate an example of a function for sharing documents between lenders 104B and borrowers 104A. FIG. 77 illustrates an example of a function that can be used to modify the status of an application for a credit product offering.

In various embodiments, the decision making engine 101 can generate results for multiple credit products from the same lender 104B, and/or multiple credit products from multiple lenders 104B. This can provide a cost effective mechanism for generating pre-qualified leads for small business owners. A small business owner looking to apply for financing can use the engine 101 to enter business information, financial information, credit profile and select the most important reasons and preferences for seeking financing among factors such as interest rate, loan amount, or speed of getting funds, for example. Once the information has been entered, the engine 101 can generate results for lending options compatible with small business owners' needs and provide multiple options per lender. Small business owners can use the engine 101 to create a user profile, submit lending criteria, and generate results based on particular needs. The matching performed by the engine 101 can be configured as two-way matching, for example, wherein the preferences of all borrowers 104A, and matching underwriting criteria of all lenders 104B is assigned a weighted mean, leading to choices being ranked. The engine 101 may also be programmed to adjust the rankings by comparing a number of key borrower 104A preference variables like interest rates and processing time against the actual products of the lenders 104B. Also, new products introduced by existing lenders or new lenders can be dynamically matched with existing loan applications on a real-time or near real-time basis. The engine 101 can also provides real time e-updates to borrowers as well as lending institutions.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. For example, no particular aspect or aspects of the examples of system architectures, user interface layouts, or screen displays described herein are necessarily intended to limit the scope of the invention.

It is to be understood that the figures and descriptions of the present invention have been simplified to illustrate elements that are relevant for a clear understanding of the present invention, while eliminating, for purposes of clarity, other elements. Those of ordinary skill in the art may recognize, however, that these sorts of focused discussions would not facilitate a better understanding of the present invention, and therefore, a more detailed description of such elements is not provided herein.

Any element expressed herein as a means for performing a specified function is intended to encompass any way of performing that function including, for example, a combination of elements that performs that function. Furthermore the invention, as may be defined by such means-plus-function claims, resides in the fact that the functionalities provided by the various recited means are combined and brought together in a manner as defined by the appended claims. Therefore, any means that can provide such functionalities may be considered equivalents to the means shown herein.

In various embodiments, modules or software can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the invention. In certain embodiments, a "module" may include software, firmware, hardware, or any reasonable combination thereof.

Moreover, the processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

A "computer," "computer system," "component," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media. In various embodiments, a "host," "engine," "loader," "filter," "platform," or "component" may include various computers or computer systems, or may include a reasonable combination of software, firmware, and/or hardware.

The terms "program," "software application," and the like as used herein, may include a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers described herein, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it may be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. For example, the embodiments described hereinabove may be implemented in computer software using any suitable computer programming language such as .NET, SQL, MySQL, or HTML using, for example, conventional or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C#, COBOL, Fortran, Java, Lisp, Pascal, Object Pascal; and examples of scripting languages include Bourne script, JavaScript, Python, Ruby, PHP, and Perl Various embodiments may be employed in a Lotus Notes environment, for example. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. The network may use routers and/or public communication links. One type of data communication network may cover a relatively broad geographic area (e.g., city-to-city or country-to-country) which uses transmission facilities provided by common carriers, such as telephone service providers. In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods, systems, and tools described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity. As applied herein, an extranet may include a network or internetwork generally limited to a primary organization or entity, but which also has limited connections to the networks of one or more other trusted organizations or entities (e.g., customers of an entity may be given access an intranet of the entity thereby creating an extranet).

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs); remote bridges can be used to create a wide area network (WAN) link between LANs; and/or, wireless bridges can be used to connect LANs and/or to connect remote stations to LANs.

In various embodiments, a hub may be employed which contains multiple ports. For example, when a data packet arrives at one port of a hub, the packet can be copied unmodified to all ports of the hub for transmission. A network switch or other devices that forward and filter OSI layer 2 datagrams between ports based on MAC addresses in data packets can also be used. A switch can possess multiple ports, such that most of the network is connected directly to the switch, or another switch that is in turn connected to a switch. The term "switch" can also include routers and bridges, as well as other devices that distribute data traffic by application content (e.g., a Web URL identifier). Switches may operate at one or more OSI model layers, including physical, data link, network, or transport (i.e., end-to-end). A device that operates simultaneously at more than one of these layers can be considered a multilayer switch. In certain embodiments, routers or other like networking devices may be used to forward data packets between networks using headers and forwarding tables to determine an optimum path through which to transmit the packets.

As employed herein, an application server may be a server that hosts an API to expose business logic and business processes for use by other applications. Examples of application servers include J2EE or Java EE 5 application servers including WebSphere Application Server. Other examples include WebSphere Application Server Community Edition (IBM), Sybase Enterprise Application Server (Sybase Inc), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java). Also, application servers may be provided in accordance with the .NET framework, including the Windows Communication Foundation, .NET Remoting, ADO-.NET, and ASP.NET among several other components. For example, a Java Server Page (JSP) is a servlet that executes in a web container which is functionally equivalent to CGI scripts. JSPs can be used to create HTML pages by embedding references to the server logic within the page. The application servers may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture.

In various embodiments, computers and computer systems described herein may have the following main components: arithmetic and logic unit (ALU), control unit, memory, and input and output devices (I/O devices). These components can be interconnected by busses, often comprising groups of wires or cables. The control unit, ALU, registers, and basic I/O (and often other hardware closely linked with these sections) can be collectively considered a central processing unit (CPU) for the computer system. The CPU may be constructed on a single integrated circuit or microprocessor.

The control unit (control system or central controller) directs the various components of a computer system. The control system decodes each instruction in a computer program and turns it into a series of control signals that operate other components of the computer system. To enhance performance or efficiency of operation, the control system may alter the order of instructions. One component of the control unit is the program counter, a memory register that tracks the location in memory from which the next instruction is to be read.

The ALU is capable of performing arithmetic and logic operations. The set of arithmetic operations that a particular ALU supports may be limited to adding and subtracting or might include multiplying or dividing, trigonometry functions (sine, cosine, etc.) and square roots. Some may be programmed to operate on whole numbers (integers), while others use floating point to represent real numbers, for example. An ALU may also compare numbers and return Boolean truth values (e.g., true or false). Superscalar computers may contain multiple ALUs to facilitate processing multiple instructions at the same time. For example, graphics processors and computers with SIMD and MIMD features often possess ALUs that can perform arithmetic operations on vectors and matrices. Certain computer systems may include one or more RAM cache memories configured to move more frequently needed data into the cache automatically.

Examples of peripherals that may be used in connection with certain embodiments of the invention include input/output devices such as keyboards, mice, screen displays, touch screens, pens, monitors, printers, hard disk drives, floppy disk drives, joysticks, and image scanners.

Embodiments of the methods and systems described herein may divide functions between or among separate CPUs, creating a multiprocessing configuration. For example, multiprocessor and multi-core (multiple CPUs on a single integrated circuit) computer systems with co-processing capabilities may be employed. Also, multitasking may be employed as a computer processing technique to handle simultaneous execution of multiple computer programs.

In various embodiments, the computer systems, data storage media, or modules described herein may be configured and/or programmed to include one or more of the above-described electronic, computer-based elements and components, or computer architecture. In addition, these elements and components may be particularly configured to execute the various rules, algorithms, programs, processes, and method steps described herein.

While various embodiments of the invention have been described and claimed herein, it should be apparent, however, that various modifications, alterations and adaptations to those embodiments may occur to persons skilled in the art with the attainment of some or all of the advantages of the present invention. The disclosed embodiments are therefore intended to include all such modifications, alterations and adaptations without departing from the scope and spirit of the present invention as described and claimed herein.

What is claimed is:

1. A computer-implemented business analysis apparatus comprising:
 a business analysis module programmed for use in association with a small business entity seeking to identify at least one credit product and programmed for executing, by a processor, a business analysis tool in connection with a transaction processor of a decision making engine, wherein the business analysis tool is programmed for:
 (i) receiving, by a processor, risk data associated with the small business entity, wherein the risk data include:
  (a) at least one data set including at least one personal credit score associated with the small business entity;
  (b) at least one data set including at least one debt-to-income value associated with the small business entity;
  (c) at least one data set including at least one value representing an amount of time that the small business entity has been operating in business;
  (d) at least one data set including at least one industry type value associated with an industry in which the small business entity operates; and,
  (e) at least one data set including a corporate entity type value associated with a type of entity through which the small business entity operates;
 (ii) calculating, by a processor, a separate sub-section risk score for each of the personal credit score, debt-to-income, time in business, industry type, and corporate entity type sub-section risk data sets received by the processor;
 (iii) calculating, by a processor, an overall risk score associated with the small business entity in response to the calculated sub-section risk scores by aggregating the separate sub-section risk scores into the overall risk score; and,
 (iv) matching, by a processor, at least one credit product with the small business entity in response to at least the calculated overall risk score or at least a portion of the sub-section risk data.

2. The business analysis apparatus of claim 1, wherein the business analysis tool is further programmed for calculating, by a processor, at least one sub-section risk score in response to asset information associated with the small business entity.

3. The business analysis apparatus of claim 1, wherein the business analysis tool is further programmed for calculating, by a processor, at least one sub-section risk score in response to at least one credit product criterion associated with the small business entity.

4. The business analysis apparatus of claim 1, wherein the business analysis tool is further programmed for calculating, by a processor, at least one sub-section risk score in response to accounting data associated with the small business entity received from an external data source.

5. The business analysis apparatus of claim 1, wherein the business analysis tool is further programmed for initiating, by a processor, a process for matching at least one credit product offering of a lender with business information associated with the small business entity in response to at least a portion of the sub-section risk data.

6. The business analysis apparatus of claim 1, wherein the business analysis tool further includes a scenario modification tool programmed for receiving, by a processor, at least one modification to at least one of the sub-section risk data sets.

7. The business analysis apparatus of claim 6, wherein the business analysis tool is further programmed for recalculating, by a processor, the overall risk score in response to the modified sub-section risk data.

8. The business analysis apparatus of claim 6, wherein the business analysis tool is further programmed for initiating, by a processor, a process for matching at least one credit product offering of a lender with business information associated with the small business entity in response to the data modified by the scenario modification tool.

9. The apparatus of claim 1, further comprising the business analysis tool programmed for:
 receiving, by a processor, at least one data update associated with at least one of the risk data sets; and,
 automatically recalculating, by a processor, at least one of the sub-section risk scores or the overall risk score in association with the updated risk data.

10. The apparatus of claim 1, further comprising the business analysis tool programmed for receiving, by a processor, financial information associated with at least one of the small business entity or a lender from at least one external data source.

11. A computer-implemented method for analyzing a business, the method comprising:

receiving, in a business analysis module programmed for execution by a transaction processor of a decision making engine, risk data associated with a small business entity seeking to identify at least one credit product, including receiving, by the transaction processor, risk data comprising:
(a) at least one data set including at least one personal credit score associated with the small business entity;
(b) at least one data set including at least one debt-to-income value associated with the small business entity;
(c) at least one data set including at least one value representing an amount of time that the small business entity has been operating in business;
(d) at least one data set including at least one industry type value associated with an industry in which the small business entity operates; and,
(e) at least one data set including a corporate entity type value associated with a type of entity through which the small business entity operates;

calculating, with the transaction processor, a separate sub-section risk score for each of the personal credit score, debt-to-income, time in business, industry type, and corporate entity type sub-section risk data sets;

calculating, with the transaction processor, an overall risk score associated with the small business entity in response the calculated sub-section risk scores by aggregating the separate sub-section risk scores into the overall risk score; and, matching, by the transaction processor, at least one credit product with the small business entity in response to at least the calculated overall risk score or at least a portion of the sub-section risk data.

12. The method of claim 11, further comprising calculating, by the transaction processor, at least one sub-section risk score in response to asset information associated with the small business entity.

13. The method of claim 11, further comprising calculating, by the transaction processor, at least one sub-section risk score in response to at least one credit product criterion associated with the small business entity.

14. The method of claim 11, further comprising calculating, by the transaction processor, at least one sub-section risk score in response to accounting data associated with the small business entity received from an external data source.

15. The method of claim 11, further comprising initiating, by the transaction processor, a process for matching at least one credit product offering of a lender with business information associated with the small business entity in response to at least a portion of the sub-section risk data.

16. The method of claim 11, further comprising receiving, by the transaction processor, at least one modification to at least one of the sub-section risk data sets through a scenario modification tool.

17. The method of claim 16, further comprising recalculating, by the transaction processor, the overall risk score in response to the modified sub-section risk data.

18. The method of claim 11, further comprising initiating, by the transaction processor, a process for matching at least one credit product offering of a lender with business information associated with the small business entity in response to the sub-section risk data modified by the scenario modification tool.

19. The method of claim 11, further comprising:
receiving, by the transaction processor, at least one data update associated with at least one of the risk data sets; and,
automatically recalculating, by the transaction processor, at least one of the sub-section risk scores or the overall risk score in association with the updated risk data.

20. The method of claim 11, further comprising receiving, by the transaction processor, financial information associated with at least one of the small business entity or a lender from at least one external data source.

* * * * *